US010235676B2

(12) United States Patent
Choe et al.

(10) Patent No.: US 10,235,676 B2
(45) Date of Patent: Mar. 19, 2019

(54) SYSTEMS AND METHODS FOR ACCESSING COMPUTATIONAL RESOURCES IN AN OPEN ENVIRONMENT

(71) Applicant: The Toronto-Dominion Bank, Toronto (CA)

(72) Inventors: Mok Choe, Toronto (CA); Paul Mon-Wah Chan, Markham (CA); Ali Hosseinian, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 217 days.

(21) Appl. No.: 15/152,142

(22) Filed: May 11, 2016

(65) Prior Publication Data

US 2016/0335454 A1    Nov. 17, 2016

Related U.S. Application Data

(60) Provisional application No. 62/160,274, filed on May 12, 2015.

(51) Int. Cl.
*G06F 21/62*     (2013.01)
*G06Q 30/00*     (2012.01)

(52) U.S. Cl.
CPC ......... *G06Q 30/018* (2013.01); *G06F 21/629* (2013.01)

(58) Field of Classification Search
CPC ............................ G06Q 30/018; G06F 21/629
USPC ......................................................... 726/1
See application file for complete search history.

(56) References Cited

U.S. PATENT DOCUMENTS

| | | | |
|---|---|---|---|
| 8,950,005 B1* | 2/2015 | Torney | G06F 21/629 |
| | | | 713/193 |
| 9,342,550 B1* | 5/2016 | Manmohan | G06F 17/30371 |
| 2004/0039965 A1 | 2/2004 | Gorshenev et al. | |
| 2004/0260839 A1* | 12/2004 | Onoda | G06F 21/10 |
| | | | 709/247 |
| 2007/0067321 A1* | 3/2007 | Bissett | G06F 9/4428 |
| 2007/0180099 A1 | 8/2007 | Tsimelzon et al. | |
| 2008/0082354 A1* | 4/2008 | Hurry | G06Q 30/00 |
| | | | 705/317 |
| 2008/0147753 A1 | 6/2008 | Chasman et al. | |
| 2008/0275939 A1 | 11/2008 | Martin | |
| 2009/0094679 A1* | 4/2009 | Canning | G06F 21/6218 |
| | | | 726/3 |
| 2009/0133100 A1 | 5/2009 | Buchwald et al. | |

(Continued)

*Primary Examiner* — Michael S McNally
(74) *Attorney, Agent, or Firm* — Duane Morris LLP

(57) ABSTRACT

The disclosed embodiments include methods and systems for accessing computation resources, such as information-technology (IT) assets, in an open environment. In certain aspects, an IT system may provide an online portal that presents an IT self-serve store of IT assets that a user may select for access or use. The IT system may, for example, determine that the selected IT assets comply with one or more compliance and permissioning policies, and based on the determination, may assemble the selected IT assets to generate or "spin-up" instances of applications executable by various hardware platforms. The IT system may also establish an enterprise data provisioning platform that maintains data, reporting, and analytical assets in formats accessible to devices and application instances executing across the enterprise, and that provisions the data, reporting, and analytical assets in a timely, accurate, and consistent manner.

19 Claims, 18 Drawing Sheets

(56) References Cited

U.S. PATENT DOCUMENTS

| | | |
|---|---|---|
| 2010/0024037 A1* | 1/2010 | Grzymala-Busse ......................... G06F 21/6245 726/26 |
| 2010/0046015 A1* | 2/2010 | Whittle ................. G06F 3/1222 358/1.9 |
| 2010/0274380 A1 | 10/2010 | Gray |
| 2011/0231865 A1 | 9/2011 | Dorn et al. |
| 2011/0276661 A1* | 11/2011 | Gujarathi .............. G06F 9/4445 709/219 |
| 2012/0233668 A1 | 9/2012 | Leafe et al. |
| 2013/0117847 A1* | 5/2013 | Friedman .............. H04L 63/102 726/22 |
| 2013/0152154 A1* | 6/2013 | Xiao ....................... G06F 21/00 726/1 |
| 2013/0173684 A1 | 7/2013 | Kuchhal |
| 2013/0297802 A1 | 11/2013 | Laribi et al. |
| 2014/0136986 A1 | 5/2014 | Martin et al. |

\* cited by examiner

SYSTEMS AND METHODS FOR ACCESSING COMPUTATIONAL RESOURCES IN AN OPEN ENVIRONMENT

CROSS-REFERENCE TO RELATED APPLICATIONS

This application claims the benefit of U.S. Provisional Patent Application No. 62/160,274, filed May 12, 2015, which is incorporated by reference herein to its entirety.

BACKGROUND

Technical Field

The present disclosure generally relates to systems and methods for providing access to computational resources.

Background

Many modern enterprises leverage the capabilities of the Internet, mobile computing, and the like, to provide services to its customers. To provide such services, many of these enterprises may develop hardware and software platforms that function as the backbone of such offerings. Conventional approaches include developing customized information technology (IT) services, databases, data structures, scripts, and models geared toward delivering the functionalities intended to support services for end-customers.

But these approaches had drawbacks. For example, IT approaches that relied on monolithic and vertically integrated mainframe systems became too complex and customized. Distributing operational management across many nodes increased costs, resulted in frequent business outages. And, where project delivery took precedence over IT, software patches overwhelmed the integrity of the core systems, resulting in even more complex IT offerings that camouflaged the core engines that were introduced. Consequently, many conventional IT approaches result in too many one-off tools and functionalities that are not portable across other platforms, services, or business units of an enterprise. New tools, infrastructures, and/or software may have to be developed and implemented each time a new service is envisioned. Further, access to IT resources that support such services may be limited and were incapable of being shared internally and externally to a financial service provider's enterprise. And because financial service providers may lack the resources to keep up with ever-changing technologies and capabilities, they may be forced to rely on outside sources, such as vendors, to develop, maintain, and/or host the IT backbone that support service offerings.

SUMMARY

Consistent with a disclosed embodiment, an apparatus includes a storage device storing instructions and at least one processor configured to execute the instructions to obtain an information-technology asset from an enterprise data provisioning platform. The at least one processor may be configured to execute the instructions to establish a presence of sensitive information within the obtained information-technology asset. The at least one processor may be configured to execute the instructions to determine, based on the established presence of the sensitive information, whether a distribution of the obtained information-technology asset to a destination device is inconsistent with a permissioning or compliance policy. The at least one processor may be configured to execute the instructions to, when the distribution of the obtained information-technology asset is inconsistent with the permissioning or compliance policy, modify at least a portion of the obtained information-technology asset to at least one of delete or obfuscate a portion of the sensitive information. The at least one processor may be configured to execute the instructions to generate an electronic command to transmit the modified information-technology asset to the destination device across a network.

Consistent with another disclosed embodiment, a computer-implemented method may obtain, using at least one processor, an information-technology asset from an enterprise data provisioning platform. The method may also establish, using the at least one processor, a presence of sensitive information within the obtained information-technology asset. Based on the established presence of the sensitive information, the method may also determine, using the at least one processor, whether a distribution of the obtained information-technology asset to a destination device is consistent with a permissioning or compliance policy. When the distribution of the obtained information-technology asset is inconsistent with the permissioning or compliance policy, the method may modify, using the at least one processor, at least a portion of the obtained information-technology asset to at least one of delete or obfuscate a portion of the sensitive information, and generate, using the at least one processor, an electronic command to transmit the modified information-technology asset to the destination system across a network.

Other embodiments of the present disclosure relate to a tangible computer-readable medium with stored instructions that, when executed by a processor, perform a method. The method may obtain an information-technology asset from an enterprise data provisioning platform. The method may also establish a presence of sensitive information within the obtained information-technology asset. Based on the established presence of the sensitive information, the method may also determine whether a distribution of the obtained information-technology asset to a destination device is consistent with a permissioning or compliance policy. When the distribution of the obtained information-technology asset is inconsistent with the permissioning or compliance policy, the method may modify at least a portion of the obtained information-technology asset to at least one of delete or obfuscate a portion of the sensitive information, and generate, using the at least one processor, an electronic command to transmit the modified information-technology asset to the destination system across a network.

In further embodiments, a system includes an enterprise data provisioning platform connected to a network, and an apparatus connected to the network. In one aspect, the enterprise data provisioning platform device includes a storage device that stores a plurality of information-technology assets. In further aspects, the apparatus includes a storage device storing instructions, and at least one processor configured to execute the instructions to identify a subset of the information-technology assets available to a user associated with a destination device, which may be connected to the network. In some instances, the available subset of the information technology assets is consistent with a permissioning, or compliance policy. The at least one processor may be further configured to provide, to the destination device, information identifying the subset of the available information-technology assets. The information may, for example, instruct the destination device to present the available subset of the information technology assets to the user through an interface. The at least one processor may be further configured to receive, from the destination device, information identifying a selection of at least one of the available information-technology assets by the user, and obtain the at least one selected information-technology asset from the enterprise data provisioning platform. The at least one processor may be further configured to establish a presence of sensitive information within the at least one selected information-technology asset. The at least one processor may be further configured to determine, based on the established presence of the sensitive information, whether a distribution of the at least one selected information-technology asset to the destination device is consistent with the permissioning or compliance policy, and when the distribution of the at least one selected information-technology asset is inconsistent with the permissioning or compliance policy, modify a portion of the obtained information-technology asset to at least one of delete or obfuscate a portion of the sensitive information. The at least one processor may be further configured to generate an electronic command to transmit the at least one modified information-technology asset to the destination device.

It is to be understood that both the foregoing general description and the following detailed description are exemplary and explanatory only and are not restrictive of the claims.

DESCRIPTION OF THE EMBODIMENTS

Reference will now be made in detail to embodiments of the present disclosure, examples of which are illustrated in the accompanying drawings. Wherever possible, the same reference numbers will be used throughout the drawings to refer to the same or like parts.

Figure 1:
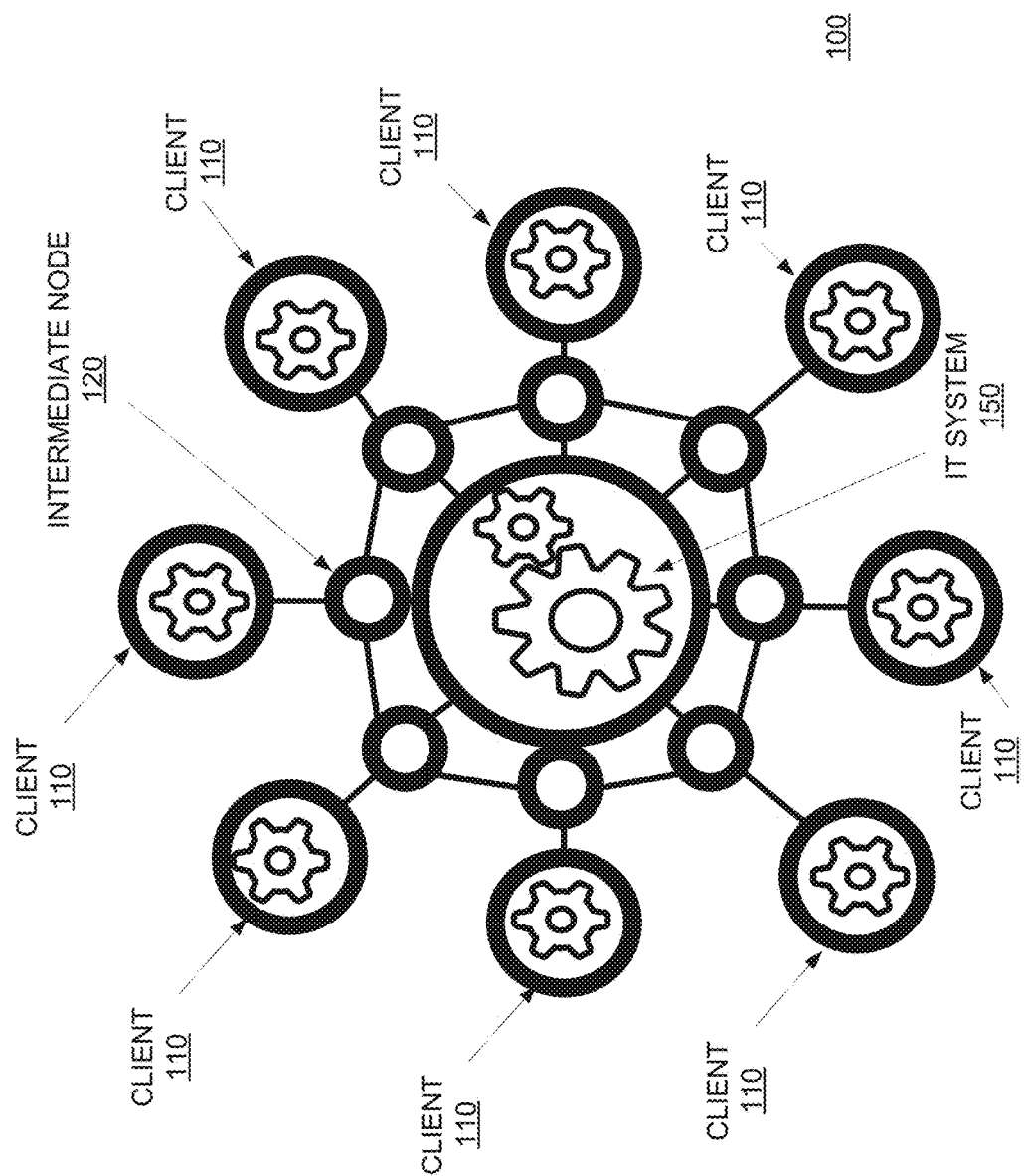
FIG. 1 depicts an exemplary computing environment consistent with disclosed embodiments.

FIG. 1 illustrates an exemplary computing environment 100 consistent with certain disclosed embodiments. In one aspect, computing environment 100 may include one or more clients 110, one or more intermediate nodes 120, an IT system 150, and a communications network interconnecting one or more of the components of environment 100.

Figure 2:
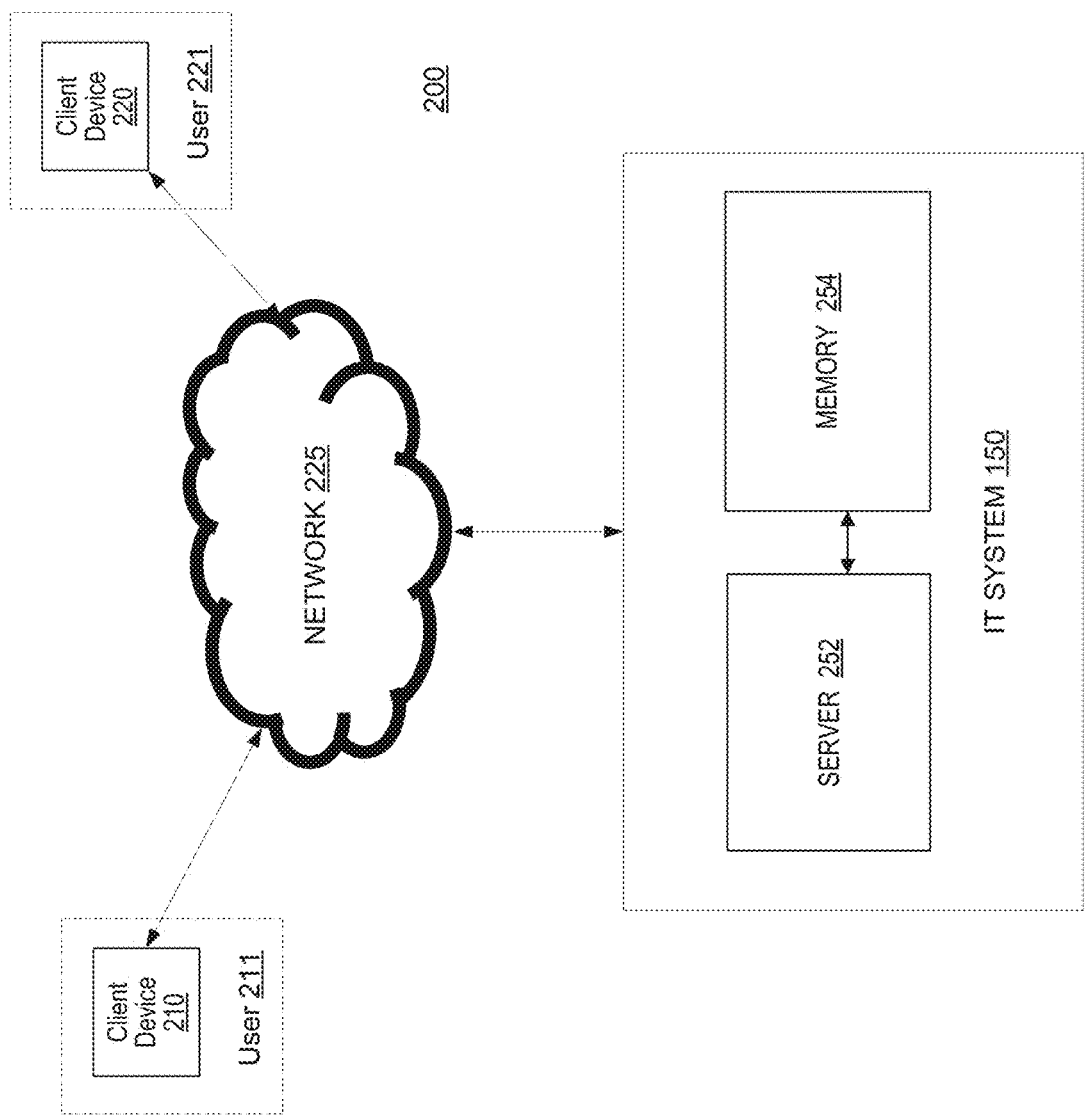
FIG. 2 depicts another exemplary computing environment consistent with the disclosed embodiments.

In one embodiment, IT system 150 may be one or more computer systems configured to process and store information, and execute software instructions to perform one or more processes consistent with the disclosed embodiments. In certain embodiments, IT system 150 may include one or more servers and memories. FIG. 2 illustrates additional details of exemplary system components of exemplary IT system 150.

A client 110 may be one or more client devices. In certain embodiments, client 110 may be associated with one or more users. In one example, a user may use client 110 to provide input that may be used to perform one or more processes consistent with the disclosed embodiments. In certain aspects, client 110 can include, but is not limited to, a personal computer, a laptop computer, a tablet computer, a notebook computer, a hand-held computer, a personal digital assistant, a portable navigation device, a mobile phone, a wearable device, an embedded device, a smart phone, and any additional or alternate computing device. Client 110 may be implemented with one or more processors or computer-based systems. As shown in FIG. 1, system environment 100 (and other environments consistent with certain embodiments) may include multiple clients 110 that may be each associated with one or more users.

An intermediate node 120 may be a computing device that links clients 110 to IT system 150. Aspects of the disclosed embodiments may be configured without intermediate node(s) 120. For example, intermediate nodes may be routing devices that execute software to intelligently route requests and responses to/from a client 110 and IT system 150. In other aspects, intermediate nodes 120 may perform other operations or functionalities.

System environment 100 shows the components interconnected by a network of communication links (not labeled). In one embodiment, the network may be a cloud-based network. For instance, the network may be based on a wired or wireless Metropolitan Area Network (MAN) connecting multiple wireless LANs to form a wide area network ("WAN"). For example, consistent with embodiments of the present disclosure, the network may include the Internet and any publicly accessible network or networks interconnected via one or more communication protocols, including, but not limited to, hypertext transfer protocol (HTTP) and transmission control protocol/internet protocol (TCP/IP).

FIG. 2 shows an exemplary system environment 200 (that may be similar to environment 100) showing exemplary system components of IT system 150. For instance, IT system 150 may be configured with one or more servers 252 and one or more memories 254. Server 252 may be, for example, a computing system that processes, among other things, IT asset requests consistent with certain embodiments. Server 252 may also execute software (stored in memory 254 or elsewhere) that provides IT services or access to IT services that may be provided by remote or different computer systems.

In one embodiment, server 252 may include separate computing components that provide operations individually or collectively, although the configuration of server 252 is not limited to such configurations. In one example, server 252 may be incorporated into a single computer, a single server, or any additional or alternate computing device apparent to one or skill in the art. In other embodiments, server 252 may include distributed computing devices. Further, in one embodiment, software programs, such as a software application (e.g., a web service) may be executed by one or more processors included in server 252. Server 252 may be configured to execute software instructions to perform one or more processes consistent with the disclosed embodiments. In one embodiment, client devices 210 and/or 220 may exchange information with system 150.

IT system 150 may include one or more web servers or similar computing components that provide online portals (either through the Internet or other forms of networks) that are accessible by users internal and/or external to IT system 150 (or an entity associated with IT system 150). For example, IT system 150 may perform processes that generate and provide interfaces with content relating to open IT asset operations consistent with the disclosed embodiments.

Memory 254 may be one or more data storages configured to store information and software instructions consistent with the disclosed embodiments. In one aspect, memory 254 may be a data repository that may include customer data, account data, transaction data, and/or test data that mimics the customer, account, and/or transaction data, but preserves a confidentiality of sensitive information. In one aspect, customer data may include one or more data records uniquely identifying one or more customers of a business entity associated with system 150. For example, customer data may include personal information associated with a user (e.g., a name, home address, or date of birth), demographic information (e.g., educational level, income level), government-issued identifiers (e.g., driver's license numbers or Social Security numbers), employment information (e.g., employer name or address), and/or contact information (e.g., e-mail addresses, home numbers, work numbers, or mobile numbers). Other types of customer information may be stored and used in conjunction with the disclosed embodiments.

In certain aspects, account data may include account identification information identifying one or more accounts of customers of a financial service provider (e.g., a business entity associated with system 150). In one embodiment, account identification information may include financial service account information. For example, such financial service account information may include a checking account, a savings account, a revolving credit line, an account linked to a credit or debit card, a brokerage account, and any additional or alternate account provided or supported by the financial service provider (e.g., an issuing bank or financial institution). In other embodiments, account data may include information identifying investment portfolios held by one or more customers of the financial service provider.

Transaction data may include information identifying one or more transactions involving one or more customers or accounts of a financial service provider. In one embodiment, such transactions may include, but are not limited to, purchase transactions (e.g., purchases of goods and/or services from electronic or physical retailers), financial service transactions (e.g., fund transfers), bill payment transactions (e.g., electronic bill payment transactions), financial instrument or security transactions (e.g., purchases of securities), deposits or withdrawals of funds, or applications for credit from the financial service provider or other entity.

In exemplary system environment 200 (which may be similar to environment 100), client devices 210 and 220 (that may correspond to a client 110) may be operated by a respective user (e.g., user 211 and 221). Client devices 210 and 220 may connect to IT system 150 over a network (e.g., network 225) that may be similar to the network disclosed above in connection with FIG. 1.

Clients (including client 110, client devices 210 and/or 220, or other clients disclosed herein), IT system 150, or other computer systems disclosed herein may include computing components known to those skilled in the art that may be configured, programmed, or the like in specific manners that allow processes or operations to be performed consistent with disclosed embodiments. Such components may include one or more processors, memory devices (e.g., tangible and non-transitory computer-readable medium(s) having stored therein computer programs, sets of instructions, code, or data to be executed by the processor(s)).

In certain embodiments, the term "computer-readable medium" may refer to devices including, but not limited to, tangible and non-transitory memory device mediums, which may provide computer programs and/or sets of instructions executable by one or more processors. Such computer programs and sets of instructions can be stored within one or more computer-readable media. Additionally or alternatively, computer programs and sets of instructions may also be received via a communications interface and stored on the one or more computer-readable media. Such computer programs and instructions, when executed by a processor, may enable the processor to perform one or more processes consistent with the disclosed embodiments. Examples of program instructions include, for example, machine code, such as code produced by a compiler, and files containing a high-level code that can be executed by the processor using an interpreter.

The disclosed embodiments may provide computer-implemented systems and methods for providing IT assets. An IT asset may represent a computational resource, in certain embodiments, may be a service, software, process, information, data, test data, etc. that may be generated, maintained, linked, or otherwise provided by IT system 150, and that may be used to provide one or more IT services. For example, an IT asset may be a software patch that may be provided for one or more financial service provider services provided by a financial service provider. An IT asset may also include data, such as account data that is associated with accounts of customers of a financial service provider and transaction data that is associated with financial service transactions. For example, the account data may be associated with actual customer accounts, and the transaction data may be associated with actual customer transactions. In other aspects, as described below, IT system 150 may delete or obfuscate sensitive portions of the account and/or transaction data to generate test data that mimics the account and/or transaction data, but preserves a confidentiality of the actual customer accounts and actual customer transactions. In other aspects, an IT asset may reflect packages of IT services, which may include software, workflows, regulatory information, and the like. An IT asset may also reflect any of these exemplary information or processes individually. As another example, an IT asset may also be a model, which may be software that, when executed, provides modeling processes for certain use cases, applications, or environments. An IT asset may also reflect an API that may be preconfigured by IT system 150 (or preconfigured and programmed by a user and stored and made available by IT system 150). Alternatively, an API IT asset may be software that may be used by a user or system (e.g., client 110) to develop, build, test, and run an API to provide access to another IT asset, or a service offered by a system, such as IT system 150, client 110, or another system. Other examples of IT assets may be described herein and the above list is not limiting or exhaustive of the types of IT assets that may be provided, used, generated, maintained, and implemented by the disclosed embodiments.

Figure 3:
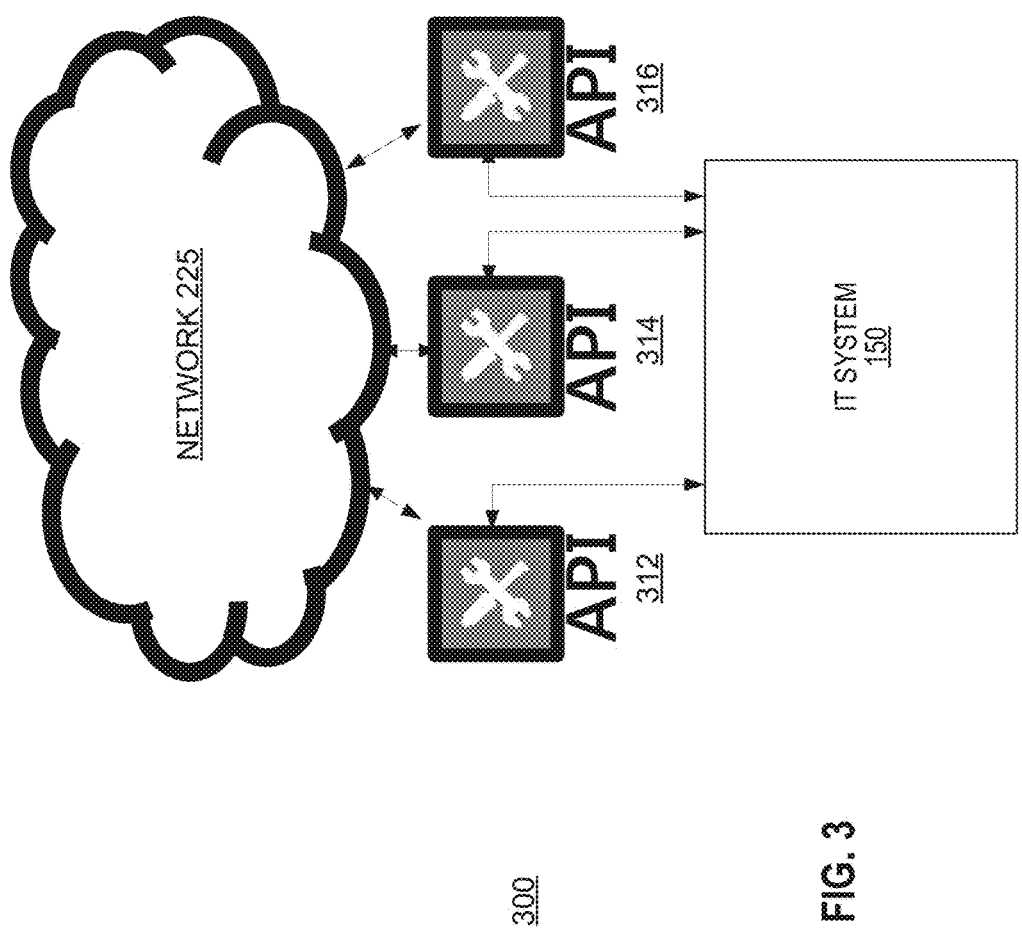
FIG. 3 depicts another exemplary computing environment consistent with the disclosed embodiments.

In certain embodiments, a client (e.g., clients 110, 210, and/or 220) may request access to IT system 150 to request one or more IT assets, or to perform one or more IT services (e.g., tests, modeling, etc.). In certain aspects, access to IT assets provided by IT system may be through one or more APIs. FIG. 3 shows an exemplary system environment 300 including IT system 150, network 225 interconnected through one or more APIs 312, 314, and/or 316 (although the disclosed embodiments may be implemented with one or any number of APIs). In certain aspects, such APIs may provide primary access in and external to a business entity associated with IT system 150. IT system 150 may store relevant data and software that may drive decision making for building services (e.g., financial service provider services). IT system 150 may be configured to provide on-demand access to IT assets through one or more APIs, which may be linked individually, or collectively, to one or more IT assets.

Figure 4:
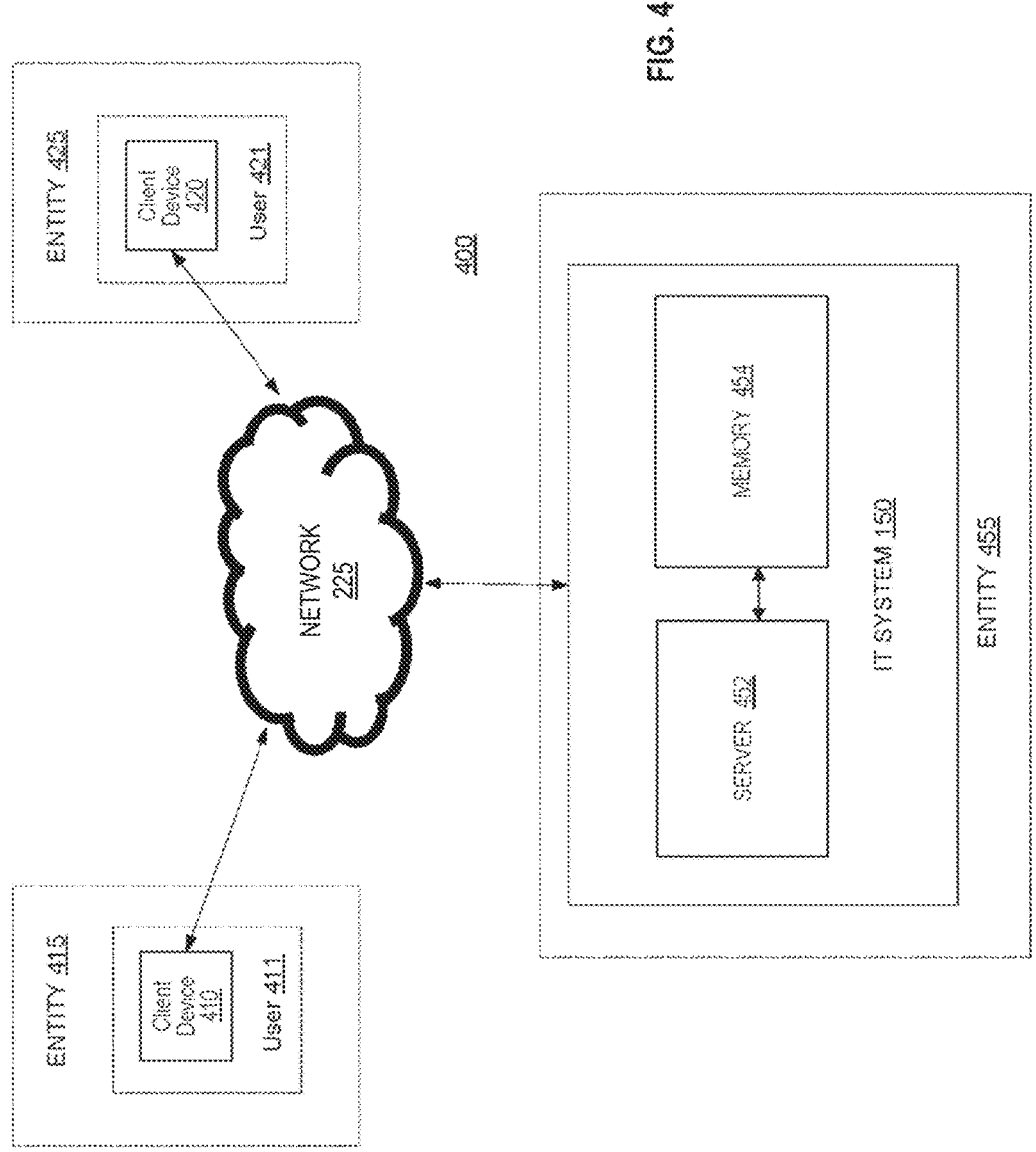
FIG. 4 depicts another exemplary computing environment consistent with the disclosed embodiments.

FIG. 4 shows another exemplary system environment 400 consistent with disclosed embodiments. System environment 400 may include client devices 410 and 420, IT system 150, interconnected by network 425. In certain embodiments, client devices 410 and 420 may be similar in configuration, operation, and functionality as a client 110 described above in connection with FIG. 1. Client device 410 may be associated with a user 411 and client device 420 may be associated with a user 421. IT system 150 in FIG. 4 may be similar in configuration, operation, and functionality as IT system 150 of FIG. 1. In certain exemplary embodiments, although not required, IT system 150 may be associated with a business entity 455. In certain embodiments, business entity 455 may be any type of business entity, such as a financial service provider. For example, business entity 455 may be a commercial bank, an investment bank, a provider of a payment instrument or financial service accounts, etc. In some embodiments, a financial service account may be a check, savings, credit, debit, and/or a reward or loyalty account. In some aspects, a payment instrument may include, but is not limited to, a personal or corporate credit card, a debit card, or check instruments.

Business entity 455 may be an entity that provides accounts that may be used for purchasing goods and/or services, and that, in certain embodiments, be used for purchases associated with one or more merchants. Business entity 455 may be an entity that provides IT services consistent with certain disclosed embodiments. In one aspect, business entity 455 may be a financial service provider that provides financial services to customers, and may provide IT services to one or more business units associated with business entity 455 or external and not affiliated with business entity 455. For example, client device 410 may be a client that is operated by a user 411 who is associated with business entity 415. In one embodiment, business entity 415 may be the same business entity as entity 455, or may be a different entity. Entity 415 may be a business unit or other type of department, organization, etc. associated with business entity 455 (e.g., a card services division, a payment services division, etc.). Entity 425 may be, in this example, a third party business entity in relation to entity 455. For example, entity 425 may be a business that provides mobile applications (apps) for financial service providers or their customers. Client devices 410 and/or 420 need not be associated with a business entity. For example, user 421 may be a user that seeks to access and use IT asserts provided by IT system 150, but has no affiliation with a business entity.

Figure 5:
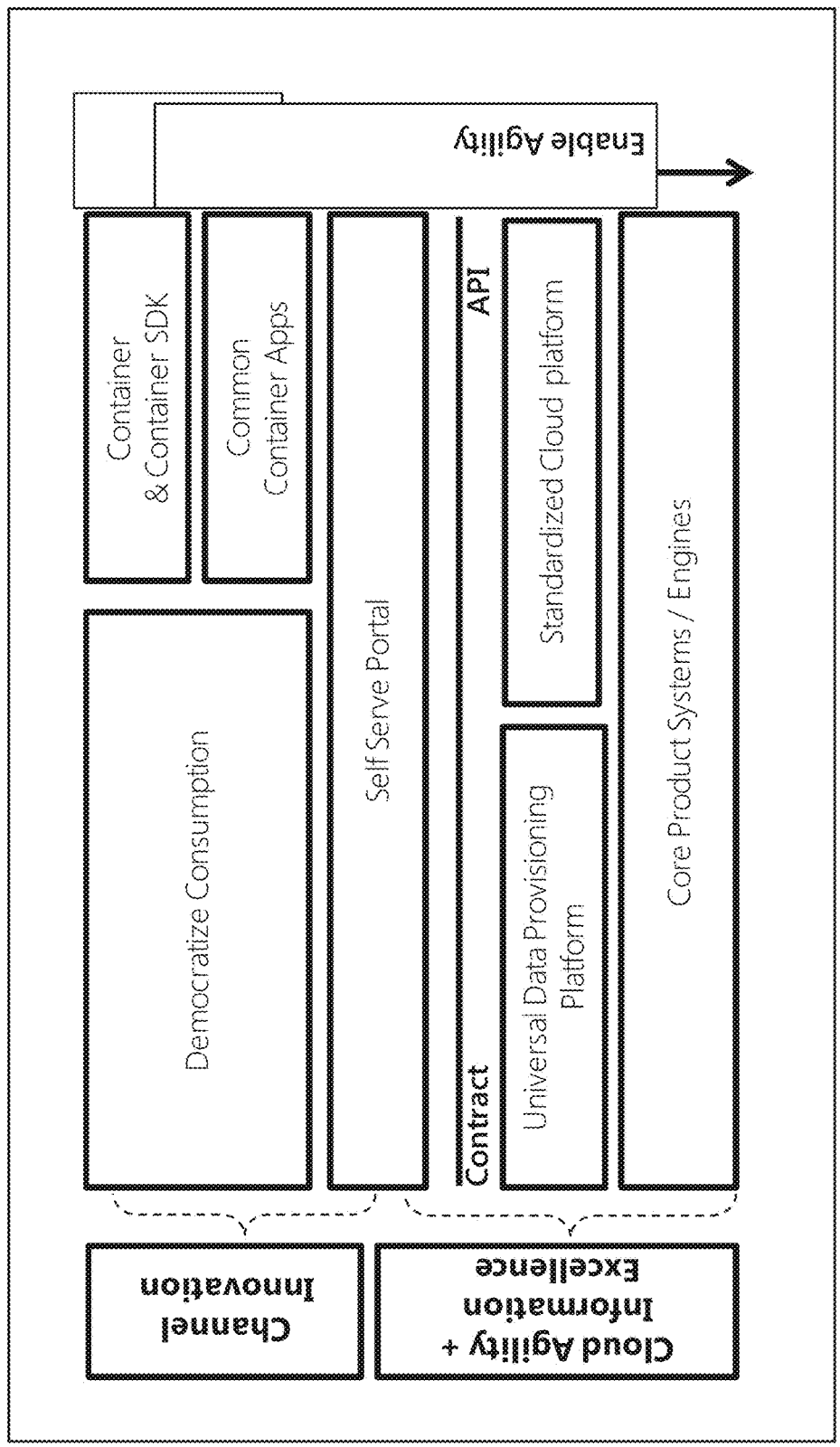
FIG. 5 is an exemplary block diagram of certain aspects regarding the disclosed embodiments.

In certain embodiments, IT system 150 may be configured to provide IT assets in the form of apps that may be configured as core building blocks for larger applications that, when executed, provide IT services used to provide other types of services, such as financial provider services. For example, IT system 150 may generate and store apps that provide granular capabilities that act as the core building blocks, which may be assembled into larger apps that provide services. Such services may provide legendary customer and user experiences (e.g., financial service related services) that are not limited by temporal limitations (e.g., services and assets available at any time), location limitations (e.g., services and assets available from anywhere via the cloud), or device limitations (e.g., services and assets available for different types of client devices). IT system 150 may also provide APIs that may facilitate a standard method of access one or more core engines (e.g., software processes configured to provide core functionalities for certain services) and hide complexities of connecting to the engines. Moreover, in certain aspects, IT system 150 may be configured to provide on-demand infrastructures that allow IT assets, services, operations, and the like to be mobilized, shared, and ported to other systems and services, in a time-efficient manner. The disclosed embodiments enable a business entity associated with IT system 150 to provide IT as a service. In certain aspects, IT system 150 may be configured to control access to IT assets through a number of APIs that may, for example, be configured to limit the variations in their functionalities. Moreover, IT system 150 may, through processes and configurations consistent with disclosed embodiments, provide a controlled environment for users (e.g., internal or external to a business entity associated with IT system 150). In one example, IT system 150 may generate, maintain, and provide container-based architectures and certifications that control consumption of IT assets and how clients may use them. For example, IT system 150 may provide common container apps, SDKs, and the like, that democratize consumption. IT system 150 may also be configured to provide a self-serve portal that provides access, through cloud-based computing, to IT assets. Such a portal may offer access to IT assets through a menu-based (or other formatted access) interface(s). FIG. 5 shows an exemplary block diagram of exemplary features of certain disclosed embodiments consistent with one or more of these features.

In some aspects, certain embodiments may provide processes for requesting, receiving, accessing, using, testing, etc. of IT assets. Users internal or external to a business entity associated with IT system 150 may wish to search for, identify, and gain access to such assets to assist in developing a service for a business, such as a financial service for customers. IT system 150 may be configured to store pre-programmed and configured IT scripts, programs, and the like that may, when executed by a processor, automatically perform IT processes that would typically take conventional approaches a long time to configure for certain services. This, coupled with the on-demand accessibility of such automated IT processes, enable users (including less technologically sophisticated users) to consumer the processes in real-time. For example, a business stakeholder (e.g., a CIO, lead developer, etc.) for a financial service provider may wish to develop a regulatory project associated with a financial service provider project.

Through certain disclosed embodiments, the user may access, through for example a self-serve IT asset store consistent with disclosed embodiments, one or more IT assets to being modeling or executing models to develop, test, and confirm the project. For instance, the business stakeholder may request certain regulation guidelines that may be stored as IT assets by IT system 150 and request proof of concept functions for certain regulation-related concepts. IT system 150 may be configured to automatically determine, based on identified regulation project inquiry responses (e.g., provided by the stakeholder to IT system 150 through an interactive menu-driven interface) regulation guidelines, data or variables, and models that may be needed to authenticate and/or prove the project.

In one example, IT system 150 may provide one or more preconfigured models that may be related to certain regulation project concepts, and automatically identify and/or provide the models to the stakeholder through the portal. In certain embodiments, IT system 150 may run the models using data identified by the stakeholder or by system 150, and provide results of the models. Alternatively, IT system 150 may provide access to IT assets that enable the stakeholder to generate, develop, build and run a model that may be customized for the desired regulatory project, based on core engine capabilities that may be reusable by other systems or users.

As another example, a user associated with a client external to a business entity associated with IT system 150 (e.g., user 421, client device 420, entity 425), may wish to develop, test, prove, and/or perform other tasks for a new payment app for a financial service provider service. In this example, the user may request access to one or more IT assets that will facilitate those needs through the online portal provided by IT system 150. For instance, the user may request IT assets in the form of transaction data to test the operation of the payment app under development. IT system 150 may perform processes that authenticate and determine authorization to such information by the user (e.g., credential testing, associate partnership agreements, etc.). IT system 150 may provide the data to the user (e.g., via client device 420, APIs, network 425, etc.). Alternatively, or in addition, IT system 150 may provide IT assets in the form of app test processes that allow the user to not only develop the app and configure a test script for the app, but also run tests on the app using data provided by IT system 150. In certain aspects, IT system 150 may provide access to knowledge engines and models that user can leverage to refine the design of the app to maximize the effectiveness of the app. In other embodiments, IT system 150 may offer IT assets that automate production of the app. This may include, for example, access to references (links, etc.) to other IT services that the user may access to complete production of the app.

IT system 150 may be configured to execute processes that monitor the access and use of IT assets. It may perform metering processes that determine the number, types, and the like of IT assets requested and accessed by users, and determine, if applicable, appropriate fees for such access and use. IT system 150 may be configured to determine costs for access to one or more IT assets, and provide interfaces, reports, and automated payment services, for charging the fees and, in some embodiments, collecting payment for such fees. For example, IT system 150 may execute software that generates shopping art information when a client request access to one or more IT assets, and upon payment, provides the IT assets (or access thereto). Other forms of metering access to IT assets consistent with the disclosed embodiments may be implemented and provided.

Figure 6:
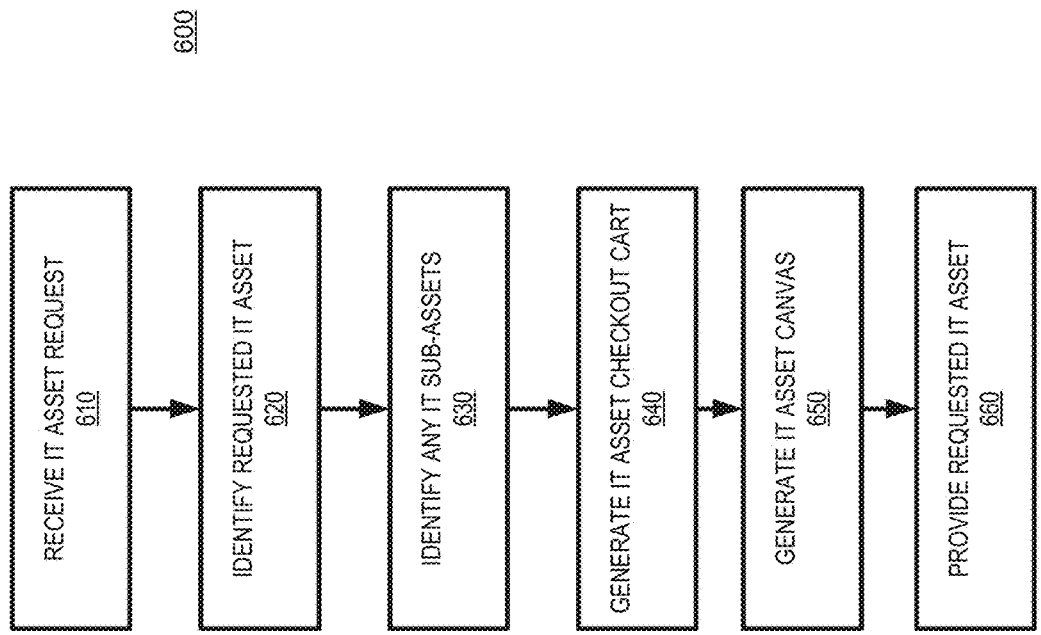
FIG. 6 is a flowchart of an exemplary IT asset process consistent with disclosed embodiments.

FIG. 6 is a flowchart of an exemplary IT asset process consistent with disclosed embodiments. In one example, IT system 150 may receive an IT asset request (e.g., in step 610). The request may come from a client (e.g., client 110, 210, 220, 410, and/or 420). In certain embodiments, the request may be received during an online session between the client and IT system 150's online portal (e.g., self-serve IT asset store). A user operating the client may select on an interface provided via the portal one or more IT assets. Based on the request, IT system 150 may execute processes that automatically identify the requested IT asset(s) (e.g., in step 620). In one example, the identified IT asset may be directly related to the IT asset identified in the IT asset request. In other embodiments, IT system 150 may determine one or more IT assets that best relate to the request received by the client. In certain embodiments, IT system 150 may also identify any IT sub-assets of the identified IT asset (e.g., in step 630). An IT sub-asset may be an IT asset that is related to, required by, or suggested for operation with, another IT asset. For example, an IT sub-asset may be a particular script or macro software program that is required to allow another program identified as the primary IT asset identified by IT system 620. Other examples of an IT sub-asset may include an API, model, test script, html programs, or the like.

In certain aspects, IT system 150 may perform processes that generate an IT asset checkout cart (e.g., in step 640). For example, IT system 150 may track the IT asset(s) and/or sub-assets that have been identified, and determine a fee, cost, or other form of metering value, for the identified assets. For example, IT system 150 may be configured to assign monetary fee values for IT assets and sub-assets that are requested by a user who is external to the business entity associated with IT system 150. In certain aspects, IT system 150 may determine not to charge a monetary fee for the same identified assets and sub-assets when requested by a user (and client) associated with the business entity related to IT system 150. The disclosed embodiments are not limited to any particular manner of metering access to IT assets and one of ordinary skill in the art would appreciate that the disclosed embodiments may implement other ways of charging fees or tracking access and use to IT assets.

In another embodiment, IT system 150 may be configured to generate and provide an IT asset canvas (e.g., in step 650). In certain aspects, an IT asset canvas may be a representation of IT assets and their relationship to other IT assets based on the type of use for those assets. For example, IT system 150 may determine based on the identified IT assets and/or sub-assets, and from input from the requesting user regarding a scope of use for the requested assets (e.g., regulatory project, app development, etc.), a relationship canvas that links the IT assets to functionalities, use, and capabilities, to each other and other assets not requested by the user. IT system 150 may be configured to generate and provide an interface that provides a graphically representation of the canvas showing the relationships between the requested and unrequested assets. In certain aspects, IT system 150 may execute software that generates recommendations for the unrequested assets with explanations for their need, requirement, and/or suggested need or use. IT system 150 may generate content reflecting the recommendations (and/or canvas) that is provided for display in an interface to the client of the user.

IT system 150 may also provide access to, or provide, the identified IT assets and/or sub-assets (e.g., in step 660). In certain embodiments, IT system 150 may electronically transmit the identified IT assets and/or sub-assets to the client requesting the IT asset(s). In other embodiments, IT system 150 may provide a link that when selected by the user via the client, provides access to the IT asset(s). In other embodiments, IT system 150 may provide access to IT assets in the form of executable programs (e.g., test scripts, production processes, development or design applications, etc.) that allow the user via the client to configure and run IT assets through IT system 150 remotely over the interconnecting network between IT system 150 and the client.

Figure 7:
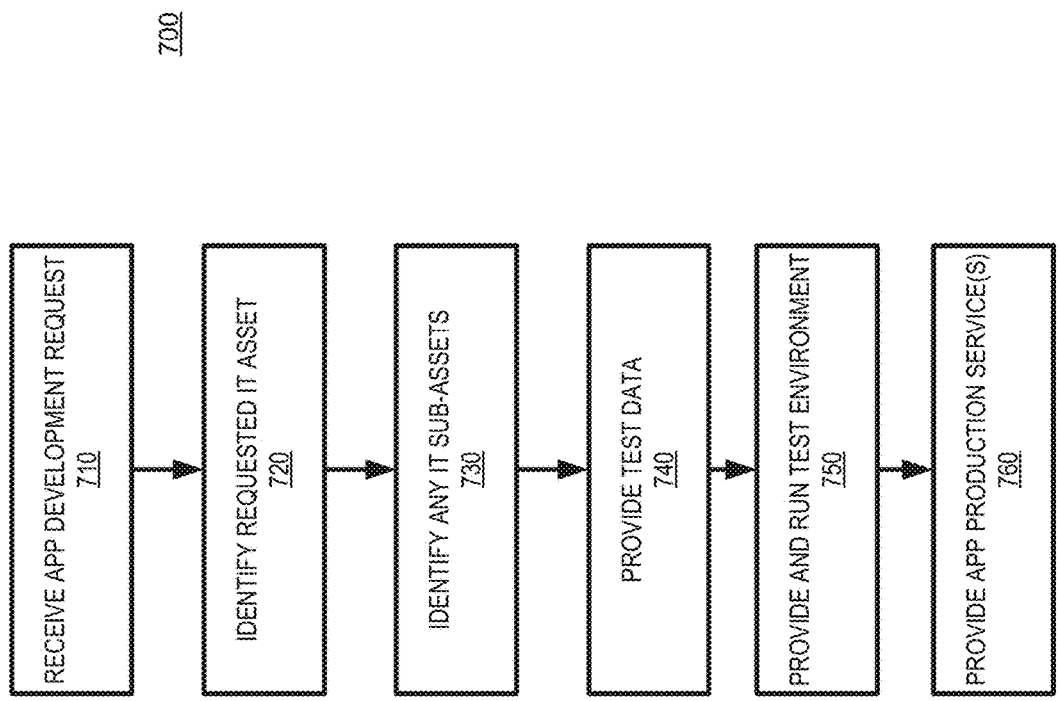
FIG. 7 is a flowchart of an exemplary app development IT asset process consistent with disclosed embodiments.

For example, FIG. 7 shows a flowchart of an exemplary app development IT asset process consistent with disclosed embodiments. In one aspect, steps 710-730 may be similar to process steps 610-630 of FIG. 6, but based on the example of an app development project. In this exemplary embodiment, IT system 150 may also provide test data (e.g., in step 740) that may be used by the user (via the client) to test functionality etc. of the app under development, which may be based on the identified IT assets (e.g., identified via steps 710-730). For example, IT system 150 may provide data that may be automatically or manually configured into an IT asset for running a test associated with the app under development. In addition, consistent with the examples mentioned above, IT system 150 may be configured to provide and run a test environment (e.g., in step 750) for performing the test of the app based on the test data. In further embodiments, IT system 150 may also provide an app production service that may provide services, or access to services, that enable the requesting user to refine and complete production and launch of the developed app (step 760).

Figure 8:
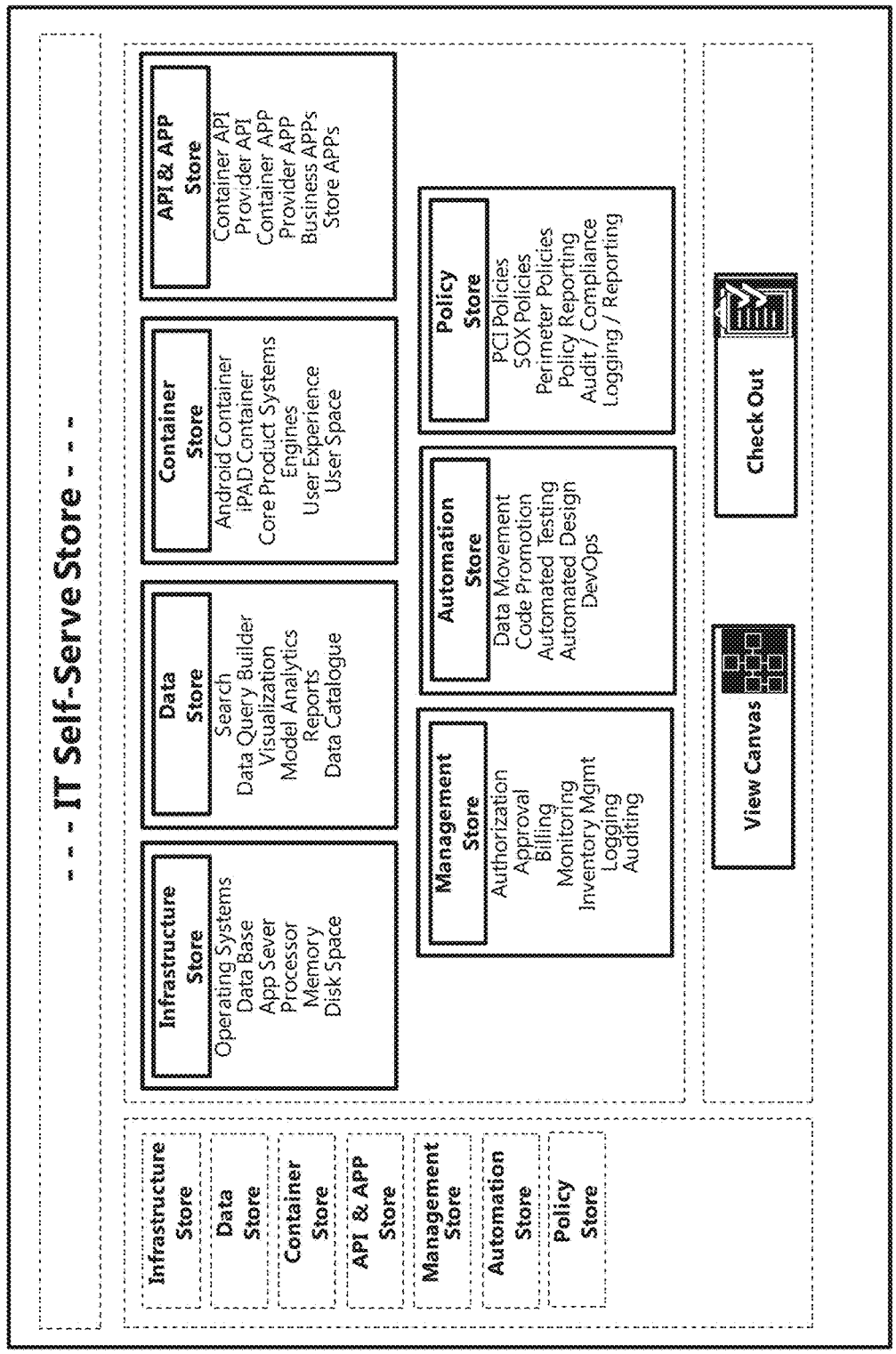
FIG. 8 depicts an exemplary interface for an IT self-serve store consistent with disclosed embodiments.

FIG. 8 shows an exemplary interface of an exemplary self-serve IT asset store consistent with disclosed embodiments. In one embodiment, IT system 150 may provide an interface through an online portal that includes one or more options for selecting one or more IT assets. For example, as shown in FIG. 8, the interface may include different categories (e.g., infrastructure store, data store, container store, API and APP store, Management store, Automation store, and Policy store) of IT assets that may be selected by a user via a client (e.g., client 110 display the interface through a browser or similar software executing on the client). Each category may include one or more IT assets (and sub-assets) that relate to IT services, operations, functionalities, etc. associated with the category. For instance, IT system 150 may provide a container store category that includes one or more software containers that a user may select to use for a particular use case. IT system 150 may provide a Policy store that includes data and features regarding policies, such as payment card industry (PCI) policies. The exemplary API and app store category may include different APIs that a user may select to use for certain use cases. For instance, an application developer may select one or more APIs from the API and app store to use in developing an app. Also in that category may be one or more apps that may be used as core applications that may be built upon by the developer.

The Automation store category may include IT assets that provide automated processes that may be used by a user remotely through the network connecting the client with IT system 150. For example, IT system 150 may provide automated design IT assets, automated testing IT assets, and "DevOps," which may be a production development IT asset that provides features that allow a user to develop and move to production an app under development. IT system 150 may also provide a management store category that includes IT assets relating to managing a business, such as workflows regarding approval, billing, inventory management, and the like. IT system 150 may also provide an infrastructure store that may include IT assets relating to infrastructure assets, such as memory, server functionalities, etc. For instance, IT system 150 may provide access to operating system software, patches, and the like that a user may access, load, and/or use (via the client) for certain service-related reasons.

IT system 150 may also provide a data store category that includes IT assets that provide data, information, models, reports, reporting software, etc. that may be used by a user (via the client). For example, a user may request and access or obtain data relating to financial service transactions for testing, proving, and/or designing a transaction payment app. IT system 150 may provide a data catalogue that may include a user-friendly catalog of different use-case data that a user may select based on categories (e.g., data for purchase transactions, data segmented based on customer demographics, data segmented based on transaction types, transaction size (amount of purchase, transfer, etc.).

In some aspects, an application developer may access the self-serve IT store provided by IT system 150 and obtain apps, APIs, widgets, and other IT assets that may be assembled by an application developer (e.g., user 211) to develop, test, benchmark, and provision mobile apps. The mobile apps may, for example, be capable of providing a particular customer and/or user experience when executed by communications devices implementing various operating systems (e.g., iOS™, Android™, BlackBerry OS™, etc.) and various web browsers (e.g., Internet Explorer™, Safari™, Chrome™, etc.).

In certain embodiments, and prior to accessing the self-serve IT store, the application developer (e.g., user 211) may provide one or more authentication credentials (e.g., a user name, password, biometric credential, etc.) as input to a web page or other graphical user interface (GUI) associated with IT system 150 and presented by a device (e.g., client device 210). Client device 210 may, in some aspects, be configured to transmit the received authentication data to IT system 150. IT system 150 may access profile data associated with user 211, and based on one or more compliance and permissioning policies associated with user 211 and/or the self-serve IT store, IT system 150 may selectively grant user 211 permission to access to the self-serve IT store, to access different of IT assets within the self-serve IT store (e.g., the infrastructure store, the data store, the container store, the API and APP store, Management store, Automation store, and Policy store), and additionally or alternatively, to access specific types of IT assets or specific IT assets within the individual categories.

In certain instances, based on the accessed profile data and one or more of the compliance and permissioning policies, IT system 150 may determine that user 211 lacks the ability to access the self-serve IT store. For example, user 211 may be a new hire within an organization or other business entity, and may lack status within the business entity sufficient to access the self-serve IT asset store. In other example, user 211 may be associated with a prior violation of terms and conditions associated with the self-serve IT asset store, and IT system 150 may suspend user 110's ability to access the self-serve IT asset store for a certain time period. In some aspects, upon determination that user 211 is unable to access the self-serve IT asset store, IT system 150 may transmit a notification to device 210 that indicates the lack of access, which device 21 may render for presentation to user 211.

In other instances, IT system 150 may allow user 211 to access only certain categories of IT assets available within the self-serve IT asset store. By way of example, based on the accessed profile data and one or more of the compliance and permissioning policies, IT system 150 may determine that user 211 has permission to access certain categories of IT assets (e.g., the infrastructure store, the data store, the container store, and/or the API and APP store), but may be unable to access other categories of IT assets (e.g., the Management store, the Automation store, and/or the Policy store). In certain aspects, IT system 150 may be configured to transmit data to device 210 that indicates user 211's ability to access the self-serve IT asset store and identifies the categories of IT assets available to user 211. Device 210 may be configured to render and present the interface corresponding to the self-serve IT asset store, and may populate the self-serve IT asset store with only those categories of IT assets available to user 211.

Further, in some aspects, IT system 150 may grant user 211 permission to access only specific assets or types of assets within a particular category of IT assets available within the self-serve IT asset store. For example, and based on the accessed profile data and one or more of the compliance and permissioning policies, IT system 150 may grant user 211 permission to access the Data Store within the self-serve IT asset store, but may block user 211's access of any customer data and/or IT assets related to analytics or reporting within the Data Store (e.g., "Model Analytics" and/or "Reports"). In some aspects, IT system 150 may be configured to transmit data to device 210 indicative of the specific assets and/or asset types available to user 211 within a corresponding category of IT assets. Upon receipt of the transmitted data (and additionally or alternatively, upon detection of an attempt by user 211 to access the corresponding category of IT assets), device 210 may present the available assets and/or asset types within the interface of the self-serve IT asset store. In other aspects, however, device 210 may be configured to present to user 211 all assets and asset types associated with a specific category of IT assets within the self-serve IT asset store, and to render and present an error message when user 211 attempt to access a prohibited asset or asset type.

In the embodiments described above, IT system 150 may be configured to determines grant user 211 permission to access to the self-serve IT store, to access different of IT assets within the self-serve IT store, and additionally or alternatively, specific types of IT assets or specific IT assets within the individual categories. In other aspects, however, device 210 may be configured to store user profile data and the one or more compliance and permissioning policies, and may configured to grant permission to user 211 to access any combination of the self-serve IT asset store, categories of IT assets, and/or specific assets or asset types independently of IT system 150 and/or in conjunction with IT system 150.

In an embodiment, the apps, APIs, widgets, and other IT assets may provide a corresponding granular functionality when executed and rendered by a client device (e.g., client device 210). Thus, in some instances, the application developer may identify subsets of these IT assets for re-use in mobile aps that provide different customer and user experiences. In some aspects, to facilitate the application developer's ability to reliably and robustly re-use IT assets over time and across multiple customer experiences, IT system 150 may be configured to perform certification processes that govern a quality and resilience of apps, widgets, and other IT assets proposed for inclusion in the self-serve IT asset store. Further, in other aspects, IT system 150 may perform processes that register certified IT assets (e.g., apps, APIs, widgets, etc.) for inclusion within the self-serve IT store and establish an availability of these registered IT assets for consumption by application developers and other users.

In some embodiments, IT system 150 may certify a candidate IT asset (e.g., a candidate app) for inclusion within the self-serve IT asset store based on a performance of the app when subjected to a predetermined set of test cases. For example, the predetermined set of test cases may be associated with input and/or configuration data that mimics an operational state of a client device during execution of the candidate app, and further, may be associated with predetermined outcomes. Furthermore, IT system 150 may establish the predetermined test cases, and the corresponding input and/or configuration data, based on a performance of previously certified IT assets on various device platforms, and/or based on peer input identifying bugs or other instances of asset failure.

In certain aspects, IT system 150 may perform processes that execute the candidate app using the input and/or configuration data associated with each of the predetermined set of test cases, and that determine whether to certify the candidate app based on a comparison of the outcomes obtained from the executed apps and corresponding ones of the predetermined outcomes. By way of example, IT system 150 may certify the candidate app for inclusion in the self-serve IT asset store when at least a threshold portion of the obtained outcomes correspond to the predetermined outcomes. IT system 150 may establish the threshold portion as 100% of the predetermined outcomes, 90% of the predetermined outcomes, or any additional or alternate portion of the predetermined outcomes sufficient to establish a quality, stability, and resilience of IT assets despite their evolution over time.

In further aspects, IT system 150 may certify the candidate app for inclusion within the self-serve IT asset store based on a peer review of the performance of candidate app on one or more device and browser platforms. Additionally or alternatively, IT system 150 may certify the candidate app based on review of the quality of the uncompiled code associated with the candidate app. For instance, the certification of the candidate app for inclusion in the self-serve IT asset store may require not only robust and reliable performance across a variety of device and browser platforms, but may require that the candidate app's underlying code comply with at least a minimum standard of quality deemed appropriate by peer review. In other aspects, IT system 150 may certify the candidate app based on the quality, scope, and/or coverage of the predetermined set of test cases. By way of example, IT system 150 may ensure predetermined test cases simulate range of expected operating conditions across a variety of device and browser platforms.

In some aspects, IT system 150 may establish and provide to users (e.g., "peer" users) standardized tools and services that facilitate a consistent peer review of candidate apps, APIs, widgets, and other IT assets. For example, IT system 150 may provide, to the peer users, fully documented software development kits (e.g., SDKs), published sets of test data, standardized and consistent environments to perform peer review and testing, and/or a published and functional test "harness" that facilitates testing in the provided environments.

As described above, IT system 150 may perform processes that certify IT assets for registration in the self-serve IT asset store and consumption by application developers. In some aspects, the certified IT assets may include executable apps and widgets. In other aspects, however, the certified IT assets may also include APIs that facilitate a consistent exchange of data between apps executed by a client device, between containers stored on the client device, and between various devices and systems connected across network 225. In certain embodiments, an API manager of IT system 150 (e.g., a lightweight server in communication with IT system 150 or a software-based service provided by IT system 150) may be configured to perform the exemplary processes outlined above to provide robust and reliable APIs for inclusion within the self-serve IT asset store and consumption by application developers.

In some embodiments, IT system 150 may provide APIs within that self-serve IT asset store that facilitate a functionality of containers and corresponding container-based apps, widgets, and other IT assets (e.g., container APIs). By way of example, container APIs consistent with the disclosed embodiments may provide interfaces that facilitate and simplify interactions with between containers, between container-based apps and other apps or containers, and further, between containers or container-based apps and device-specific capabilities (e.g., an on-board camera, a global positioning system (GPS), etc.). APIs consistent with the disclosed embodiments also include channel APIs that provides interfaces enabling apps to consume capabilities and services provided by the business entity or financial institution associated with IT system 150 and/or other systems accessible to a client device (e.g., client device 210) across network 225. Further, in additional embodiments, IT system 150 may provide product and customer system APIs that enable apps, widgets, and other IT assets to access computer systems and servers associated with products, services, and customers of the business entity or financial institution associated with IT system 150, other business entities, and/or other financial institutions.

The disclosed embodiments also enable a business entity associated with IT system 150 to provide information and application development tools as "services" that enable application developers to rapidly and robustly develop and deploy mobile applications and other IT assets for execution on various computing platforms (e.g., iOS™ devices, Android™ devices, etc.). For instance, and as described above, IT system 150 may be configured to control access to IT assets through a number of APIs that may, in some examples, be configured to limit the variations in their functionalities. Moreover, IT system 150 may, through processes and configurations consistent with disclosed embodiments, provide a controlled environment for users (e.g., users internal or external to a business entity associated with IT system 150). In other aspects, IT system 150 may generate, maintain, and provide frameworks, architectures, and certifications that control consumption and client usage of mobile applications (e.g., "apps"), widgets, and other IT assets. For example, IT system 150 may provide common container apps, software development kits (SDKs), and other information and application development tools that democratize consumption of IT assets. IT system 150 may also be configured to provide a self-serve portal that provides access, through cloud-based computing, to IT assets (e.g., a self-serve IT asset store). Such a portal may offer access to IT assets through a menu based (or other formatted access) interface(s).

Figure 9:
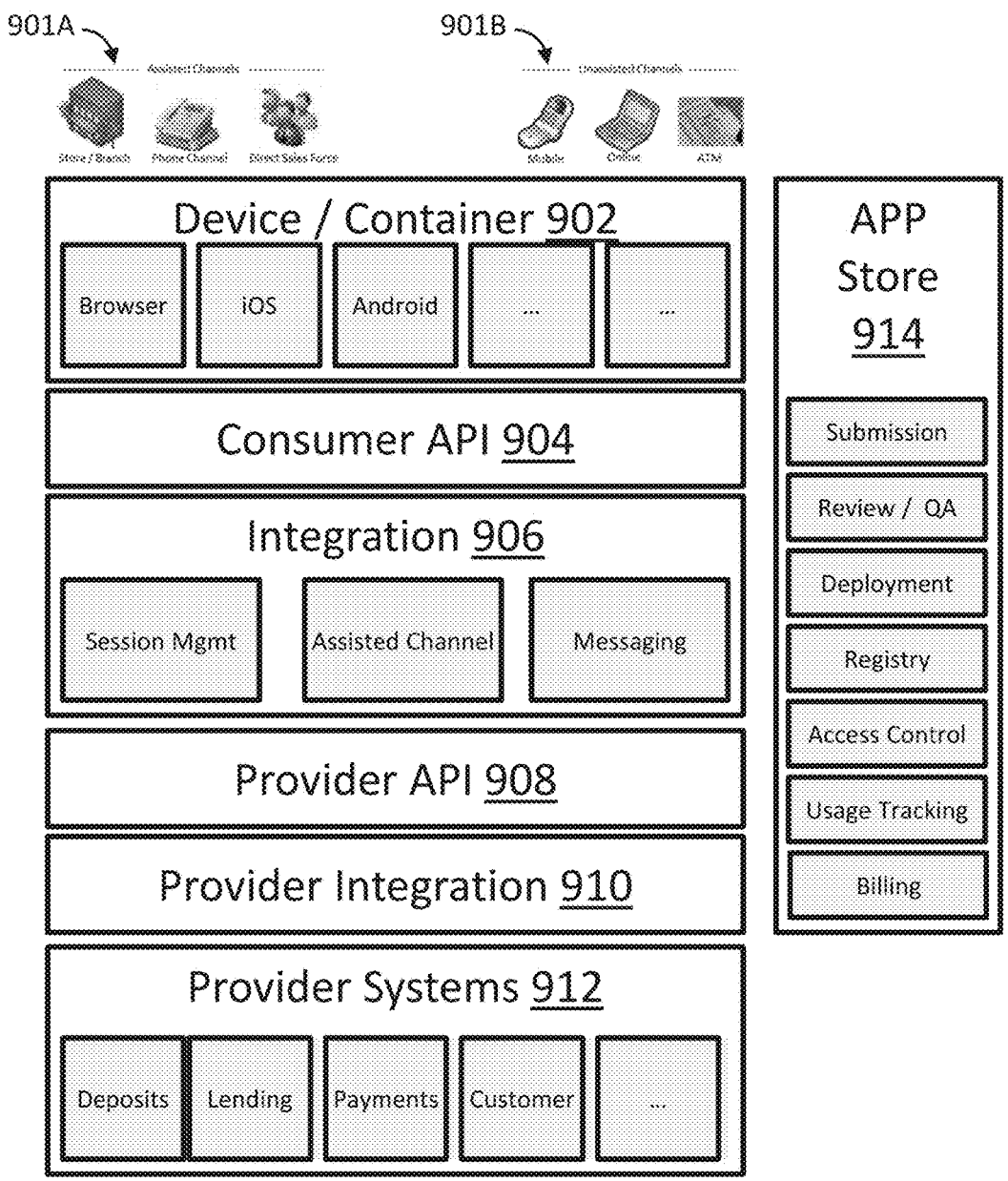
FIG. 9 is an exemplary block diagram of certain aspects regarding the disclosed embodiments.

In certain aspects, frameworks and architectures consistent with the disclosed embodiments may incorporate containers that provide run-time environments for the mobile apps and other IT assets, which interact with systems of various business entities (e.g., IT system 150), devices (e.g., client devices 210 and 220), and other containers using consistent application programming interfaces (APIs). FIG. 9 is a block diagram illustrating features of an exemplary framework 900 that facilitates the development, consumption, and deployment of mobile apps and other IT assets, in accordance with disclosed embodiments. In some aspects, the elements of framework 900 may be implemented by one or more the client devices (e.g., client devices 110, 210, and/or 220), intermediate nodes (e.g., intermediate node 120), and IT systems (e.g., IT system 150) interconnected within the computing environments (e.g., environments 100 and 200) of FIGS. 1 and 2.

In FIG. 9, framework 900 may include one or more application containers stored on a client device (e.g., client device 210) that manage an interaction of a consumer with client device 210. For instance, an application container stored on client device 210 may include instructions, scripts, and other code (e.g., HTML5, CSS and/or JavaScript) that, when executed by a processor, manage a consumer's interaction with client device 210 through an assisted channel 901A and/or an unassisted channel 901B.

By way of example, assisted channels consistent with the disclosed embodiments may include, but are not limited to, a retail location associated with a business entity, a branch of a financial institution, a phone channel or call center associated with the business entity or financial institution, and/or a direct sales force associated with the business entity or the financial institution. In other instances, unassisted channels consistent with the disclosed embodiments may include, but are not limited to, a mobile communications channel, a wireless communications channel (e.g., WiFi or other wireless LAN), and a communications channel facilitated by a user's interaction with an automated teller machine (ATM).

In certain aspects, a container may operate on a particular client device (e.g., client device 210), and may be specific to client device 210, and additionally or alternatively, to applications executed by client device 210 (e.g., various web browsers or operating systems). For instance, containers consistent with the disclosed embodiments may be specific to mobile communications devices executing operating systems that include, but are not limited to, iOS™, Android™, and/or a BlackBerry OS™. In other aspects, containers consistent with the disclosed embodiments may be specific to devices executing browsers that include, but are not limited to, an Internet Explorer™ browser, a Chrome™ browser, a Firefox™ browser, and/or a Safari™ browser.

Furthermore, containers consistent with the disclosed embodiments may provide a run-time environment and a set of common services for apps, APIs, and other IT assets. For instance, a container may be associated with a container specification that establishes instructions, scripts, and other executable code that facilitate an execution of an app or other IT asset by a supported client device (e.g., client device 210) or a browser executing on client device 210. In some aspects, the container specification may be established wholly or partially by a business entity or financial institution associated with IT system 150.

In certain aspects, apps and other IT assets that adhere to the container specification may access a consistent set of common capabilities on the supported device. By way of example, common capabilities consistent with the disclosed embodiments may include, but are not limited to, processes that allow apps to register and login into a corresponding container, to access local cache as well as session information and attributes, and to access device specific capabilities (for example, GPS, accelerometer, and camera).

Referring back to FIG. 9, container-based framework 900 also includes a consumer API 904, an integration system 906, a provider API 908, provider integration processes 910, provider systems 912 (e.g., associated with a financial institution and providing information associated with customers and corresponding deposits, lending, and payment), and app store 914. In some aspects, client device 210 may store and execute consumer API 904 to receive, process, and format for integration requests for information and/or services received from one or more executed apps. For instance, consumer API 904 may include programming interfaces that support message formulation (e.g., by providing access to JSON or XML interfaces), that support message composure and generation (e.g., REST and/or SOAP messages), and that send and/or receive messages (e.g., an HTTP API). In other aspects, browser-compatible code and scripts (e.g., Javascript) may establish the consumer API, which client device 210 may implement in conjunction with a web browser (e.g., as a plug-in, etc.).

In certain aspects, integration system 906 may receive requests for information and/or services from client device 210 through consumer API 904, and may be configured to perform session management, authentication, and messaging functions associated with the received requests and/or destinations of the received requests. For instance, integration system 906 may correspond to an intermediate node (e.g., intermediate node 120) that connects client device 210 to IT system 150. Further, in some aspects, integration system 906 may perform load-balancing operations that route the received requests to appropriate computer systems and servers associated with a destination. Integration system 906 may also be configured to perform processes that address cross-cutting concerns, and further, that perform messaging and queuing services that guarantee the received request are delivered to the appropriate destination computer systems or servers. In additional aspects, integration system 906 may modify the received requests to conform to one or more canonical data models (e.g., associated with common data requests for customer or transaction information).

Integration system 906 may, for example, route the received requests to a corresponding destination system or server (e.g., one or provider systems 912) through corresponding provider API 908. In some aspects, provider API 908 may receive requests for data or services from integration system 906, and may simplify and normalize access to provider systems 912, which may service the requests and provide the requested data or services to client device 210. As described above, provider API 908 may include programming interfaces that support message formulation (e.g., by providing access to JSON or XML interfaces), that support message composure and generation (e.g., REST and/or SOAP messages), and that send and/or receive messages (e.g., an HTTP API). In further aspects, a lightweight application server (not depicted in FIG. 9) associated with the corresponding one of provider systems 912 may execute instructions and scripts (e.g., Java code) to establish provider API 908 at the corresponding one of the provider systems 912.

In additional embodiments, the lightweight application server and/or the corresponding one of the provider systems 912 may execute instructions to perform provider integration processes 910 in response to the request processed by provider API 908. In an embodiment, provider integration processes 910 may access a portion of the requested data stored by the corresponding one of provider systems 912 or legacy systems associated with provider systems 912, and may return the accessed data to client device 210 as a response to the request. For instance, upon obtaining the requested data portions from provider systems 122 and/or the associated legacy systems, the lightweight application server and/or the corresponding one of the provider systems 912 may be configured to transmit the requested data portion across network 225 to client device 210 via provider API 908 and integration systems 906. Consumer API 904 may receive the transmitted data portion, and process and/or format the received data portion for presentation to user 211 and/or user by one or more additional apps executed by client device 210.

Figure 10A:
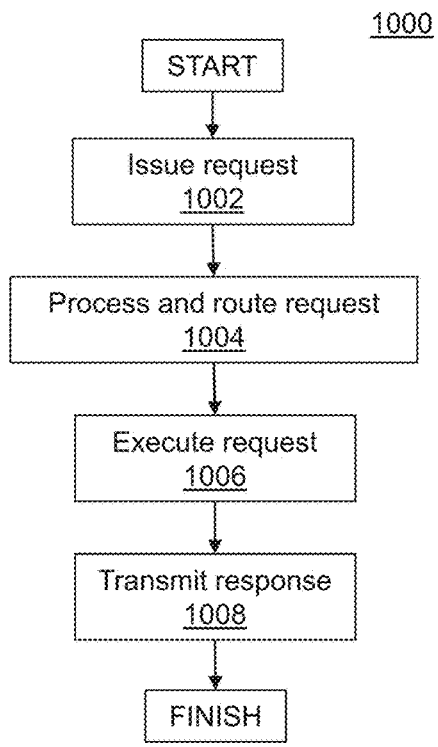
FIGS. 10A and 10B are flowcharts of exemplary IT asset processes consistent with disclosed embodiments.

FIG. 10A illustrates an exemplary process 1000 for generating, processing, and routing requests for data or services within container-based framework 900, in accordance with disclosed embodiments. For example, a customer (e.g., user 211) may access a web page associated with a financial institution via a client device (e.g., client device 210), and may navigate to a corresponding portion of the web page to request a current account balance. In some instances, a mobile app compatible with client device 210 and an executed web browser (e.g., an app associated with container and device 902) may issue a request to obtain account balance information for the customer from a system associated with the financial institution (e.g., in step 1002).

In step 1004, a consumer API executed by client device 210 (e.g., consumer API 904) may process and route the issued request across network 225 to an appropriate provider system capable of servicing the request (e.g., to a corresponding one of provider systems 912 or to a server associated with the corresponding one of provider systems 912, which perform provider integration services 910). In some instances, consumer API 904 may route the issued request to an integration system (e.g., integration system 906) for customer authentication and other messaging and session management services.

Upon receipt of the issued request by the corresponding provider system 912 (or the associated server), corresponding provider system 912 (or the associated server) may perform provider integration services 910 and execute the request to identify and obtain at least a portion of the information associated with the issued request (e.g., in step 1006). In some instances, the obtained data portion may be obtained from a data repository associated with the corresponding provider system 912, and additionally or alternatively, from a legacy system, server, or data repository associated with corresponding provider system 912. The disclosed embodiments may be further configured to provide the requested information (e.g., the account balance information) to client device 210 for presentation to user 211, and additionally or alternatively, for use by another executed app (e.g., in step 1008). For instance, the provider integration services performed by corresponding provider system 912 or the associated server may transmit the requested information to consumer API 902 of client device 210, or alternatively, transmit the requested information to integration system 906, which may perform one or more session management or messaging services prior to transmitting the requested information to consumer API 902. Exemplary method 1000 is then complete.

Figure 10B:
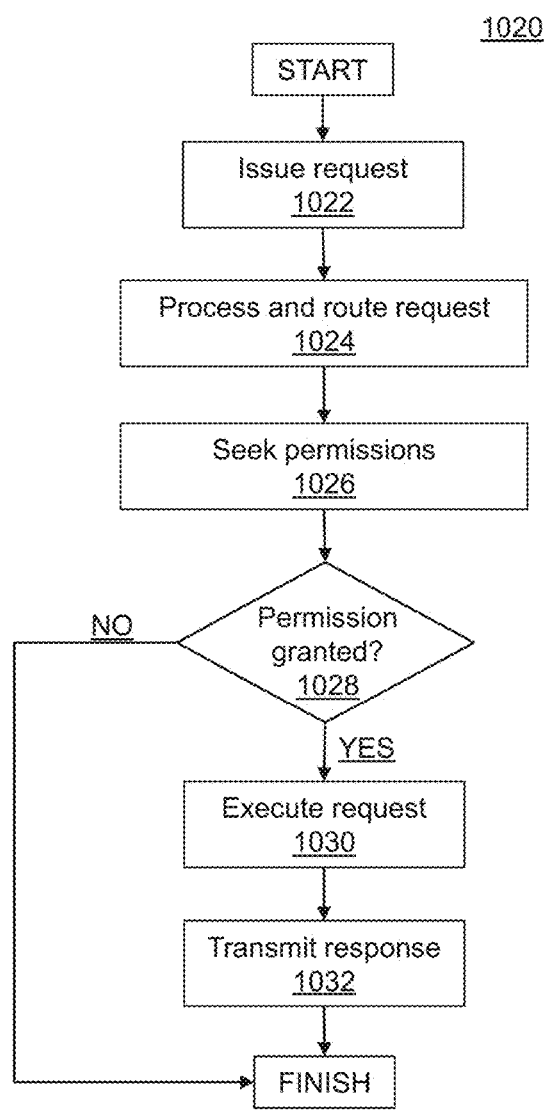

FIG. 10B illustrates an exemplary process 1020 for generating, processing, and routing requests for data or services within container-based framework 900, in accordance with disclosed embodiments. For example, an employee of a financial institution may access web page interface associated the financial institution through a tablet computer (e.g., client device 220), and in response to a conversation with a customer, submit a balance inquiry on behalf of the customer. In some instances, a mobile app compatible with client device 220 and an executed web browser (e.g., an app associated with container and device 902) may issue a request to obtain account balance information on behalf of the customer from a system associated with the financial institution (e.g., in step 1022).

In step 1024, a consumer API executed by client device 210 (e.g., consumer API 904) may process and route the issued request across network 225 to integration system 906. Integration system 906 may, in some instances, determine whether the a system associated with the financial institution (e.g., a corresponding one of provider systems 912) or IT system 150 permits the employee to access the customer's account information and obtain a current account balance on behalf of the customer (e.g., in step 1026). In some aspects, integration system 906 may determine whether the employee is permitted to access the customer's account data based on profile data associated with the customer and/or the employee, which may identify one or more customer-specified access permissions. In other aspects, integration system 906 may determine whether the employee is permitted to access the customer's account data based on default permissions associated with the customer or the employee.

If integration system 906 were to determine that the employee lacks permission to access the customer's account data (e.g., step 1028; NO), then exemplary method 1020 is complete. In some aspects, integration system 906 may provide an error message to consumer API 904 for presentation on client device 210.

If, however, integration system were to determine that the employee is permitted to access the customer's account data (e.g., step 1028; YES), integration system 906 may route the issued request to appropriate provider system capable of servicing the request in step 1030. For instance, the appropriate provider system may include a corresponding one of provider systems 912 or to a server associated with the corresponding one of provider systems 912, which performs provider integration services 910.

Upon receipt of the issued request by the corresponding provider system 912 (or the associated server), corresponding provider system 912 (or the associated server) may perform provider integration services 910 and execute the request to identify and obtain at least a portion of the information associated with the issued request (e.g., in step 1030). In some instances, the data portion may be obtained from a data repository associated with the corresponding provider system 912, and additionally or alternatively, from a legacy system, server, or data repository associated with corresponding provider system 912. The disclosed embodiments may be further configured to provide the requested information (e.g., the account balance information) to client device 210 for presentation to user 211, and additionally or alternatively, for use by another executed app (e.g., in step 1032). For instance, the provider integration services performed by corresponding provider system 912 or the associated server may transmit the requested information to consumer API 902 of client device 210, or alternatively, transmit the requested information to integration system 906, which may perform one or more session management or messaging services prior to transmitting the requested information to consumer API 902. Exemplary method 1020 is then complete.

Figure 10C:
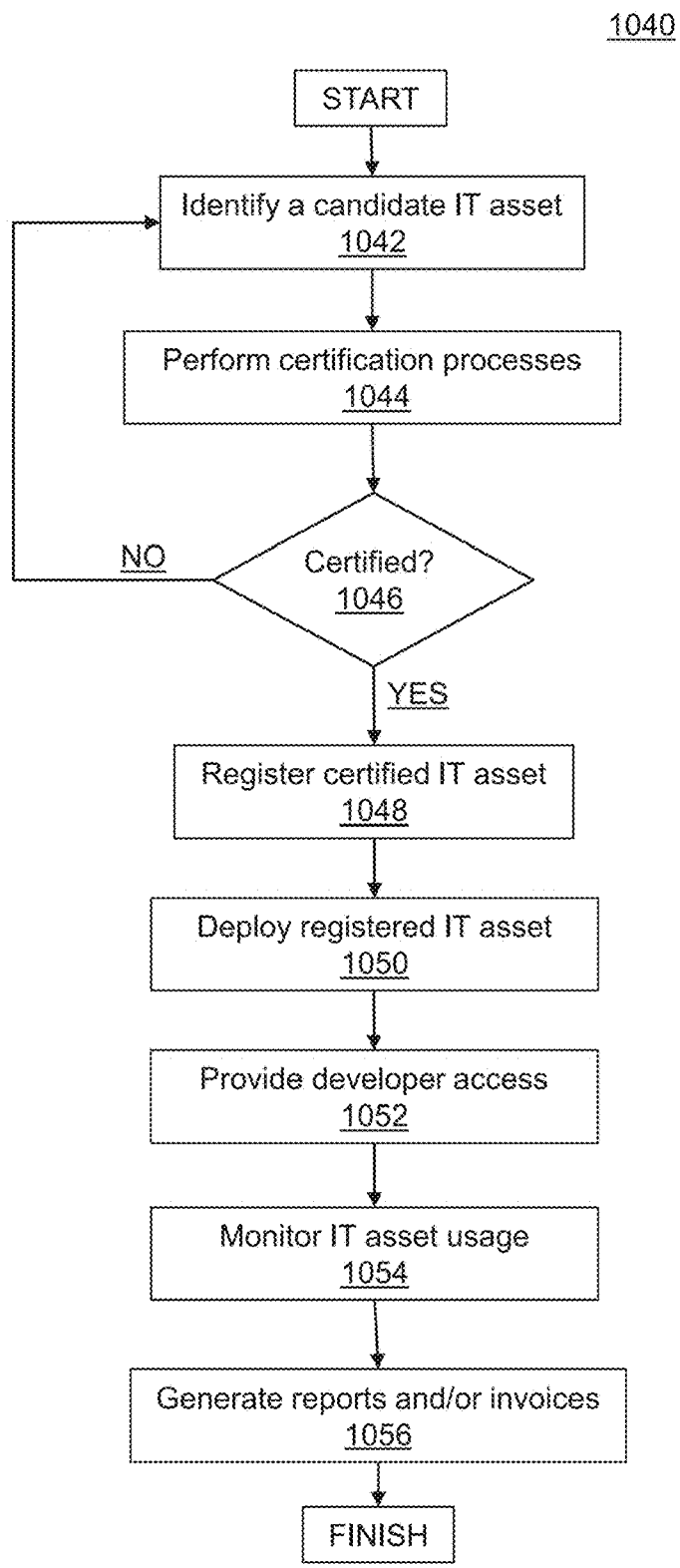
FIG. 10C is a flowchart of an exemplary process for certifying, registering, and consuming IT assets consistent with disclosed embodiments.

Referring back to FIG. 9, container-based framework 900 also includes app store 914 that, in some aspects, may correspond to a self-serve IT asset store provided through a web page or other digital portal associated with IT system 150. As described above, an application developer (e.g., user 211) may access the self-serve IT asset store (e.g., using a web browser or other graphical user interface on client device 210) to obtain apps, APIs, widgets, and other IT assets to develop and/or test apps for execution across various device platforms (e.g., iOS™, Android™, Blackberry OS™, etc.) and/or browser platforms (e.g., Internet Explorer™, Safari™, Chrome™, etc.). In additional aspects, IT system 150 may also be configured to perform processes that register certified IT assets (e.g., apps, APIs, widgets, and other IT assets) for inclusion within the self-serve IT store and establish an availability of these registered IT assets for consumption by application developers and other users. FIG. 10C illustrates an exemplary process 1040 for certifying and registering IT assets for consumption through a self-serve IT asset store, in accordance with disclosed embodiments.

In FIG. 10C, IT system 150 may receive information identifying a candidate IT asset (e.g., an app, API, widget, etc.) for registration in the self-serve IT asset store and subsequent consumption by application developers (e.g., in step 1042). In some aspects, the candidate IT asset may be submitted by a user (e.g., user 221 via client device 220) through a digital portal or web page provided by IT system 150 for submission of candidate IT assets. In other instances, the information identifying the candidate IT asset may be received from system associated with an external app store (e.g., iTunes™, Google Play™, etc.) through a corresponding API.

IT system 150 may perform and/or apply one or more certification processes to the candidate IT asset to determine whether the candidate IT asset is suitable for inclusion in the self-serve IT asset store, and further, is consistent with a quality, reliability, and resilience of other IT assets provided by the self-serve IT asset store (e.g., in step 1044). For example, as described above, IT system 150 may certify a candidate IT asset (e.g., a candidate app or API) for inclusion within the self-serve IT asset store based on a performance of the candidate IT asset when subjected to a predetermined set of test cases. In other aspects, IT system 150 may certify the candidate IT asset for inclusion within the self-serve IT asset store based on a peer review of the performance of candidate IT asset on one or more device and browser platforms, and additionally or alternatively, based on review of the quality and robustness of the uncompiled code associated with the candidate app. Furthermore, IT system 150 may certify the candidate IT asset based on an analysis not only on the performance of the candidate app using the predetermined set of test cases, but also on the quality, scope, and/or coverage of the predetermined set of test cases.

IT system 150 may determine whether the candidate IT asset meets the requirements for quality, reliability, and resilience established by IT system 150, and thus, is certified for inclusion within the self-serve IT asset store (e.g., in step 1046). If IT system 150 were to determine the candidate IT app is not certified (e.g., step 1046; NO), IT system 150 may determine that the candidate IT asset should not be included in the self-serve IT asset store, and process 1040 may pass back to step 1042. In some aspects, IT system 150 may await submission of an additional candidate IT asset.

If, however, IT system 150 certifies the candidate IT asset (e.g., step 1046; YES), IT system 150 may register the candidate IT asset in the self-serve IT asset store and maintain information identifying the IT asset (e.g., an asset name, version, specification, and/or manifest information) within a corresponding repository (e.g., in step 1048). In certain aspects, the repository may be searchable by name, specification information version, and any additional or alternate information identifying the registered IT asset and capable of being indexed by IT system 150. IT system 150 may be configured to deploy the registered IT asset within the self-serve IT asset store for consumption by application developers (e.g., in step 1050).

In some aspects, IT system 150 may grant an application developer access to the registered IT asset, and additionally or alternatively, one or more apps, widgets, APIs, or other IT assets registered for consumption in the self-serve IT asset store (e.g., in step 1052). For instance, the application developer (e.g., user 211 of client device 210) may access the self-serve IT asset store through a corresponding web page or digital portal, and submit a request to obtain one or more available IT assets. In certain aspects, IT system 150 may receive the request, determine whether the application developer is associated with permissions appropriate to access the requested IT assets, and if IT system 150 determines the user is associated with appropriate permissions, facilitate the application developer's access to the requested IT assets. For instance, IT system 150 may deliver the requested IT assets to client device 210 using any of the communications protocols outlined above, and additionally or alternatively, may establish a temporal window during which user 211 may access and download the requested IT assets to client device 210.

IT system 150 may, in an embodiment, monitor a digital activity of user 211 to determine not only when user 211 downloads the requested IT assets, but also to determine when and under what conditions client device 210 executes and renders the requested IT assets, either alone or assembled into another app (e.g., step 1054). For instance, in step 1054, IT system 150 may monitor user 211's digital activities to generate performance metrics, usage metrics, and other performance- and/or usage-related data suitable for incorporation in reports, invoices, etc.

Further, in some instances, IT system 150 may generate reports and/or invoices based on the obtained performance and usage metrics and data (e.g., in step 1056). For instance, IT system 150 may generate a report that identifies a number of IT assets (e.g., apps, APIs, widgets, etc.) consumed by user 211 during a predetermined time period (e.g., monthly, daily, weekly, etc.). Further, in some aspects, IT system 150 may charge user 211 a predetermined fee for each consumed IT asset and/or for each IT asset executed by client device 210. Further, in other aspects, IT system 150 may assess user 211 a monthly, daily, or hourly fee for accessing the self-serve IT asset store. In some embodiments, IT system 150 may provide the generated reports and/or invoices to client device 210 across network 225 using any of the communications protocols outlined above. Exemplary process 1040 is then complete.

Figure 11:
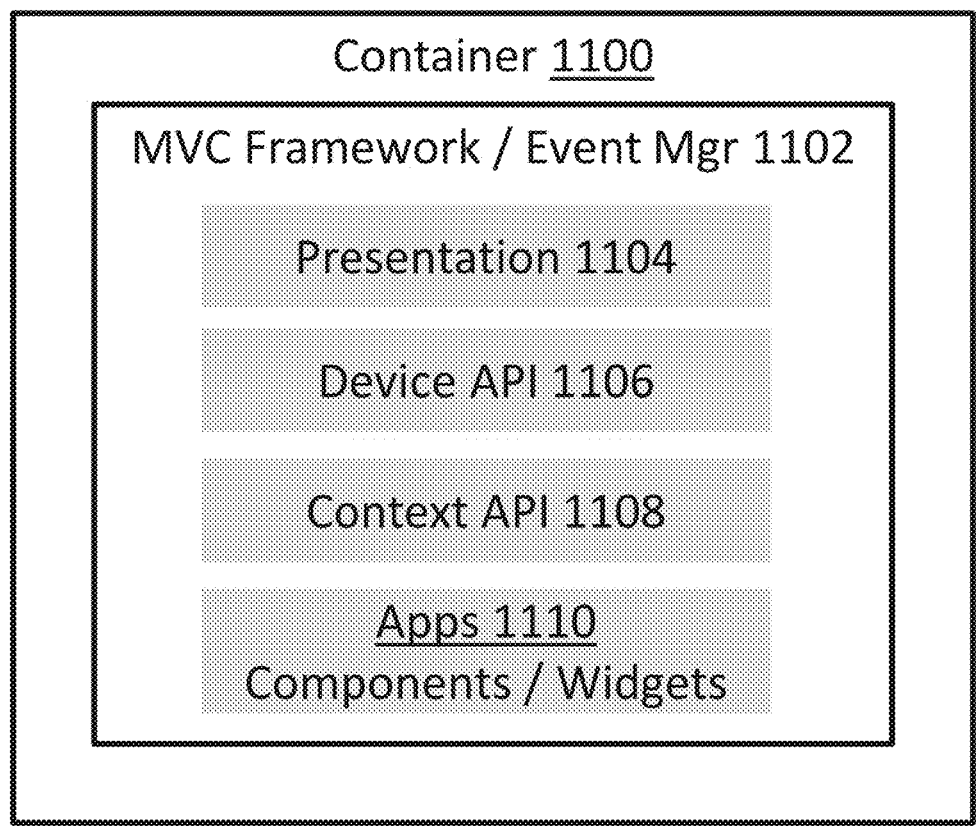
FIG. 11 is an exemplary block diagram of certain aspects regarding the disclosed embodiments.

In certain embodiments described above, container-based frameworks and architectures may incorporate containers that provide run-time environments for the mobile apps and other IT assets, which interact with systems of various business entities (e.g., a business entity or financial institution associated with IT system 150), devices (e.g., client devices 210 and 220), and other containers using consistent application programming interfaces (APIs). FIG. 11 is a block diagram illustrating components of an exemplary application container 1100, in accordance with disclosed embodiments. As described above, application container 1100 may include instructions, scripts, and other executable code that, upon execution by client device 210, manage an interaction between client device 210 and one or more consumers (e.g., through an assisted or unassisted channel).

In some aspects, application container 1100 may be specific to a particular device operating system and/or browser, and in some aspects may include a device-specific shell and a browser shell. The device-specific shell may, for example, include instructions, scripts, and other executable code that facilitates an execution of one or more apps (e.g., apps 1110) on a particular device (e.g., communications devices executing an iOS™, Android™, and/or BlackBerry OS™). Further in some instances, the browser shell may include instructions, scripts, and other executable code that facilitate an execution of apps 1110 in conjunction with a corresponding web browser (e.g., an Internet Explorer™, Chrome™, Firefox™, and/or Safari™ browser).

In some aspects, application container 1100 may also include a model-view-controller (MVC) framework and event manager 1102. MVC framework and event manager 1102 may, for example, be executed by client device 210 to generate an "event bus" that manages interactions between applications (e.g., apps 1110), APIs, widgets, and other IT assets implemented by client device 210. By way of example, MVC framework and event manager 1102 may facilitate communications between portions of the apps, APIs, widgets, and other IT assets present on and executed by client device 210, and further, may coordinate the loading and unloading of corresponding apps, widgets, and IT assets for execution by client device 210.

Application container 1100 may further include a presentation layer 1104 that establishes processes than enable client device 210 to render output for presentation to user 220. For example, the established processes may include responsive web design (RWD) techniques provide an optimal user experience across a wide range of device types and form factors. Further, in some instances, presentation layer 1006 may establish techniques that render HTML content for presentation to the user using HTML5 and CSS standards.

In further aspects (not depicted in FIG. 11), application container 1100 may also include a user context layer that establishes user-specific theming and/or presentation details for the rendered content, user-specific configuration preferences for content presentation, common user-specific menus or interface elements, and/or authentication credentials or tokens for the user. For instance, application container 1100 and/or apps 1110 may rely on security processes established by a business entity or financial institution associated with IT system 150, which may require an authentication of user 220 prior to executing a particular app, widget, or other IT asset.

In some embodiments, application container 1100 may also include a device API 1106 and a context API 1108. Device API 1106 may, for instance, enable an executing app, widget, or other IT asset to access one or more capabilities of client device 210, which include, but are not limited to, on-board positioning systems (e.g., GPS), accelerometers, and an on-board camera. In other instances, content API 1008 may enable an executing app, widget, or other IT asset to access transient data residing locally within application container 1100 on client device 220. Transient data consistent with the disclosed embodiments may, for example, include data generated by one or more currently or previously executed apps, widgets, or other IT assets.

Further, in certain embodiments, application container 1100 may include one or more apps, widgets, or IT assets (e.g., apps 1010) that provide a desired user or customer experience when executed by client device 210 and rendered for presentation on client device 210, e.g., through a browser executed by client device 210. Further, although not depicted in FIG. 11, application container 1100 may also include one or more container APIs that facilitate interrogation and integration between multiple application containers, apps, widgets, or other IT assets associated with these containers, and device-specific capabilities (e.g., an on-board positioning system, an accelerometer, or an on-board camera).

As described above, an individual app may provide a granular level of user interface functionality, and may be executed and rendered by client device 210 to provide legendary user and/or customer experience across any device, accessed at anytime and anywhere. In other aspects, an application developer may assemble together a plurality of individual application that, upon execution and rendering, may provide a "macro" set of user interface functionalities. In some embodiments, the assemblage of individual apps, widgets, and/or IT assets into a "macro" app may provide a composite user interface functionality (e.g., resulting from the combination of the individual user interface functionalities) useful to customers and employees of the business entity associated with IT system 150.

In certain aspects, apps 1110 may be configured to operate in a resilient fashion independent of other apps, widgets, and/or ITS assets. To achieve this capability, an application developer may design or assemble an app in an "end-to-end" manner than addresses not only a front-end user experience, but also access and consumption of data associated with IT system 150 and computing systems associated with other business entities and financial institutions accessible across network 225.

In some embodiments, each of apps 1110 may be associated with a manifest that establishes a basic set of common identifying and configuration data, as well as application-specific metadata rendered by client device 210 for presentation to user 220 and/or available within a corresponding IT asset store. Further, in additional aspects, the container-based framework implemented by IT system 150 may require that each of apps 1110 establish a corresponding manifest prior to certification and inclusion within the self-serve IT asset store, as described above. Further, in some aspects, a manifest established for an assemblage of individual apps may provide a "contract" between the individual apps that defines parameters that facilitate the execution of the individual apps in corresponding containers and enable inter-application communication between the individual apps.

The manifest for a corresponding one of apps 1110 (and additionally or alternatively, for an assemblage of apps) may include identifying and configuration data associated with the app or apps. Manifest data consistent with the disclosed embodiments may include, but is not limited to: (i) a human-readable text string describing the corresponding app or apps; (ii) a version of the corresponding app or apps; (iii) a description of dependencies linking the corresponding app or apps to other systems, apps, widgets, and IT assets; (iv) a description of events emitted by the corresponding app or apps; (v) a description of events consumed or processed by the corresponding app or apps; or (vi) a URL or other information that provides access to content of the corresponding app or apps.

In some aspects, IT system 150 may publish and make available to application developers the contracts established by application manifests (e.g., within the IT asset store). For example, apps 1110 may interact with other apps, widgets, and/or IT assets to provide a holistic and seamless user experience in accordance with the published contracts. Further, in other aspects, the published contracts may establish one or more communications parameters by which apps 1110 may communicate with client device 220 or a browser executed by client device 220 (e.g., through application container 1000). For instance, the published contracts may establish a "thin" façade that abstracts lower-level device capability such that changes in device capabilities are isolated from corresponding apps 1110.

In certain embodiments, apps 1110 may include one or more business apps that provide a business domain functionality associated with the business entity or financial institution associated with IT system 150. Business apps consistent with the disclosed embodiments may include, but are not limited to: customer apps that provide an ability to search, view, and update customer information; product apps that provide an ability to search, view, and update products; account apps that provide an ability to search, view, and update accounts; transaction apps that provide an ability to search and view transactions; and payment apps that provide an ability to select payment types and execute payments. Further, in some instances, the business apps may include apps specific to a line-of-business (LOB) or business group of the business entity or financial institution, including but not limited to credit card apps, lending product apps, deposit product apps, insurance apps, collections apps, sales apps, and fraud or compliance apps.

In other embodiments, apps 1110 may include one or more container apps that provide a common a common set of capabilities for various communications devices and run-time environments (e.g., mobile communications devices executing iOS™, Android™, or BlackBerry™ operating systems). For example, container apps consistent with the disclosed embodiments may include, but are not limited to login containers apps, local cache apps, session management apps, navigation and banding apps, and utility apps.

For example, a local cache app may, upon execution, provide a method of managing and interrogating application- and/or container-specific information stored on the client device 210 and/or in a local cache associated with a browser executed by client device 210. Further, for example, a session management app may provide a method of managing and interrogating application- and/or container-specific information stored by systems or data repositories accessible to client device 210 across network 225. A branding app may, for example, provide a method of consistently rendering user interface elements (e.g., logos and marketing material) related to a brand of the business entity or financial institution associated with IT system 150, and a navigation app may provide processes that consistently renders user interface elements related to navigating within apps (e.g., navigation panes and/or user menu). In certain aspects, the navigation app may be dynamically generated and may reflect one or more capabilities made available by the currently executed apps. In further aspects, a utility app, when executed by client device 210, may provide base capabilities common to all executing apps, including, but not limited to, date and other localization, logging/debugging, and notification capabilities.

In some embodiments, a login container app may, upon execution by client device 210, receive from a user (e.g., an employee or customer of a business entity associated with IT system 150) credentials that confirm that the user is known to the business entity and can use apps 101. Upon successful authentication (e.g., by client device 210, by IT system 150, or by an associated authentication system), IT system 150 may allow the employee or customer to access one or more of apps 1110. In further response to a successful authentication, IT system 150 may be configured to provide, to application container 1100, a profile associated with the employee or the customer that includes employee- or customer-specific preferences, customizations, themes, and/or navigation preferences.

Further, in some aspects, IT system 150 may confer no further authority upon the employee or customer in response to a successful authentication, and any additional requests for execute capability of the business entity may require authentication in accordance with policies established by the business entity. In other aspects, however, the container login app may represent a "single-sign-on" app than allows the employee and/or customer to switch freely between apps 1110 in response to a successful authentication. In additional aspects, the login container app may represent an "assisted-login" app that enables an employee of the business entity or financial institution to provide authentication credential of a customer, and that, in response to a successful authentication, requests and maintains role and entitlement information for that customer. The role and entitlement information may, for instance, enhance the customer experience and simplify the ability to execute requests on behalf of a customer.

Figure 12:
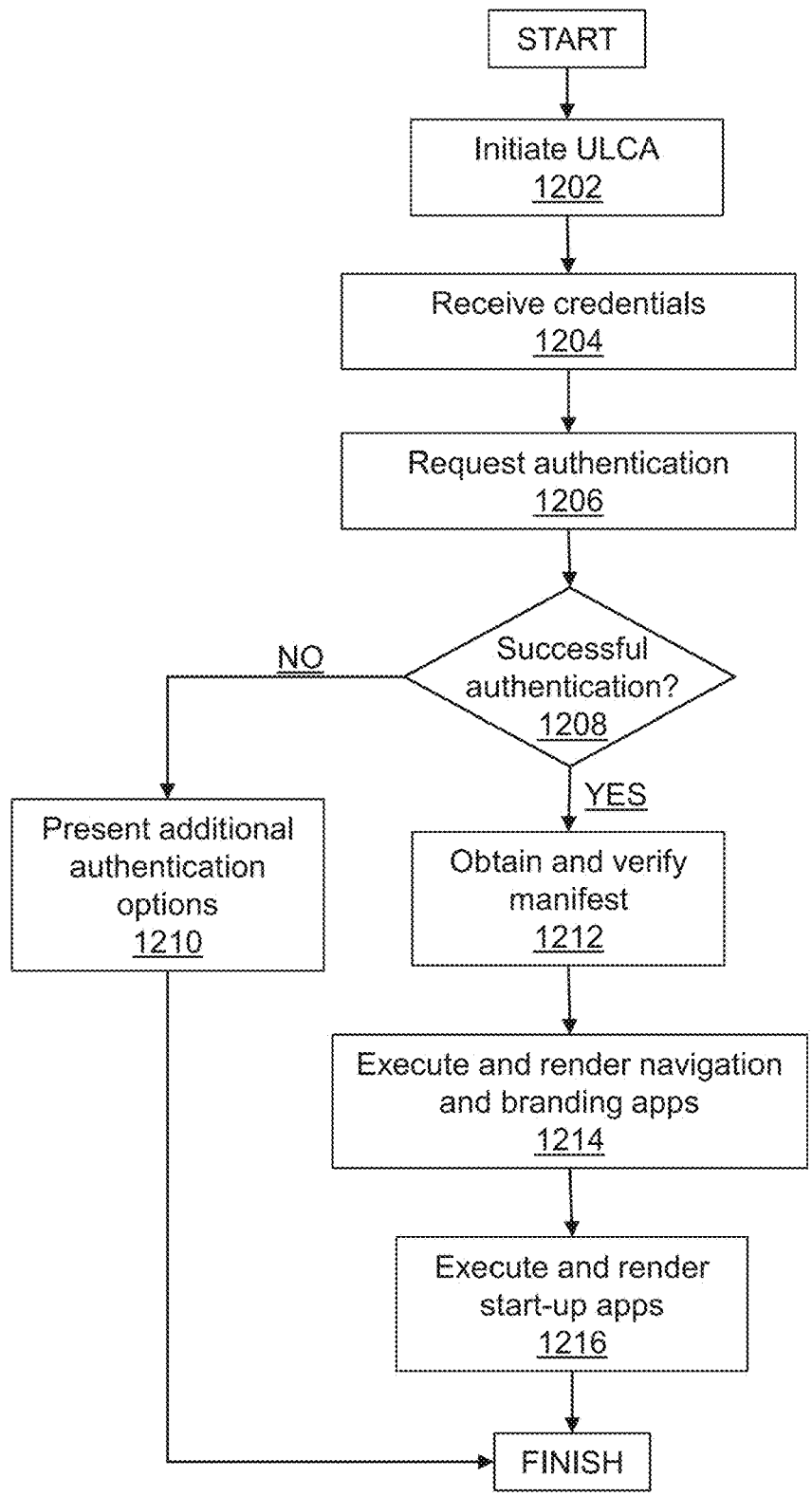
FIG. 12 is a flowchart of an exemplary IT asset execution process consistent with disclosed embodiments.

In an embodiment, and in response to a successful login by a user (e.g., a customer or an employee of a financial institution), a corresponding client device (e.g., client device 210 or 220) may be configured to obtain information identifying a container (e.g., application container 1100), receive and process a manifest containing a user profile, render base branding and navigation apps, and further, render one or more start-up apps associated with the user. FIG. 12 illustrates an exemplary process 1200 performed by a client device upon successful authentication of a user.

For instance, a user (e.g., user 211) may, via client device 210, initiate a user login container app (e.g., a ULCA) the renders display fields enabling user 211 to enter authentication credentials into client device 210 (e.g., in step 1202). In one aspects, the ULCA may be locally stored by client device 210, and additionally or alternatively, may be accessed remotely by entering a corresponding uniform resource identifier (URI) into client device 210. Further, the authentication credentials may include, but are not limited to a user name, a password, a personal identification number (PIN), and any additional or alternate credential identifying user 211 and appropriate to a business entity or financial institution associated with IT system 150.

In some instances, user 211 may provide the authentication credentials as input into the rendered fields (e.g., in step 1204), and initiated ULCA may invoke a corresponding consumer API (e.g., a User Login Container API) to generate and transmit an authentication request across network 225 to IT system 150 or a system or server associated with an additional business entity or financial institution (e.g., in step 1206). In some aspects, the client device 210 execute instructions and/or scripts to implement the User Login Container API, which may package the inputted credentials to form the authentication request. Client device 210 may, for example, perform processes that transmit the generated request to an authorization and authentication system associated with the additional business entity, the additional financial institution, and/or IT system 150 (e.g., integration system 906 of FIG. 9).

In some embodiments, the authorization and authentication system may process the received authentication request, extract the credentials, and validate the credentials against user profile data and/or additional authentication information associated with user 211. The authorization and authentication system may, for example, transmit a response indicative of a successful or unsuccessful authentication to client device 210 through the User Login Container API.

Client device 210 may receive the response, and after processing by the User Login Container API, determine whether the authorization and authentication system successfully validated the user 211's credentials (e.g., in step 1208). If client device 210 determines that user 211's credentials are invalid (e.g., step 1208; NO), client device 210 may further execute the ULCA to present information identifying additional authentication options available to user 211 (e.g., in step 1210). For instance, client device 210 may present, to user 211, a first dialog indicating that the credentials are invalid and requesting re-entry of the appropriate credentials, a second dialog box prompting user 211 to enter an e-mail address at which user 211 will receive a new password or information identifying a user name, and/or a third dialog box indicating that user 211 should attempt to login again after a short delay (e.g., in five seconds). In other aspects, client device 210 may disable the ULCA after a subsequent (e.g., a third) unsuccessful login attempt. Exemplary method 1200 is then complete.

If, however, client device 210 were to determine that the authorization and authentication system successfully validated the user 211's credentials (e.g., step 1208; YES), then client device 210 may retrieve and verify a manifest associated with the ULCA (e.g., in step 1212). By way of example, client device 210 may obtain the manifest from IT system 150. Furthermore, the obtained manifest may include, but is not limited to, user profile data, information identifying branding and navigation apps associated with the ULCA, user preferences, look-and-feel themes, and information identifying one or more start-up apps associated with user 210. In some aspects, client device 210 may execute and render the navigation, branding, and start-up apps to provide a legendary customer experience to user 211.

In certain aspects, client device 210 may further execute the ULCA to render the branding and navigation apps included within the manifest (e.g., in step 1214). Further, in step 1214, client device 210 may further execute the ULCA to apply themes found in the manifest, and apply any other user preferences and/or container configurations found in the manifest. Client device 210 may further execute the ULCA to initialize and render the one or more startup apps found in the manifest to provide the legendary customer experience (e.g., in step 1216). For example, by rendering the startup apps, client device 210 may present top user 211 information identifying a financial services account of user 211 (e.g., an account balance, recent transactions, scheduled funds transfers, etc.). Exemplary method 1200 is then complete.

In the exemplary embodiments described above, a system associated with a business entity (e.g., IT system 150) may provide IT assets as "services" that enable an application developer to rapidly and robustly develop and deploy instances of applications for execution on various computing platforms (e.g., iOS devices, Android device, etc.). For example, as described above, the application developer may access a web page or graphical user interface (GUI) that identifies and presents one or more available services (e.g., the exemplary interface of the self-serve IT asset store of FIG. 8). The "services" available to the application developer and presented by the web page or GUI may include, but are not limited to, infrastructure-based assets (e.g., available operating systems, processors, memory, cloud storage, etc.), platform-based assets (e.g., containers available for Android™ devices, iOS™ devices, etc.), data and database services (e.g., data sets available for quality control, testing, visualization, etc.), API-based services (e.g., available APIs that standardize access to core engines), application-based services (e.g., available business and/or container "apps" and portions of "apps"), reporting and analytics-based services, and services that permissioning and compliance with various regulations and policies (e.g., PCI policies, SOX policies, compliance with audit, logging, and reporting policies, compliance with data access policies and permissions, etc.).

In some aspects, the application developer may select a subset of the available assets, and as described above, IT system 150 may be configured to generate and present to the application developer (e.g., through the web page or GUI) an IT asset canvas that represents the selected services and their relationship to other IT assets (e.g., required input data, etc.). Further, IT system 150 may also be configured to provide access to, or to provide, the IT assets associated with the selected services (e.g., executable, container-based applications linked to corresponding cloud-based data storage) to a device associated with the application developer (e.g., to client device 210 across network 225 of FIG. 2). For example, IT system 150 may charge the developer a predetermined fee to obtain the IT assets, and upon initiation and successful completion of a purchase transaction (e.g., through a point-of-sale (POS) system in communication with or provided by IT system 150), IT system 150 may provide the application developer with links to the IT assets, and additionally or alternatively, may transmit copies of the IT assets to the application developer's device.

In certain embodiments, the IT assets selected by the application developer and provided by IT system 150 may be configured as core building blocks for larger applications that, when executed by corresponding mobile devices, servers, and/or computer systems, facilitate the provision of services by various business entities, such as financial institutions. For example, the selected IT assets may include executable applications (e.g., mobile apps, widgets, etc.) that provide granular computational and data access capabilities. The application developer may, in some instances, assemble and link the selected IT assets to appropriate data inputs and outputs (e.g., through corresponding APIs) to generate or "spin-up" an instance of an application that provides one or more services to customers and/or employees of the business entities.

Further, in some embodiments, the application developer may spin-up multiple instances of a single application for purposes of initial testing and debugging, for purposes of development, for purposes of quality control, and/or to facilitate visualization using one or more virtual machines provided by IT system 150 (e.g., through the web page and/or GUI). In certain aspects, the application developer may link the generated instances to different types of input data, and further, the generated instances may be associated with various capabilities to modify accessed data. For example, the application developer may link an instance generated for purposes of initial testing to "exemplary" input data scrubbed of any business or customer details. Additionally or alternatively, the application developer may link an instance generated for purposes of visualization and/or quality control to actual customer and business data to provide an accurate representation of the operation and functionality of the application.

Further, in other aspects, the data linked to the various generated instances may be subject to different permissioning and compliance policies. For example, as the exemplary input data linked to the instance generated for initial testing may not include actual customer or business data, the exemplary input data may be accessible to individuals related to the business entity or the application developer with little or no restriction. In additional aspects, the actual customer and/or business data linked to the visualization or quality control may be subject to strict permissioning policies that limit access to specific individuals identified by the business entity. In some instances, the strict permissioning policies may curtail an ability of the application developer and/or the business unit to delegate visualization or quality control to third-parties. Furthermore, the actual customer and/or business data may be subject to strict auditing and compliance policies that the business entity may not apply to the exemplary input data linked to the instance generated for initial testing.

Thus, in certain aspects, the application developer must identify available IT assets that, when assembled and linked to appropriate data sources, provide the one or more services desired by the business entities, and further, are associated with data permissioning and compliance policies that are mutually compatible with each other and with the individuals or entities charged with executing the application. The need to identify and mediate conflicts between the data permissioning and compliance policies may challenge application developers and may slow the development of complex enterprises requiring generation of instances of multiple executable applications for initial testing, development, visualization, and quality-control purposes (e.g., new mobile enterprises requiring executable applications for multiple mobile and server-based platforms).

In an embodiment, IT system 150 may be configured to execute processes that, in addition to providing one or more IT assets as "services" to application developers, also provide enterprise-building services that generate or "spin-up" instances of executable applications, that link the generated instances to sources of data having appropriate permissioning and compliance policies, and that package the instantiated applications and linked data sources into modules for delivery to an application developer. By way of example, as described above, IT system 150 may be configured to receive the application developer's selection of available IT assets (e.g., using the self-serve IT store accessed through a web page or other GUI). In certain aspects, IT system 150 may be configured to execute processes that provide an "orchestration engine" capable of parsing the selected IT assets, and further, determining whether the selected IT assets include infrastructure-based, platform-based, and software-based assets that are compatible and sufficient to generate or "spin-up" an instance of a corresponding application. The selected IT assets may include, but are not limited to, hardware assets (e.g., processors, mobile platforms, memory, etc.), cloud-based storage assets, operating systems, middleware, and/or granular applications supported by the operating systems and middleware and executable by the hardware assets.

Based on the determination, and without additional input from the application developer, the orchestration engine may identify and add to the selected resources one or more additional resources that may be necessary to successfully instantiate the application. In additional aspects, the orchestration engine may automatically generate an instance of the application based on the selected IT assets (and additionally or alternatively, based on compatible IT assets identified by the orchestration engine), and may link one or more input and/or output data sources (e.g., as identified by the orchestration engine or within the selected IT assets) to the generated instances.

In certain aspects, the selected IT assets may include one or more data permissioning and compliance services. The orchestration engine may, in some embodiments, confirm a compatibility of the selected data sources with the selected data permissioning and compliance services, and if one or more of the selected data sources are deemed incompatible, identify at least one additional source of input and/or output data that is available to the application developer (or an entity identified by the application developer and/or business entity), and that consistent with data requirements (e.g., formatting, size, etc.) of the generated instances, and further, that is compatible with the selected data permissioning and compliance services.

The orchestration engine may be configured to package the generated instance and information identifying the linked data into a module having a format suitable for delivery to a device associated with the application developer (e.g., client device 210 of FIG. 2). For example, the orchestration engine may package the generated instance as Javascript or other HTML code, with information identifying the linked data being provided as metadata. In other instances, the generated instances and linking information may be compiled together and provided to the device as an executable file.

Further, in additional aspects, the orchestration engine may also be configured to provide, to the user within the module, additional data suitable for presentation to the application developer, a customer, or other entity during execution of the generated instance by a corresponding device. For example, generated instance may, upon execution by a device, present information identifying a current account balance of a customer through a corresponding web page or graphical user interface. In some instances, the additional data packaged into the module may include graphical content (or links to graphical content) for concurrent display with the current account balance.

Orchestration engines consistent with the disclosed embodiments may provide enterprise-building services that generate or "spin-up" instances of executable applications, that link the generated instances to sources of data having appropriate permissioning and compliance policies, and that package the instantiated applications and linked data sources into a module for delivery to an application developer. In some aspects, the enterprise-building services provided by the orchestration engine may, automatically generate instances of applications using multiple layered services that include, but are not limited to, infrastructure-based services incorporating hardware and cloud-stack assets, platform-based services that support various operating systems and middleware, and software-based services that support executable applications, as described below in reference to FIG. 13.

Figure 13:
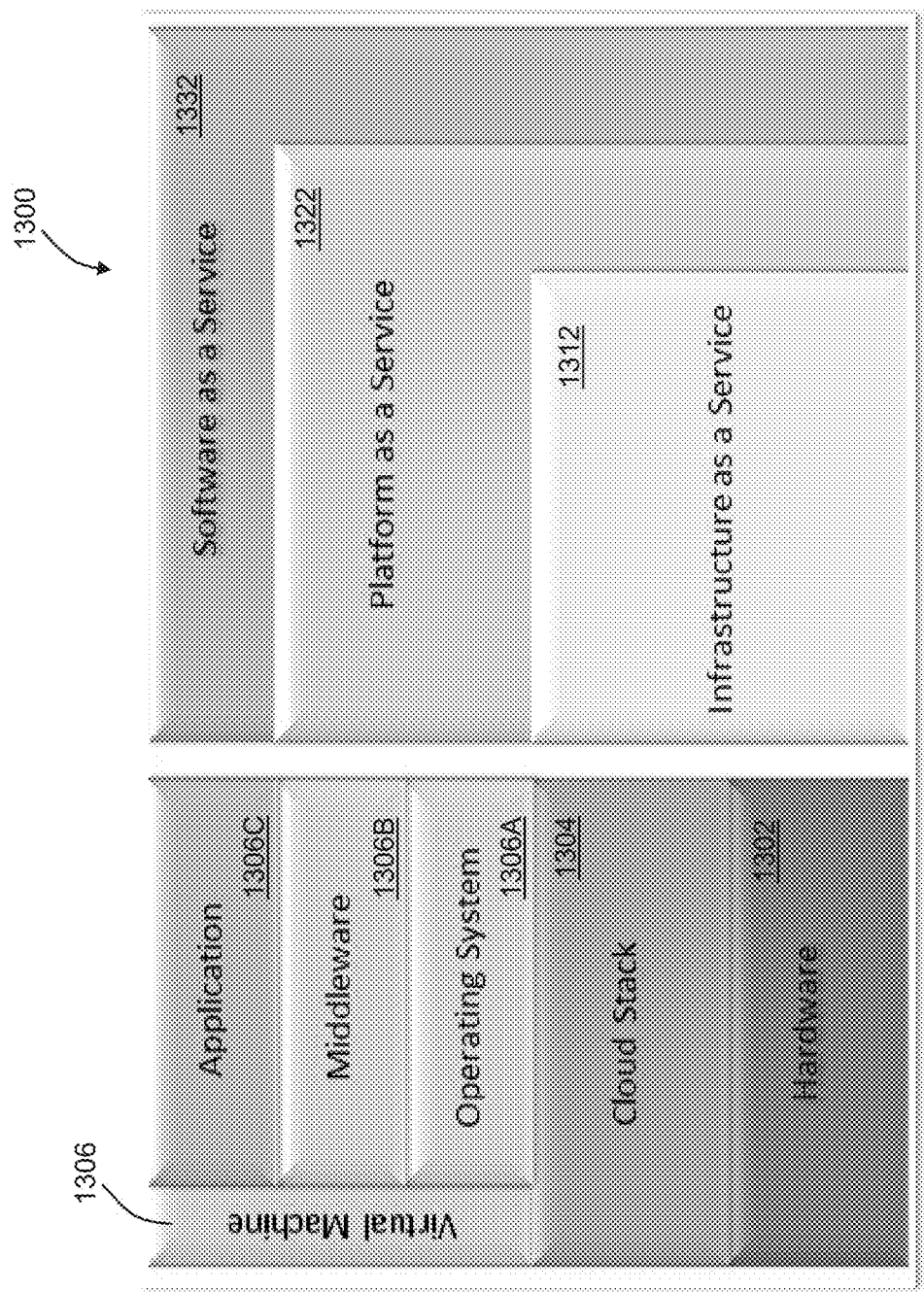
FIGS. 13 and 14 illustrate exemplary layered services, consistent with disclosed embodiments.

FIG. 13 is a diagram illustrating exemplary services 1300 provided by IT system 150, consistent with disclosed embodiments. For example, and as described above, an orchestration engine (e.g., as provided by IT system 150) may provide enterprise-building services that generate or "spin-up" instances of executable applications, which may incorporate multiple infrastructure-based, platform-based, and software-based services provided by IT system 150 and available to an application developer (e.g., through an interface of a self-serve IT asset store).

In FIG. 13, services 1300 may include hardware assets 1302 and cloud-stack assets 1304. By way of example, hardware-based assets 1302 consistent with the disclosed embodiments may include, but are not limited to, processors, servers, systems, data centers, locally-accessible storage units, and/or networking resources. Further, in some instances, cloud-stack assets 1304 may include, but are not limited to, cloud-based storage that include customer data, business data, and any additional or alternate data associated with IT system 150 and/or a business unit associated with IT system 150. Further, and as described above, at least a portion of the data stored within the cloud-based storage may be subject to one or more data permissions and compliance policies.

Services 1300 may also include one or more virtual machines 1306. In certain aspects, virtual machines 1306, when implemented using hardware assets 1302 and cloud stack assets 1304, may provide virtualization processes for instances of applications "spun-up" by the orchestration engine. As outlined in FIG. 13, virtual machines 1306 may include, but are not limited to, operating systems 1306A, middleware 1306B, and applications 1306C. In one aspect, operating systems 1306A may include operating systems supported by one or more devices capable of executing the generated instances, such as Andriod™, iOS™, Windows™, Linux™, and Unix™. Further, in some aspects, applications 1306C may include any application executable by the one or more devices and supported by operating systems 1306A, e.g., web browsers, text editors, Javascripts, etc. In additional aspects, middleware 1306B may include any elements of executable code (e.g., APIs) that "glue together" or mediate between applications 1306C and operating systems 1306A, and further, between applications 1306C and data stored within cloud stack assets 1304 and/or storage devices of hardware assets 1302.

Services 1300 may also include infrastructure-based services 1312 provided by IT system 150 and available to the application developer. In certain aspects, the available infrastructure-based services 1312 may include one or more hardware-based assets 1302 and cloud-stack assets described above.

In addition, services 1300 may include platform-based services 1322 provided by IT system 150 and available to the application developer. Platform-based services 1322 may, for example, incorporate and build upon infrastructure-based services 1312, which incorporate hardware assets 1302 and cloud-stack assets 1304 as described above. Further, in some instances, platform-based services 1322 may incorporate one or more of operating systems 1306A and middleware 13066, as outlined above. In certain aspects, platform-based services 1322 consistent with the disclosed embodiments may include platforms specified by a particular combination of selected hardware assets (e.g., mobile devices, etc.), selected cloud stack assets, a selected operating system compatible with and appropriate to the selected hardware and cloud stack assets, and selected middleware capable of interfacing with the selected operating system and cloud stack assets.

Further, in some embodiments, services 1300 may include software-based services 1332 provided by IT system 150 and available to the application developer. Software-based services 1332 may, in certain aspects, represent combinations of applications 1306C (e.g., of virtual machine assets 1306) and corresponding ones of platform-based services 1322 (e.g., as specified by combinations of selected hardware assets, selected could stack assets, and corresponding selections of operation systems and middleware, as described above).

In some aspects, software-based services 1332 consistent with the disclosed embodiments may include unique combinations of an application (e.g., one of applications 1306C) and a platform capable of executing the application (e.g., one of platform-based services 1322). Further, as noted above, and in response to the selections of the application developer (e.g., using the interface associated with the self-serve IT store), IT system 150 may generate multiple software-based services. In certain aspects, the orchestration engine (e.g., as provided by IT system 150) may assemble combinations of the software-based services to generate instances of executable applications, link the generated instances to sources of data having appropriate permissioning and compliance policies, and that package the instantiated applications and linked data sources into modules for delivery to an application developer.

Figure 14:
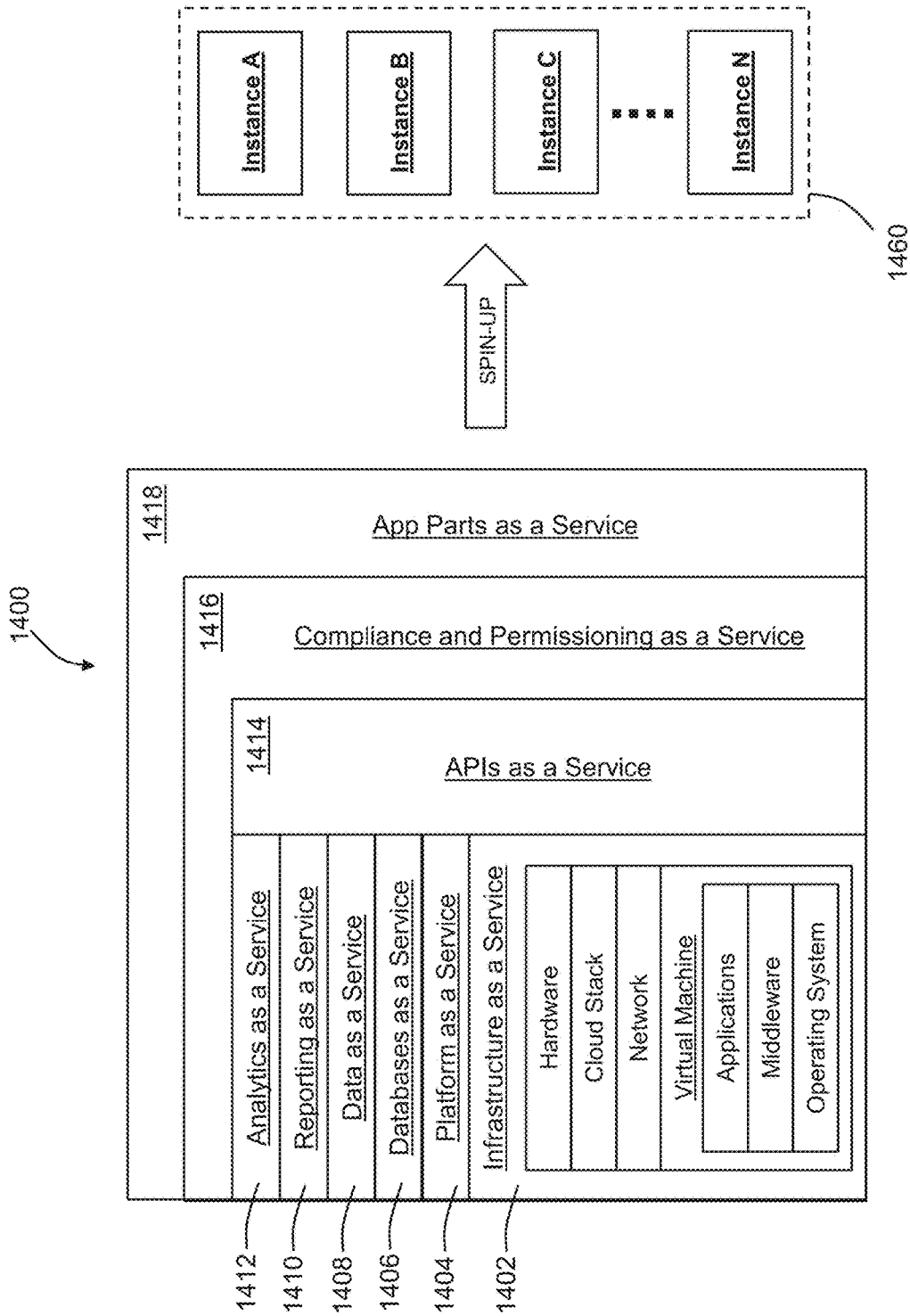

FIG. 14 is a diagram illustrating exemplary services 1400 provided by IT system 150, in accordance with disclosed embodiments. As described above, an orchestration engine (e.g., as provided by IT system 150) may provide enterprise-building services that generate or "spin-up" instances of executable applications that incorporate multiple layered services provided by IT system 150 and available to an application developer (e.g., through an interface of a self-serve IT asset store). Further, in certain aspects, the orchestration engine may be configured to assemble mutually compatible combination of the layered services to generate instances of executable applications, link the generated instances to sources of data having appropriate permissioning and compliance policies, and package the instantiated applications and linked data sources into modules for delivery to an application developer.

For example, IT server 150 may provide one or more infrastructure-based services 1402 and platform-based services to an application developer (e.g., through a web page or GUI associated with a self-serve IT asset store). As described above, infrastructure-based services 1402 may include, but are not limited to, hardware assets, cloud stack asserts, network resources, and one or more virtual machines (and corresponding operating systems, middleware, and applications) available to the application developer and provided by IT system 150. Further, and as noted above, platform-based services 1404 may couple and mediate between the virtual machines and one or more of the hardware assets, cloud stack assets, and network resources of infrastructure-based services 1402. Services 1400 also include, but are not limited to, database services 1406, data services 1408, reporting services 1410, and analytics-based services 1412.

By way of example, database services 1406 may facilitate access to one or more searchable databases of public information maintained by a governmental or private entity, and further, to one or more searchable databases of confidential business and/or customer data maintained by IT system 150 and/or the business entity associated with IT system 150 (e.g., a financial institution). Further, in certain aspects, reporting services 1410 and analytics-based services 1412, when provided to the application developer, may provide data indicative of a usage of one or more generated applications, a usage of IT system 150 by application developers and/or other customers, and indication related any additional or alternate activities tracked and/or monitored by IT server 150.

Further, services 1400 may also include API-based services 1414, compliance- and permissioning-based services 1416, and app-part-based services 1418. By way of example, and as described above, API-based services 1414 may include one or more application programming interfaces (API) that are available to the application developer (e.g., using the web page or GUI associated with the self-serve IT asset store). APIs consistent with the disclosed embodiments may facilitate a standard method of access one or more core engines (e.g., software processes configured to provide core functionalities for certain services) and hide complexities of connecting to the engines.

Additionally, in certain aspects, compliance- and permissioning-based services 1416 may include one or more data, application, and/or service compliance and permissioning policies available and selectable by the application developer (e.g., through the web page or GUI of the self-serve IT asset store). For example, compliance and permissioning policies consistent with the disclosed embodiments may include one or more payment card industry (PCI) data-security policies, Sarbanes-Oxley (SOX) policies, perimeter policies, auditing compliance policies, and/or logging and reporting policies. Further, in other aspects, one or more of the compliance and permissioning policies may establish level of access to stored data for the application developer, for individuals associated with the application developer, and/or for individuals representing or associated the business entity (e.g., the financial institution).

In addition, services 1400 may also include app-part-based services 1418. In certain aspects, one or more of app-part-based services 1418 may include portions of web pages, graphical user interfaces, and other interfaces available to the application developers and selectable by the application developer for presentation during execution of a generated instance of the application. For example, app-part-based services 1418 may include, but is not limited to, a "left nav" portion of a web page that include status graphical content or links to other graphical content that a device (e.g., client device 210 of FIG. 2) may access and present upon executing the instantiated application.

By way of example, a business unit of a financial institution may provide its customers with decisions on loans and other lines of credit, and may require a new mobile platform to facilitate a real-time delivery of these decisions to mobile devices, smart phones, and other wearable devices (e.g., smart watches, etc.) registered to the customers. For example, to generate the required mobile platform, an application developer may create, debug, and deploy mobile applications executable by a variety of potential customer devices (e.g., mobile devices executing Android™ operating systems and/or iOS™). The created mobile application may, for instance, exchange authentication and/or encryption credentials and other data across a communication network using one or more communication protocols (e.g., packetized communications across network 225), and further, may obtain, store, and/or modify business and customer data accessible to the servers and systems of the financial institution (e.g., stored in one or more cloud-based databases or data repositories accessible to the servers and systems).

In some aspects, the application developer, through a corresponding device (e.g., client device 210 of FIG. 2), may access a web page or other GUI associated with a self-serve IT asset store populated with services available to the application developer (e.g., services 1400 of FIG. 14). The application developer may, for example, select one or more of the available services within the self-serve IT asset store (e.g., one or more of services 1400), and IT system 150 may be configured to present the selected services to the application developer for review (e.g., within a corresponding IT asset canvas). Further, as described above, the application developer may request access to the selected services (e.g., by clicking on or otherwise selecting a "check out" region of the self-serve IT asset store), and an orchestration engine associated with IT system 150 may be configured to assemble one or more mutually compatible combinations of the selected services to generate or "spin-up" instances of the required mobile applications, link the generated instances to sources of data having appropriate permissioning and compliance policies, and package the instantiated applications and linked data sources into modules for delivery to the application developer, and described below in reference to FIG. 15.

Figure 15:
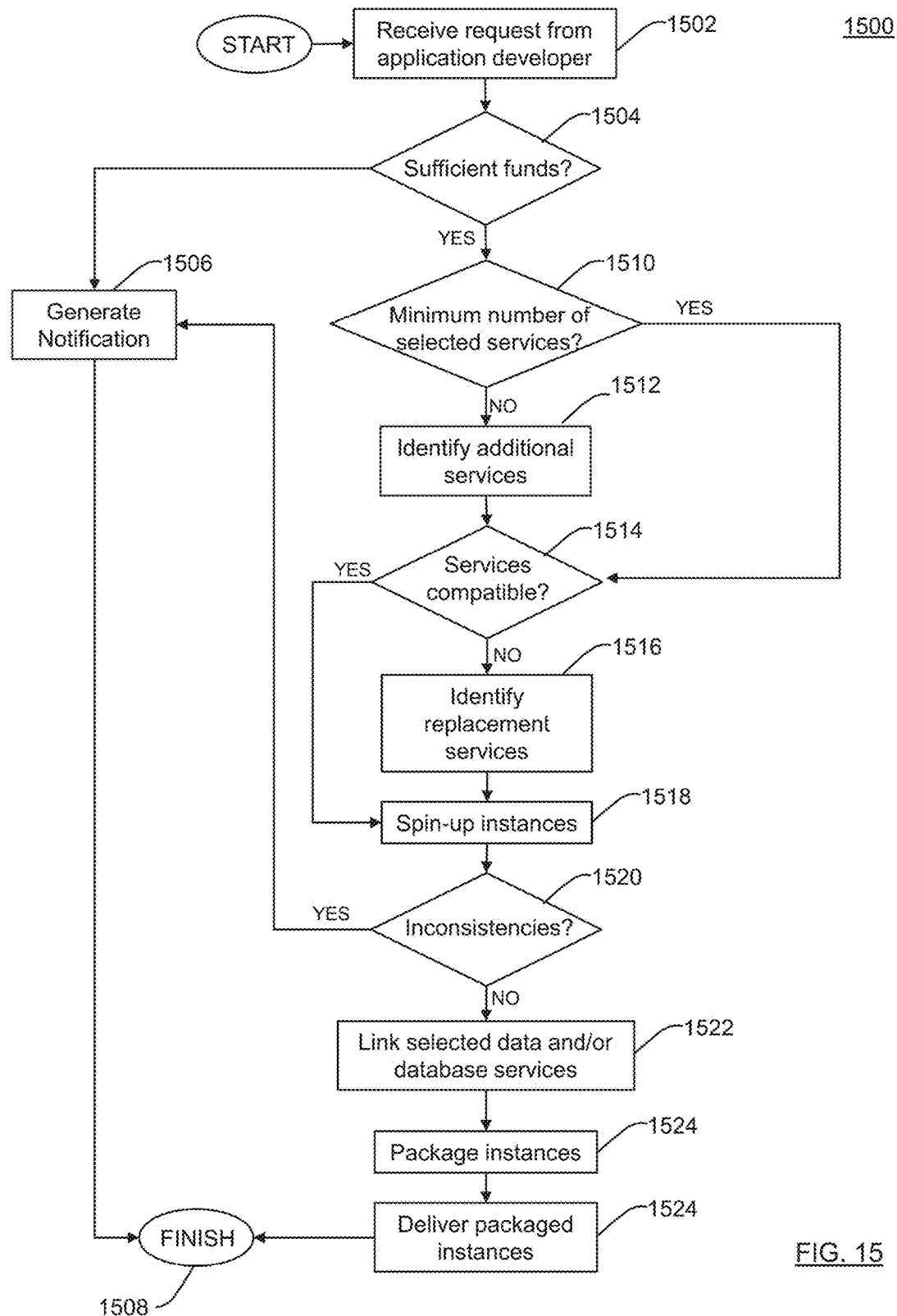
FIG. 15 is a flowchart of an exemplary process for generating instances of requested applications, consistent with disclosed embodiments.

FIG. 15 is a flow chart of an exemplary method 1500 for generating instances of requested applications that incorporate selected information-technology assets, in accordance with the disclosed embodiments. In an embodiment, an orchestration engine associated with and executed by an IT system (e.g., IT system 150 of FIG. 1) may identify one or more services selected by an application developer (e.g., through a web page or GUI associated with a self-serve IT asset store). As described above, the selected services may correspond to information-technology assets accessible to the application developer, and the orchestration engine may be configured compile, link, and/or assemble one or more mutually compatible combinations of the selected services (e.g., infrastructural assets, platform assets, data sources, application programming interfaces, and/or application parts, "apps," and widgets) to generate or "spin-up" instances of mobile applications. The orchestration engine may, for example, link the generated instances to sources of data having appropriate permissioning and compliance policies, and may package the instantiated applications and linked data sources into modules for delivery to the application developer.

In one aspect, the orchestration engine may receive a request from the application developer to access one or more selected services (e.g., in step 1502). As noted above, the application developer may select the available services (e.g., one or more of services 1400) from those presented within a self-serve IT asset store, and IT system 150 may be configured to present the selected services to the application developer for review (e.g., within a corresponding IT asset canvas). In certain aspects, the selected services may corresponding to one or more information-technology assets accessible by the application developer, which may include, but are not limited to, infrastructural assets, platform assets, data or database assets, analytical services, reporting services, application programming interfaces (APIs), and application parts. Further, as described above, the application developer may request access to the selected services (e.g., by clicking on or otherwise selecting a "check out" region of the self-serve IT asset store).

In response to the received request, the orchestration engine may determine the whether the application developer provided or is capable of providing funds to IT system 150 that are sufficient to obtain access to the selected services (e.g., in step 1504). If the orchestration engine were to determine that the application developer did not provide or is incapable of providing the sufficient funds (e.g., step 1504; NO), the orchestration engine may provide a notification (e.g., within the web page or interface associated with the self-serve IT asset store) that alerts the application developer to the deficiency (e.g., in step 1506). Exemplary method 1500 is then complete in step 1508.

If, however, the orchestration engine were to determine that the application developer provides or is capable of providing the sufficient funds (e.g., step 1504; YES), the orchestration engine may determine whether the selected services include at least a minimum set of services required to generate or "spin-up" an instance of the mobile application (e.g., in step 1510). For example, the minimum set of services may include, but is not limited to, at least one selected hardware service, at least one selected network resource, at least one selected cloud stack service, selected virtual machine assets, and corresponding APIs that facilitate communications between the selected assets, resources, and services. The minimum set of services may, for example, include services having predetermined classes of information-technology assets (e.g., "asset classes) required to spin-up the instance and enable the instance to be fully functional when executed by a specified combination of infrastructural assets (e.g., as included within the selected services).

In some instances, IT system 150 and/or the business entity may establish the minimum set of services required to spin-up the instance. In other instances, however, the minimum set of services may vary in accordance with characteristics of the set of services (e.g., the minimum services necessary to support a mobile app for a financial institution's loan business may differ from the minimum services necessary to support a mobile banking application).

If the orchestration engine were to determine the application developer did not select the minimum number of services (e.g., in step 1510; NO), the orchestration engine may identify one or more additional services that, in conjunction with the selected services, form at least the minimum number of services required to spin up the mobile application instance (e.g., in step 1512). In certain aspects, the orchestration engine may determine that the services selected by the application developer fail to include information-technology assets associated with at least one of the predetermined asset classes (e.g., which may be required to spin-up the instance), and the one or more additional services identified in step 1512 may correspond to information-technology assets associated with the at least one predetermined asset classes.

By way of example, selected services may include hardware assets (e.g., hardware assets 1302 of FIG. 13) and cloud connectivity (e.g., cloud stack assets 1304 of FIG. 13), but may not include the necessary operating system and middleware. In some aspects, the orchestration engine may identify an operating system (e.g., operating systems 1306A of FIG. 13) and corresponding middleware (e.g., middleware 1306B of FIG. 13) that are appropriate for the selected hardware assets and cloud connectivity. In step 1512, the orchestration engine may add the identified operating system and middleware top the selected services.

In other instances, the selected services may include the necessary hardware assets, cloud connectivity, operating system, and middleware, but may fail to include a selection of an application supported by a corresponding virtual machine. In one aspect, the orchestration engine may select a web server, a web farm, and/or clustering infrastructure (e.g., one of applications 1306C of FIG. 13) appropriate to the previously selected hardware assets, cloud connectivity, operating system, and middleware. In step 1512, the orchestration engine may add the identified application (or applications) to the selected services.

In step 1514, the orchestration engine may obtain information (e.g., metadata) associated with the selected services, and may determine whether the selected services are functionally compatible and capable of exchanging data and other programmatic commands through the corresponding selected APIs. Further, in step 1514, the orchestration engine may further determine whether the selected services are consistent with at least one compliance or permissioning policy specified by the application developer (e.g., one or more of services 1416 of FIG. 14) and/or associated with the orchestration engine.

In certain instances, if the orchestration engine were to identify an incompatible or inconsistent one of the selected services (e.g., step 1514; NO), the orchestration engine may identify a replacement service that is functionally compatible with the other selected services (e.g., in step 1516). The orchestration engine may, for example, automatically add the replacement service to the other services selected by the application developer in step 1516.

In some embodiments, the orchestration engine may be configured to may assemble, compile, and/or link combinations of the services to generate or "spin-up" one or more instances of mobile application requested by the application developer (e.g., in step 1518). In one instance, the orchestration engine may be configured to spin-up a single instance of the requested mobile application based on the selected services. In other aspects, however, the orchestration engine may be configured to spin-up any arbitrary number of instances of the requested mobile application (e.g., instances 1460 of FIG. 14).

By way of example, the orchestration engine may spin-up instances of the requested mobile application appropriate for initial testing and development, for virtualization (e.g., using applications, middleware, and operating systems associated with a virtual machine), and further, for quality assurance purposes. In certain aspects, the application developer may associate one or more database services (e.g., services 1406 of FIG. 14) and/or data services (e.g., services 1408 of FIG. 14) with corresponding ones of the generated instances, and further, the generated instances may be associated with various capabilities to modify accessed data. Further, as described above, the application developer may delegate one or more of these testing, development, virtualization, and quality-assurance processes to individuals having various relationships with the financial institution and/or the developer, and thus, having various capabilities to access the underlying business and customer data required by the applications.

Further, as noted above, the generated instances may be associated with one or more selected data permissioning and compliance services (e.g., one or more of services 1416 of FIG. 14). In some embodiments, the orchestration server may access information associated with the selected data permissioning and compliance services associated with the generated instances (e.g., metadata provided by IT system 150), and may determine, for each of the generated instances, whether the selected services (including the selected data and database services) are consistent with the selected data permissioning and compliance services (e.g., in step 1520). Further, in step 1520, the orchestration server may also determine whether data access permissions associated with the individuals to whom the application developer delegated execution of the generated instances are consistent with the selected data permissioning and compliance services.

If it is determine that no inconsistencies exist (e.g., step 1520; NO), the orchestration engine may establish links between the generated instances and corresponding ones of the selected data and/or database services (e.g., in step 1522). The orchestration engine may be further configured to package the generated instances and information identifying the linked data and/or database services into a module having a format suitable for delivery to a device (e.g., client device 210 of FIG. 2) associated with the application developer (e.g., in step 1524). By way of example, the orchestration engine may package the generated instance as Javascript or other HTML code, with information identifying the linked being provided as metadata. In other instances, the generated instances and linking information may be compiled together and provided to the device as an executable file.

In some aspects, the orchestration engine may be configured to provide the one or more packaged modules to the application developer's device using any of the communications protocols outlined above (e.g., in step 1524). Additionally or alternatively, the orchestration engine may be configured to provide information and/or links to the application developer's device that enable the application developer to download or otherwise obtain the one or more packaged modules from a locally accessible data repository. In certain aspects, and using the packaged modules, the application developer may generate, debug, and deploy the mobile applications necessary to provide the mobile platform requested by the financial institution. Exemplary method 1500 is then complete in step 1508.

If, however, it is determined that inconsistencies exist between the selected services (and/or the delegated individuals) and the selected data permissioning and compliance services (e.g., step 1520; YES), exemplary processes may pass back to step 1506. In some aspects, the orchestration engine may provide a notification (e.g., within the web page or interface associated with the self-serve IT asset store) that alerts the application developer to the inconsistency, and exemplary method 1500 is then complete in step 1508.

Referring back to step 1510, if the orchestration engine were to determine that the application developer selected at least the minimum number of services (e.g., step 1510; YES), the orchestration engine may obtain information (e.g., metadata) associated with the selected services, and determine whether the selected services are mutually compatible and capable of exchanging data and other programmatic commands through the corresponding selected APIs, as described above in reference to step 1514. Further, if it is determined that the selected services are mutually compatible (e.g., step 1514; YES), the orchestration engine may be configured to assemble combinations of the selected services to generate or "spin-up" one or more instances of the mobile application (or applications) requested by the application developer, as described above in step 1518.

Using the disclosed embodiments, an orchestration engine provided by IT system 150 may provide enterprise-building services that generate or "spin-up" instances of executable applications, that link the generated instances to sources of data having appropriate permissioning and compliance policies, and that package the instantiated applications and linked data sources into a module for delivery to an application developer. In certain instances, enterprise-building services consistent with the disclosed embodiments may enable an application developed to rapidly generate, debug, and deploy mobile applications supporting new and complex enterprise platforms.

Further, in the embodiments described above. IT system 150 may execute one or more software processes to provide the functionality of the orchestration system. In other embodiments, an additional computer system in communication with IT system 150 may be configured to execute the software processes that provide the orchestration engine functionality. Further, in additional embodiments, the orchestration engine may be provided as specialized hardware in communication with IT system 150 and devices of the application developer across a corresponding communications network.

In the exemplary embodiments described above, a system associated with a business entity (e.g., IT system 150) may provide IT assets as "services" that enable an application developer to rapidly and robustly develop and deploy instances of applications for execution on various computing platforms (e.g., iOS™ devices, Android™ devices, etc.). For example, as described above, the application developer may access a web page or graphical user interface (GUI) that identifies and presents available "services" (e.g., the exemplary interface of the self-serve IT asset store of FIG. 8). The services available to the application developer and presented by the web page or GUI may include, but are not limited to, infrastructure-based assets (e.g., available operating systems, processors, memory, cloud storage, etc.), platform-based assets (e.g., containers available for Android™ devices, iOS™ devices, etc.), data and database services (e.g., data sets available for quality control, testing, visualization, etc.), API-based services (e.g., available APIs that standardize access to core engines), application-based services (e.g., available business and/or container "apps" and portions of "apps"), reporting and analytics-based services, and services that permissioning and compliance with various regulations and policies (e.g., PCI policies, SOX policies, compliance with audit, logging, and reporting policies, compliance with data access policies and permissions, etc.).

In some aspects, the application developer may select a subset of the available assets, and as described above, IT system 150 may be configured to generate and present to the application developer (e.g., through the web page or GUI) an IT asset canvas that represents the selected services and their relationship to other IT assets (e.g., required input data, etc.). As described above, the selected IT assets may be configured as core building blocks for larger applications that, when executed by corresponding mobile devices, servers, and/or computer systems, facilitate the provision of services by various enterprises, such as business entities and financial institutions. For example, the selected IT assets may include executable applications (e.g., mobile apps, widgets, application parts, etc.) that provide granular computational and data access capabilities. The application developer may, in some instances, assemble and link the selected IT assets to appropriate data inputs and outputs (e.g., through corresponding APIs) to generate or "spin-up" an instance of an application that provides one or more services to customers and/or employees of the business entities.

In further aspects, and in addition to providing one or more IT assets as "services" to application developers, IT system 150 may also provide enterprise-building services that generate or "spin-up" instances of executable applications, that link the generated instances to sources of data having appropriate permissioning and compliance policies, and that package the instantiated applications and linked data sources into modules for delivery to an application developer. By way of example, as described above, IT system 150 may be configured to receive the application developer's selection of available IT assets (e.g., using the self-serve IT store accessed through a web page or other GUI). In certain aspects, IT system 150 may be configured to execute processes that provide an "orchestration engine" capable of parsing the selected IT assets, and further, determining whether the selected IT assets include infrastructure-based, platform-based, and software-based assets that are compatible and sufficient to generate or "spin-up" multiple instances of a corresponding application (or corresponding applications) for an enterprise. As described above, the selected IT assets may include, but are not limited to, hardware assets (e.g., processors, mobile platforms, memory, etc.), cloud-based storage assets, operating systems, middleware, and/or granular applications supported by the operating systems and middleware and executable by the hardware assets.

In certain aspects, the generated application instances (e.g., the one or more application instances "spun-up" by the orchestration engine executed by IT system 150) may deployed to various networked computing systems and devices (e.g., iOS™ devices, Android™ device, etc.) operating across the enterprise. To function effectively within the enterprise, the generated application instances require access to timely, accurate, and consistent data. In some instances, however, heterogeneous data formats, application integration costs, and batch processing lag times associated with the various computing systems, devices, and data repositories operating within the enterprise may render difficult the timely provision of accurate and consistent data.

Further, in other aspects, the data linked to the various generated instances may be subject to different permissioning and compliance policies. For example, portions of raw customer, transaction, and/or account data linked to the generated application instances (e.g., as input data, and additionally or alternatively, sources of data supporting visualization or quality control) may be subject to strict permissioning policies that limit access to specific individuals identified by the business entity. In some instances, the strict permissioning policies may curtail an ability of the application developer and/or the business unit to delegate visualization or quality control to third-parties. Furthermore, the actual customer and/or business data may be subject to strict auditing and compliance policies that the business entity may not apply to the exemplary input data linked to the instance generated for initial testing.

Thus, in certain aspects, the application developer must identify (e.g., through the self-serve IT store accessed through a web page or other GUI) available IT assets that, when assembled and linked to appropriate data sources, provide the one or more services desired by the enterprise, and further, are associated with data permissioning and compliance policies that are mutually compatible with each other and with the individuals or entities charged with executing the application instances. The need to identify and mediate conflicts between the data permissioning and compliance policies may challenge application developers and may slow the generation of instances of multiple executable applications for initial testing, development, visualization, and quality-control purposes across the enterprise.

In some embodiments, IT system 150 may be configured to execute software processes that establish and maintain an enterprise data provisioning platform capable of provisioning data services (e.g., database-as-a-service 1406 and data-as-a-service 1408 of FIG. 14), reporting services (e.g., reporting-as-a-service 1410), and/or analytical services (e.g., analytics-as-a-service 1412 of FIG. 14) across an enterprise. In one aspect, the enterprise may be associated with a financial institution or other business entity. Further, the enterprise data provisioning platform may, in certain aspects, be configured to store one or more source data and/or database assets in a variety of native and common formats, and to provide application instances executing throughout the enterprise with timely and consistent access to portions of the source data and database assets (e.g., through corresponding APIs). In further aspects, the enterprise data provisioning platform may provide access to IT assets associated with the data and database services, reporting services, and/or analytics services in a manner consistent with one or more data governance, permissioning, and compliance policies of the enterprise.

Further, in one embodiment, IT system 150 may maintain the enterprise data provisioning platform within a locally accessible data repository (e.g., in memory 254 of FIG. 2). For example, IT system 150 may configure the enterprise data provisioning platform as a Hadoop Apache Distribution, and IT system 150 may maintain in memory 254 copies of source data sets, databases, files, and/or executable applications necessary to provide the data, reporting, and analytical sources outlined above.

In other embodiments, IT system 150 may maintain the enterprise data provisioning platform on an additional computing device (e.g., an enterprise data provisioning platform device) connected to network 150 and accessible to IT system 150 across network 225 using any of the communication protocols outlined above. In some instances, the enterprise data provisioning platform device may include one or more processors (and/or servers) and one or more memories, which may be configured to maintain the enterprise data delivery platform and the source data sets, databases, files, and/or executable applications necessary to provide the data, reporting, and analytical sources outlined above. Further, in certain aspects, the one or more processors (or servers) of the enterprise data provisioning platform device may execute instructions that facilitate exchanges of data, search queries, etc., with IT system 150 through corresponding APIs to facilitate the provision of data, reporting, and/or analytical services through a corresponding self-serve IT asset store, as described below.

In some aspects, the application developer may access the enterprise data provisioning platform, and the data, reporting, and analytical assets maintained by the enterprise data provisioning platform, through a corresponding web page or graphical user interface (GUI) provided by IT system 150 and presented by a corresponding device (e.g., client device 210). For example, an application developer may access the data services, reporting services, and/or analytical services provided by IT system 150 through a "Data Store" portion of a self-serve IT asset store, which may be provided by IT system 150 and presented to the application developer through a corresponding web page or GUI (e.g., presented by client device 210). In some instances, as described above, IT system 150 may be configured to identify one or more of the provided data, reporting, and analytical services that are available to the application developer (e.g., through an orchestration engine that parses the data governance, permissioning, and compliance policies of the enterprise).

IT system 150 may provide, as input to client device 210, information that instructs client device 210 to present the one or more available data, reporting, and analytical services through a data store component of the self-serve IT asset store. As described above, the application developer may select a subset of the available data, reporting, and analytical services, either alone or in conjunction with additional services and assets accessible to the application developer and included within the self-serve IT asset store (e.g., infrastructural assets, platform assets, application programming interfaces (APIs), and/or application parts). IT system 150 may receive information from client device 210 identifying the user's selection of the one or more services, and based on the received information, may establish linkages between the selected services and provide information identifying the established linkages to client device 210, which may present the information to the application developer for review (e.g., within a corresponding IT asset canvas). As described above, the application developer may request access to the selected services (e.g., by clicking on or otherwise selecting a "check out" region of the self-serve IT asset store), and upon processing of an appropriate payment, IT system 150 may be configured to provide the linked services to the application developer (e.g., to client device 210) and additionally or alternative, configure an orchestration engine to "spin-up" instances of executable applications using any of the techniques described above.

In certain embodiments, IT system 150 may be configured to provide, to the application developer, an opportunity to establish a single order for IT assets associated with the selected data, reporting, and/or analytical services, and additionally or alternatively, establish a schedule for recurring distribution of the IT assets associated with the selected data, reporting, and/or analytical services. By way of example, IT system 150 may provide, to client device 210, information that instructs client device 210 to present a scheduling interface to the application developer subsequent to the selection of the data, reporting, and/or analytical services (e.g., through the data store component of the self-serve IT asset store). In some aspects, the application developer may provide, as input to the scheduling interface, information establishing the single order for the IT assets (e.g., a request to provision the IT assets upon instantiation of the linked services within the enterprise, at a specified time and/or date after instantiation, etc.), and additionally or alternatively, information establishing the recurring order of the IT assets (e.g., at recurring dates and/or times).

By way of example, the application developer may select one or more services that, when linked by IT system 150, establish an instance of a mobile banking application executable on Android™ devices within the enterprise. In some aspects, the application developer may select one or more data services that provide access to customer, account, and/or transaction data maintained by the enterprise data provisioning platform for testing purposes, and may further establish a single order for the customer, account, and/or transaction data (e.g., IT assets) associated with the selected services. Further, for example, the application developer may select services that, when linked together by IT system 150, establish a mobile application executable by iOS™ devices to provide metrics indicative of customer access to an online banking service. In certain instances, the application developer may select a reporting service that leverages segmented customer and account data to generate the customer access metrics, and may establish, through the scheduling interface, a recurring distribution of the IT assets necessary to generate the customer access metrics. Upon receipt of the scheduling information input by the application developer into the scheduling interface (e.g., as presented by client device 210), IT system 150 may configure the enterprise data provisioning platform to provide the requested IT assets in accordance with the established schedule and consistent with the data permissioning and compliance policies of the enterprise, as described below.

Further, in additional aspects, IT system 150 may be configured to provide, to the application developer, an opportunity to query the enterprise data provisioning platform to identify data, reporting, and/or analytical services that satisfy search criteria specified by the application developer. For example, IT system 150 may provide, to client device 210, information that instructs client device 210 to present a search interface (e.g., within the data store portion of the self-serve IT asset store) that enables the application developer to input search criteria and request that IT system 150 search the enterprise data provisioning platform for data, reporting, and/or analytical services available to the application developer (e.g., based on the data governance, permissioning, and compliance policies of the enterprise) and that match the search criteria.

In some instances, the enterprise data provisioning platform may maintain metadata describing characteristics, functional capabilities, necessary inputs, and potential outputs for the IT services supported by the enterprise data provisioning platform. IT system 150, upon receipt of the search criteria from client device 210, may parse the maintained metadata to identify one or more of the supported IT services that match the specified search criteria and that comply with the data permissioning and compliance policies of the enterprise (and thus are available to the application developer). Further, IT system 150 may provide, to client device 210, information identifying the one or more matching and available data, reporting, and/or analytical services, which client device 210 may present to the application developer for selection and purchase using any of the exemplary techniques outlined above.

Further, in certain aspects, IT system 150 may also provide the application developer with functionality to establish search criteria that define a resultant asset set (e.g., a combination of data, reporting, and/or analytical services provisioned by the enterprise data provisioning platform), and further, request access to the resultant asset set on a recurring basis. For example, the application developer may, through one or more interfaces presented by client device 210, establish search criteria and request recurring delivery of a resultant data set that matches the established search criteria (e.g., to an API of an executing application instance). IT system 150 may, in some instances, parse the maintained metadata at the recurring intervals to identify a subset of the supported data assets that match the search criteria and are available to the application developer, which IT system 150 may provide to the application developer and/or the executing application instance as the resultant data set. In certain instances, a composition of the resultant dataset (and additionally or alternatively, a resultant set of assets) and its attribute dependencies may by managed automatically by IT system 150 (e.g., to ensure compliance with data governance, permissioning, and compliance policies for the enterprise).

The disclosed exemplary embodiments are, however, not limited to resultant asset sets having characteristics that match a single, specified set of search criteria. In additional embodiments, IT system 150 may provide the application developer to with functionality (e.g., through one or more web pages or GUIs presented by client device 210) to compose requirements for a desired set of IT assets based on logical combinations of previously specified sets of search queries. For instance, through web pages and or GUIs presented by client device 210, the application developer may request a one-time or recurring delivery of an asset set (e.g., data, reporting, and/or analytics) established by a intersection of results from prior search queries, a union of results from the prior search queries, and any additional or alternate logical operation performable on the prior search queries and appropriate to the metadata maintained by the enterprise data provisioning platform.

In the exemplary embodiments described above, a self-serve IT asset store may include data services, reporting services, and/or analytical services available for selection by an application developer. For example, the application developer may input one or more authentication credentials (e.g., a user name, a password, a biometric credential, etc.) into a web page or GUI associated with IT system 150 and presented by client device 210. Upon receipt of the authentication credentials, IT system 150 may parse metadata characterizing the data, reporting, and/or analytical assets maintained by an enterprise data provisioning platform, and based on data permissioning and compliance policies of the enterprise, identify the data, reporting, and/or analytical assets available for distribution as services to the application developer. IT system 150 may, in some instances, provide information identifying the available services to client device 210, which may present the available data, reporting, and/or analytical services to the application developer through a data store portion of the self-serve IT asset store.

As described above, IT system 150 may receive a selection of one of more of the available data, reporting, and/or analytical services, may link the selected data, reporting, and/or analytical services with other selected services (e.g., infrastructural assets, platform assets, application programming interfaces (APIs), and/or application parts) to generate an application instance, and may provide the generated application instance to the application developer (e.g., at client device 210). Further, upon execution of the generated application instance, IT system 150 may be configured to provide the IT assets associated with the selected data, reporting, and/or analytical services to the executed application instance in accordance with the established distribution schedule.

In further embodiments, and prior to delivery of the selected data, reporting, and/or analytical assets, IT system 150 may be configured to execute software processes that modify at least a portion of the selected data, reporting, and/or analytical assets to render a content of these assets consistent with their intended use, and additionally or alternatively, an intended recipient. For example, the application developer may select, within the self-serve IT asset store presented by client device 210, portions of available customer data, account data, and transaction data to serve as inputs during testing of an instance of a mobile banking application executable on Android™ devices.

In certain aspects, and as described above, the enterprise data provisioning platform supported by IT system 150 may maintain customer, account, and transaction data in a raw format that includes confidential, sensitive data. In an embodiment, IT system 150 may access the customer, account, and/or transaction data selected by the application developer for distribution as test data, and through an analysis of metadata stored by the enterprise data provisioning platform, establish that at least a portion of the selected customer, account, and/or transaction data includes sensitive information. IT system 150 may, in some aspects, modify the accessed portions of the selected customer, account, and/or transaction data to remove the sensitive portions from the customer, account, and/or transaction data, and additionally or alternative, to obfuscate the sensitive portions of the customer, account, and/or transaction data. IT system 150 may be configured to provision the modified customer, account, and/or transaction data to the executed application instance and/or the application developer in accordance with the established delivery schedule.

For example, the application developer may select customer data records, which include customer social-security numbers, and account data records, which include actual customer account numbers, as input for testing the mobile banking application. Using the exemplary techniques described above, IT system 150 may access metadata maintained by the enterprise data provisioning platform to determine that the customer social-security numbers and the actual account numbers represent sensitive information. In some aspects, IT system 150 may be configured to modify the selected customer and account data records by deleting at least a portion of the sensitive information from selected customer and account data records, and additionally or alternatively, by obfuscating at least a portion of the sensitive information within the selected customer and account data records. In certain aspects, IT system 150 may be configured to provision the modified customer and account data to the executed application instance and/or the application developer as test data in accordance with the established delivery schedule, as described above.

In one aspect, IT system 150 may be configured to modify the selected customer and account data records by deleting the customer social-security numbers and the actual account numbers. By way of example, data records corresponding to the customer social-security numbers and the actual account numbers within the selected customer and account data records may be blank or empty. IT system 150 may, in some instances, provide the modified customer and account data records, which include no sensitive information, to the executed application instance and/or the application developer as test data in accordance with the established delivery schedule and using any of the exemplary techniques described herein.

In other aspects, IT system 150 may configured to obfuscate the customer social-security numbers and actual account numbers by replacing at least a portion of the customer social-security numbers and actual account numbers with one or more character strings. For example, IT system 150 may replace a portion of the customer social-security numbers and the actual account numbers with character strings (e.g., groups of consecutive characters, such as "X," "Y," or "Z") that conform to the length and format of the customer social-security numbers and the actual account numbers (e.g., replace customer social-security numbers character strings "XXX-YY-ZZZZ"). The disclosed embodiments are, however, not limited to replacement character strings that conform to the length and format of the customer social-security numbers and the actual account numbers. In additional embodiments, IT system 150 may be configured to replace all or portions of the customer social-security numbers and the actual account numbers with character strings having any additional or alternate length and format to further obfuscate the customer social-security numbers and the actual account numbers within the selected customer and account data records. As described above, IT system 150 may provide the modified customer and account data records, which include the obfuscated portions of the sensitive information, to the executed application instance and/or the application developer as test data in accordance with the established delivery schedule.

Through the disclosed embodiments, IT system 150 may provide an enterprise data provisioning platform that, for example, adaptively provisions timely, accurate, and consistent data services, reporting services, and analytical services that conform with data governance, permissioning, and compliance policies established by an enterprise. As discussed above, an application developer may access the enterprise data provisioning platform, and the data, reporting, and analytical assets maintained by the enterprise data provisioning platform, through a web page or graphical user interface (GUI) associated a "data store" provided by IT system 150. Further, IT system 150 may be configured to modify portions of the data, reporting, and analytical assets to obfuscate sensitive customer and business-domain information prior to distribution in accordance with an established schedule.

Figure 16:
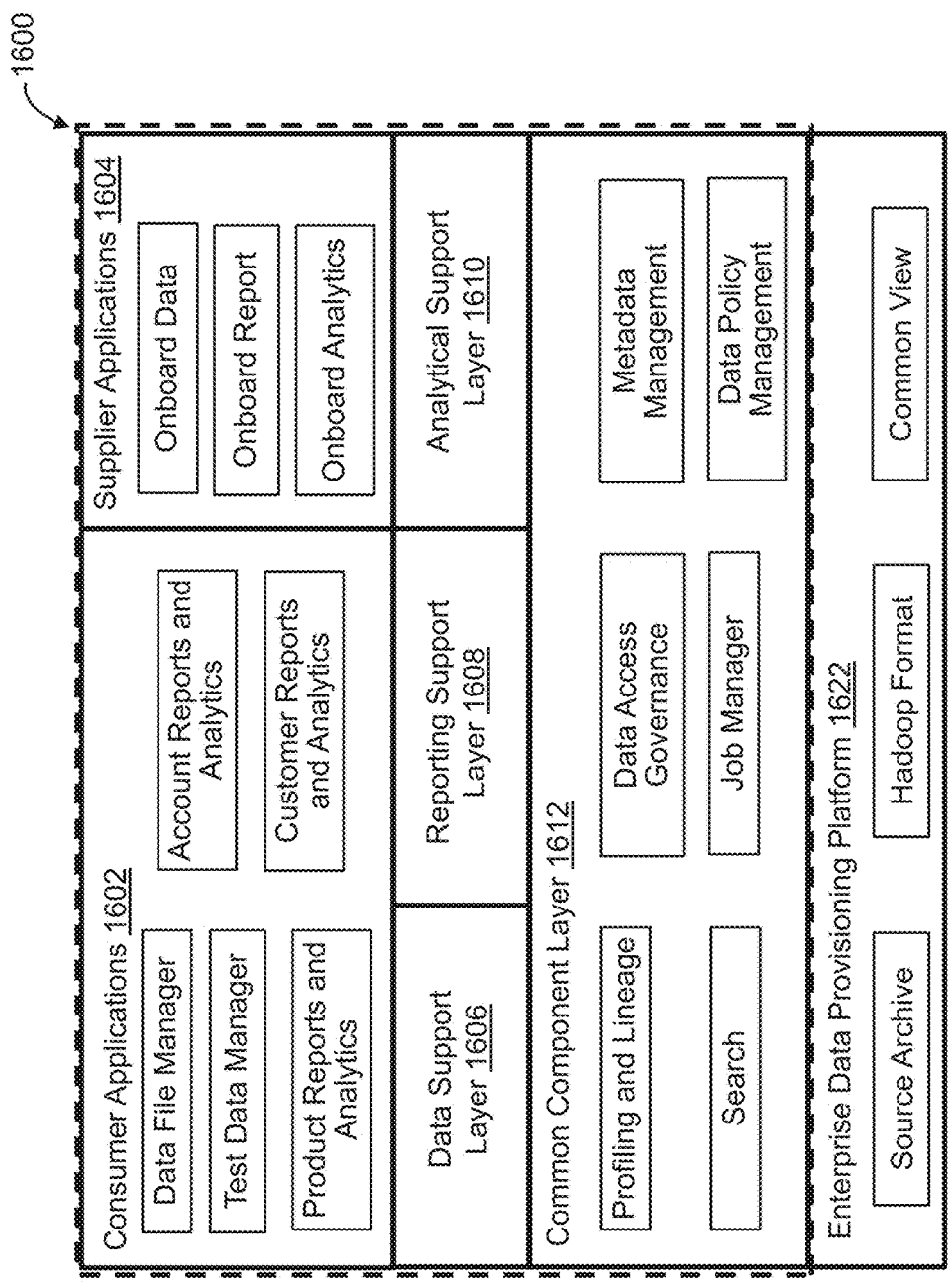
FIG. 16 illustrates components of an exemplary self-serve IT asset store and an enterprise data provisioning platform, consistent with disclosed embodiments.

FIG. 16 is a diagram illustrating components 1600 of an exemplary self-serve data store (e.g., the data store portion of the self-serve IT asset store of FIG. 8) provided by IT system 150 and provisioned with data, reporting, and analytical services by an enterprise data provisioning platform 1622. In certain aspects, enterprise data provisioning platform 1622 may be configured as a Hadoop Apache Distribution, and may maintain copies of source data sets and/or databases uploaded by corresponding source systems or source feeds. As described above, enterprise data provisioning platform 1622 may, in conjunction with IT system 150, provide computing systems operating within the enterprise with data, reporting, and/or analytical services that conform to data governance, permissioning, and compliance policies established by the enterprise. Further, in certain aspects, the self-serve data store may provide an application developer (and additionally or alternatively, a data supplier), with executable applications and APIs that enable consumers to acquire data, reporting, and/or analytical asserts provisioned by the enterprise data provisioning platform (and additionally or alternatively, with executable applications and APIs that enable a supplier to "onboard" data, reporting, and analytical assets into enterprise data provisioning platform 1622 for access through the self-serve data store).

In some aspects, enterprise data provisioning platform 1622 may maintain copies of data, reporting, and/or analytical assets associated with the source systems across the enterprise. For example, enterprise data provisioning platform 1622 may include a source archive configured to maintain copies of the data, reporting, and analytical assets in original file formats and schemas that correspond to the computing platforms of the source systems. In some aspects, the data assets maintained within the source archive may include raw customer, transaction, account, and/or business-specific data that, using any of the techniques described above, may be sanitized prior to provisioning as test data.

Enterprise data provisioning platform 1622 may also include data assets stored in a Hadoop-friendly format (e.g., data assets having delimited text structures) that maintains the original schemas associated with the source systems. In certain aspects, IT system 150 may be configured to execute software processes that transform the original file format of the data assets (e.g., associated with the source systems) into the Hadoop-friendly format prior to onboarding and storage within enterprise data provisioning platform 1622. In further aspects, enterprise data provisioning platform 1622 may also include data assets stored in a common data format corresponding to various business domains characteristic of the enterprise, which include, but are not limited to, customer domains, account domains, product domains, and project-specific domains (e.g., corresponding to specific lines-of-business).

Further, components 1600 of the self-serve data store may include customer applications 1602 and supplier applications 1604. In certain aspects, customer applications 1602 may include one or more applications executable on various computing platforms to acquire data, reporting, and/or analytical assets from enterprise data provisioning platform 1622. Supplier applications 1604 may, in some aspects, include one or more applications that, upon execution, may enable an asset supplier to onboard data, reporting, and/or analytical assets for storage and provisioning by enterprise data provisioning platform 1622.

By way of example, consumer applications 1602 may include, but are not limited to, a data file manager, a test data manager, a customer reports and analytics application, an account reports and analytics application, a product reports and analytics application, and an advanced analytics application. In some instances, the data file manager may, upon execution by a computing device, be configured to extract one or more data assets maintained by enterprise data provisioning platform 1622 based on a selection by an individual (e.g., an application developer) and/or in response to one or more queries and/or filters established by the application.

In some instances, the test data manager may correspond to an executable application available to an application developer or authorized user (e.g., as authorized by the data governance, permissioning, and compliance policies of the enterprise) through a portion of a self-serve IT asset store provided by IT system 150. Upon execution by a computing device, the test data manager may be configured to access one or more data assets selected by the application developer and maintained by enterprise data provisioning platform 1622 (e.g., as obtained by the data file manager described above). In certain aspects, the executed test data manager may be configured to generate meaningful test data that facilitates and expedites operational and quality control testing of one or more application instances established or "spun-up" by IT system 150.

For instance, to facilitate the development of the test data, the executed test data manager many enable an application developer to specify (e.g., as input to a web page or other GUI presented by client device 210) one or more data assets associated with corresponding source computing systems, a desired number of data records from the one or more data records, a destination system, and/or a frequency or recurring schedule for distribution of test data to the destination system. The test data manager may, in some aspects, create a query to obtain the one or more specified data assets, parse corresponding metadata to identify sensitive portions of the obtained data assets, delete and/or obfuscate the sensitive data portions, and distribute the desired number of data records (e.g., with the sensitive data portions obfuscated and/or deleted) to the destination system in accordance with the specified frequency or recurring schedule.

Further, in additional aspects, the executed test data manager may access and exchange data with one or more supporting applications (e.g., though a corresponding API) that, when executed by a computing device, perform processes that support the generation of the test data from the one or more selected data assets. For example, the executed test data manager may, through a corresponding API, provide portions of the obtained data assets and corresponding metadata to a data obfuscation application (e.g., as described below in reference to data service layer 1606). Upon execution, the data obfuscation application may be configured to parse the corresponding metadata to identify sensitive portions of the obtained data assets, modify the obtained data assets by deleting and/or obfuscating the sensitive data portions, and return the modified data assets to the executed test data manager through the corresponding API. The executed test data manager may, in some instances, provide the desired number of data records of the modified data assets to the destination system as test data in accordance with the specified frequency or recurring schedule, as described above.

In additional embodiments, consumer applications 1602 may include one or more applications that, when executed across the enterprise, provide reporting and analytical services that leverage business-domain data maintained by enterprise data provisioning platform 1622. For example, reporting applications consistent with the disclosed embodiments may provide an application developer or other authorized user (e.g., as authorized by the data governance, permissioning, and compliance policies of the enterprise) with access to the business-domain data, and further, to reports and other visualizations of specific segments of the business domain data. In certain aspects, the reporting application may and may receive, as inputs, portions of the business-domain data maintained in a common data format by enterprise data provisioning platform 1622 (e.g., and modified to delete or obfuscate sensitive data using any of the exemplary techniques described herein).

The business-domain data may, for example, include customer-related information, account-related information, transaction-related information, and product-related information, and in certain aspects, reporting applications consistent with the disclosed embodiments may generate reports and graphical visualizations of corresponding portions of the customer-related information, the account-related information, the transaction-related information, and/or the product-related information. Further, in some aspects, the reporting applications may, upon execution, enable the application developer or authorized user to generate the reports and graphical visualizations directed to customers, accounts, transactions, and/or products segmented in accordance with geographic criteria, line-of-business criteria, source-system criteria, and any additional or alternate appropriate segmentation related to the business-domain data. The disclosed embodiments are, however, not limited to the exemplary customer-, account-, transaction-, and product-related information outlined above, and in other embodiments, the business-domain data may include any information characterizing any additional or alternate business domain of relevant to the enterprise.

In further instances, analytical applications consistent with the disclosed embodiments may incorporate one or more pre-built analytical model that focus on and provide insight regarding specific business domains within the enterprise. By way of example, the analytical applications provided to application developers and other authorized users may include, but are not limited to customer-based analytical applications, marketing-based analytical applications, fraud-based analytical applications, and analytical applications that provide risk ratings for customers of the enterprise. The disclosed embodiments are, however, not limited to analytical applications and corresponding pre-built models directed to these exemplary business domains, and in additional embodiments, consumer applications 1602 may include analytical applications and pre-built models corresponding to any additional or alternate business domain relevant and appropriate to the enterprise.

For example, customer-based analytical applications may, upon execution, provide information identifying customers of an enterprise segmented in accordance with various business-domain criteria (e.g., product criteria, account criteria, geography, etc.). For example, the enterprise may be associated with a financial institution, and using one or more of the customer-based analytical applications, an application developer may obtain information identifying customers of the financial institution that hold a certain type of account (e.g., a Demand Account) at the financial institution having greater than a threshold balance (e.g., $100,000).

Marketing-based analytical applications may, upon execution, provide customer data, transaction data, and metrics indicative of a performance of one or more marketing campaigns across key demographics or business domains. As described above, the marketing-based analytical applications may support segmentations based on customer, product, price, and/or promotions, and may in some aspects assist an authorized user to optimize marketing campaigns.

In some instances, fraud-based analytical applications may, upon execution, provide an application developer and/or authorized users of a financial institution with information indicative of an operation of internal fraud-prevention controls and further, may identify financial services transactions (e.g., purchase transactions, withdrawal transactions, etc.) that represent potential fraudulent activities, such as card skimming or check tampering. Further, one or more of the analytical applications may also generate metrics (e.g., risk ratings or scores) indicative of a credit risk associated with a particular customer (e.g., a risk of default on extended credit), a risk that a customer is laundering money (e.g., an AML risk), and/or a risk that the customer engages in fraudulent activities. The disclosed embodiments are not limited to these exemplary risk metrics, and in additional embodiments, the risk-based analytical applications may generate any additional or alternate risk metrics relevant to the enterprise and appropriate to assessment via computed metrics.

Referring back to FIG. 16, components 1600 also include supplier applications 1604 that enable source systems within the enterprise and additionally or alternatively, third-party data suppliers external to the enterprise, to upload data, reporting, and/or analytical assets to enterprise data provisioning platform 1622. Further, in some aspects, supplier applications 1600 may facilitate an establishment of one or more charge-back models that enable IT system 150 to charge consumers for accessing the uploaded data, reporting, and/or analytical assets based on a rate of consumption of these IT assets.

For example, supplier applications 1604 may include specific onboard data, reporting, and analytical applications that, upon execution, enable the source computing systems and third-party data suppliers to upload corresponding ones of the data, reporting, and analytical assets to enterprise data provisioning platform 1622, and to establish appropriate charge-back models, as described above. In certain instances, the uploaded data may include discrete data files, continuous or periodic data feeds (e.g., ticker updates, etc.), and/or database assets, and the uploaded reporting and analytical assets may corresponding to specific business domains (e.g., customer, account, transaction, product, etc.). Further, in some instances, the onboard data application may, upon execution, enable the source systems and third-party data suppliers to establish data schemas and data classifications, which may be maintained by enterprise data provisioning platform 1622 (e.g., as part of the source archive).

Components 1600 may also include a data support layer 1606, a reporting support layer 1608, and an analytical support layer 1610. In some aspects, data support layer 1606, a reporting support layer 1608, and an analytical support layer 1610 include one or more applications and APIs that, when executed by or implemented in conjunction with consumer applications 1602 and/or supplier applications 1604, enable application developers and other authorized parties to acquire or schedule an acquisition of data, reporting, and/or analytical assets from enterprise data provisioning platform 1622. In additional aspects, the one or more applications or APIs within data support layer 1606, reporting support layer 1608, and analytical support layer 1610, when executed by or implemented in conjunction with supplier applications 1604, may enable source systems and third-party data suppliers to upload data, reporting, and/or analytical assets for maintenance by the enterprise data provisioning platform 1622.

In some embodiments, data support layer 1606, reporting support layer 1608, and analytical support layer 1612 may include onboarding applications and APIs that ensure that the source computing systems and third-party data suppliers provide information identifying data schemas, data classifications, uploading frequencies, and other platform-specific data associated with the uploaded IT assets, and further, that the source computing systems and third-party data suppliers upload the assets in accordance with a contract or corresponding agreement with enterprise data provisioning platform 1622 and/or IT system 150. Further, by way of example, data support layer 1606, reporting support layer 1608, and analytical support layer 1610 may also include data browser applications that, when executed, enable application developers and other authorized parties to browse assets within the enterprise data provisioning platform 1622, and data extraction applications that, when executed, provide functionality to extract selected IT assets from the enterprise data provisioning platform 1622. Further, data support layer 1606 may include a data obfuscation application that, for example, may be configured to exchange data (e.g., data assets and/or metadata) with the test data manager through a corresponding API, modify data assets by deleting and/or obfuscating sensitive portions, and return the modified data assets through the corresponding API to the test data manager for distribution as test data across the enterprise.

In certain aspects, components 1600 also include a common component layer 1610. Common component layer 1612 may include executable applications, application parts, and APIs that provide functionality leveraged not only by consumer applications 1602, supplier applications 1604, and data, reporting, and analytical support layers 1606, 1608, and 1610, but also by other components of the self-serve IT asset store provided by IT system 150. For example, common component layer 1612 may include applications that enable IT system 150 to perform profiling and data lineage on IT assets maintained by enterprise data provisioning platform 1622. Common component layer 1612 may also include a search application that, when executed by IT system 150, provides functionality enabling applications developers, authorized third parties, and suppliers to search for IT assets maintained by enterprise data provisioning platform 1622 that match one or more established search queries (e.g., based on file name, attribute, metadata, schema, etc.).

Common component layer 1612 may also include a data access governance module that, upon execution by IT system 150, provides a "fine-grained" authorization that ensures an application developer, authorized party, and/or supplier accesses portions of the data, reporting, and analytical assets in a manner consistent with the data governance, compliance, and permissioning policies of the enterprise. In further aspects, common component layer 1612 include a metadata management module that, when executed by IT system 150, generates and maintains metadata characterizing the IT assets stored by enterprise data provisioning platform 1622. In some aspects, the metadata characterizing each of the stored IT assets may include information associated with a source system that uploaded the IT asset (e.g., a source-system description, business definition, MAL/ABOR code, etc.), information characterizing the IT asset (e.g., a file description, integrity check information, a frequency or schedule or provisioning or uploading, an IT asset type, a data classification, encryption data, etc.), and information characterizing attributes of the IT asset (e.g., schema level information, attribute names, attribute types, attribute descriptions, tagging information, etc.).

Further, in additional aspects, common component layer 1612 may also include a data policy management module that, upon execution by IT system 150, maintains and enforces data policies (e.g., data retention, data classification, etc.) within enterprise data provisioning platform 1622. The data policy management module may, in some implementations, include separate executable module for policy authorization and policy enforcement.

Using the disclosed embodiments, an application developer (or other authorized party) may access a data store associated with a self-serve IT asset store provided by IT system 150, which may be presented to the application developer through a web page or GUI. As described above, the application developer may select data, reporting, and/or analytical services that are available to the application developer and maintained by an enterprise data provisioning platform (e.g., enterprise data provisioning platform 1622). In some instances, through the presented web page or GUI, the application developer may link the selected data, reporting, and/or analytical services to an application instance previously generated by IT system 150, and further, may schedule a delivery of the IT assets associated with the selected data, reporting, and/or analytical services on a particular time and date (e.g., as soon as possible), or alternatively, in accordance with a recurring schedule.

In certain embodiments, using any of the techniques described above, IT system 150 may deliver the previously generated application instance and linked data, reporting, and/or analytical services to the application developer (e.g., at client device 210), or alternatively, may spin-up additional applications linked to the selected data, reporting, and/or analytical services. Further, in accordance with the specified delivery schedule, IT system 150 may be configured to access enterprise data provisioning platform 1622 and extract stored IT assets that correspond to the selected data, reporting, and/or analytical services. In certain aspects, the extracted IT assets may be transmitted, automatically and without additional input from the application developer, to a destination device (e.g., client device 210) across a corresponding computing network and when appropriate, to one or more application instances executing on corresponding destination devices across the enterprise through a corresponding API.

In some embodiments, the extracted IT assets may include sensitive or confidential information, and the enterprise's data governance, permissioning, and compliance policies may establish that the sensitive or confidential information is inappropriate for an intended use by the application developer or the executing application instances. By way of example, the application developer may generate an instance of a new banking application suitable for execution on Android™ devices. In order to properly test the operation of the new banking application, the application developer may access the data store portion of the self-serve IT asset store provided by IT system 150 (e.g., through a web page or GUI presented by client device 210), and may select one or more available customer and account data records. Using the exemplary techniques described above, IT system 150 (e.g., through the executed test data manager) may access the selected customer and account data records (and corresponding metadata), and may modify the selected customer and account data records for use as test data for the new mobile banking application.

For example, IT system 150 may access enterprise data provisioning platform 1622, and may extract the requested customer and account data. Prior to distribution, however, IT system 150 may establish that the extracted customer records include actual customer social-security numbers, and that the extracted account data records include actual customer account numbers. Further, based on the data governance, permissioning, and compliance policies established by the enterprise, IT system 150 may determine that the actual customer social-security numbers and actual customer account numbers represent sensitive information that render the extracted customer and account data inappropriate for use as test data. In some embodiments, described below in reference to FIG. 17, IT system 150 may be configured to identify locations of the sensitive information within the extracted customer and account data records, modify portions of the extracted customer and account data records to delete or obfuscate the sensitive information, and provide the modified customer and account data records to the application developer for use in testing the new mobile banking application.

Figure 17:
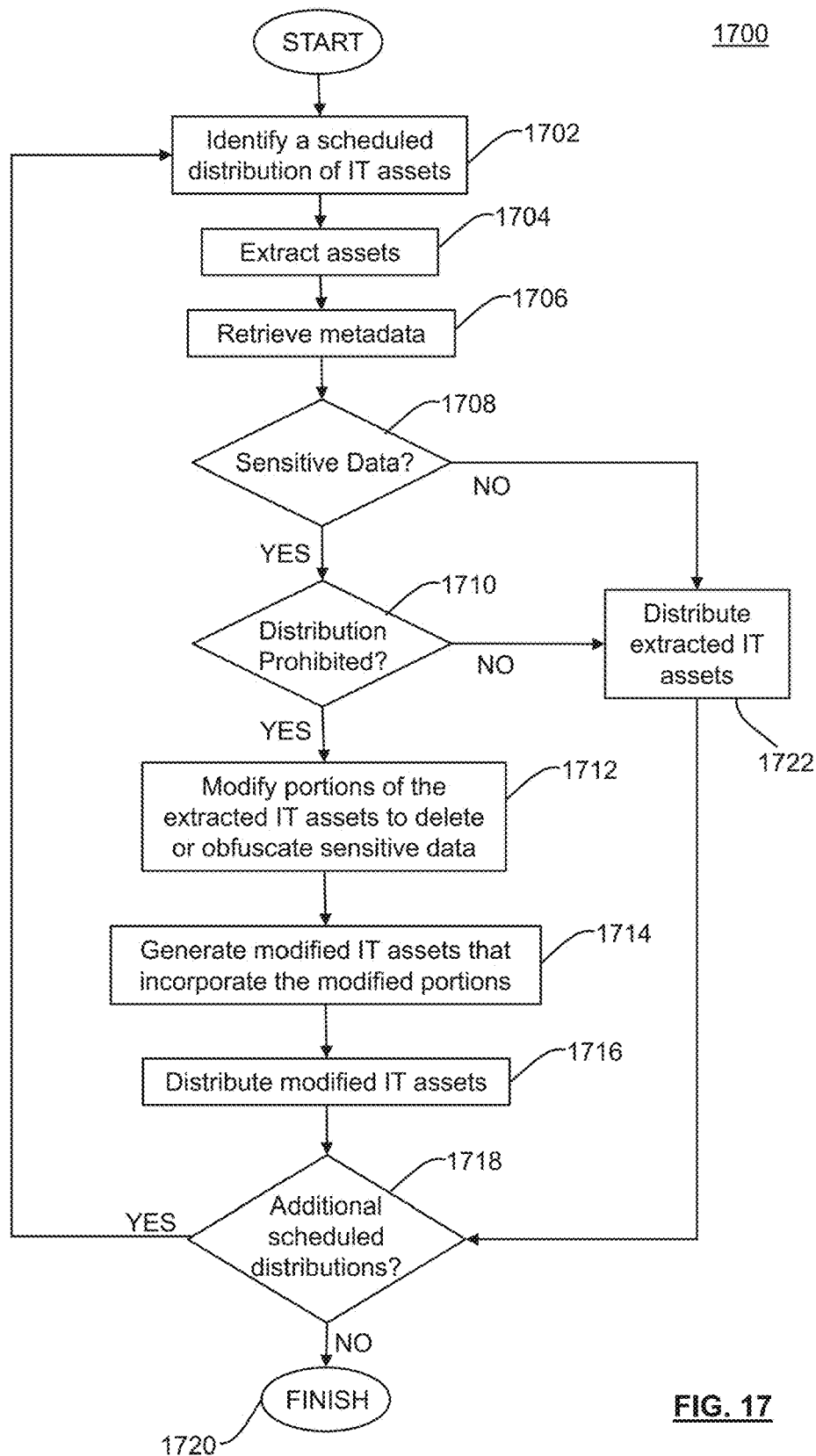
FIG. 17 is a flowchart of an exemplary process for distributing data, reporting, or analytical assets maintained by an enterprise data provisioning platform, consistent with disclosed embodiments.

FIG. 17 is a flow chart of an exemplary method 1700 for distributing data, reporting, or analytical assets that comply with data governance, permissioning, and compliance policies of an enterprise, in accordance with disclosed embodiments. In an embodiment, an IT system (e.g., IT system 150) may identify data, reporting, and/or analytical services selected by an application developer (e.g., through a web page or GUI associated with a self-serve IT asset store). As outlined above, the data, reporting, and analytical services may be associated with corresponding data, reporting, and analytical assets maintained by an enterprise data provisioning platform (e.g., enterprise data provisioning platform 1622), which may be configured by IT system 150 to distribute the data, reporting, and/or analytical assets to one or more destination devices in accordance with a delivery schedule established by the application developer (e.g., through the web page or GUI associated with a self-serve IT asset store). Prior to distribution of the corresponding IT assets, and additionally or alternatively, prior to each recurring distribution, IT system 150 may process the corresponding IT assets and associated metadata to identify sensitive and confidential portions of the corresponding IT assets, and based on an intended use or an expected recipient of the corresponding IT assets, modify the corresponding IT assets to eliminate or obfuscate the sensitive and confidential portions. IT system 150 may, in certain instances, provide the modified IT assets to the destination devices in accordance with the established distribution schedule.

In one aspect, IT system 150 may identify a scheduled provisioning of data, reporting, and/or analytical assets maintained by enterprise data provisioning platform 1622 (e.g., in step 1702). The data, reporting, and/or analytical assets may, in some instances, correspond to data, reporting, and/or analytical services selected by the application developer (e.g., through a web page or GUI associated with a self-serve IT asset store), and as described above, an orchestration engine provided by IT system 150 may link the selected data, reporting, and/or analytical services to an instance of an application previously generated using any of the exemplary techniques described above.

In some aspects, the web page or GUI associated with a self-serve IT asset store may also enable the application developer to provide, as input, information identifying an intended use of the selected data, reporting, and/or analytical services, and further, specifying one or more scheduled deliveries of the IT assets associated with the selected data, reporting, and/or analytical services to one or more destination devices (e.g., client device 210 or other devices configured to execute the previously generated application instances). By way of example, the information specifying the one or more distributions may include a date and/or a time associated with each of the distributions, and each of the destination devices may be specified by a corresponding internet protocol (IP) addresses, a MAC addresses, and/or any additional or alternative data capable of uniquely identifying each of the destination devices within the communications network (e.g., network 225).

Upon receipt of the input information, IT system 150 may be configured to link the selected data, reporting, and/or analytical services, the intended use, the scheduled distribution(s), and additionally or alternatively, the corresponding destination devices, and to store the linked information within a portion of a data repository locally accessible to IT system 150. In certain aspects, IT system 150 may, in step 1702, query the locally accessible data repository to identify the intended use, the one or more scheduled distributions, and further, the destination devices associated with the selected the selected data, reporting, and/or analytical services.

IT system 150 may also be configured to access enterprise data provisioning platform 1622, and extract from enterprise data provisioning platform 1622 stored IT assets that correspond to the selected data, reporting, and/or analytical services (e.g., in step 1704). For example, the application developer may plan to test a newly developed mobile banking application capable of execution on Android™ devices (e.g., corresponding to an application instance previously generated by IT system 150), and the application developer may select customer data records, which include customer social-security numbers, and account data records, which include actual customer account numbers, as a basis for test data for the mobile banking application. In some aspects, IT system 150 may access enterprise data provisioning platform 1622 and may extract the customer and account data records selected by the application developer.

Further, as described above, enterprise data provisioning platform 1622 may be configured to maintain metadata characterizing the stored IT assets (e.g., the data, reporting, and/or analytical assets). In some aspects, IT system 150 may also be configured to retrieve, from enterprise data provisioning platform 1622, metadata characterizing each of the extracted data, reporting, and/or analytical assets (e.g., in step 1706). By way of example, and as outlined above, the retrieved metadata may include information characterizing sources of the extracted IT assets, file-specific details of the extracted IT assets, and further, attributes of the extracted IT assets. Further, in some embodiments, the retrieved metadata may identify portions of the extracted IT assets that, based on the data governance, permissioning, and compliance policies of the enterprise, could represent sensitive and/or confidential information that would limit the distribution of the extracted IT assets.

In the example described above, and to facilitate testing of the mobile banking application, IT system 150 may extract the selected customer and account data records from enterprise data provisioning platform 1622 (e.g., in step 1704), and further, may retrieve metadata associated with extracted customer and account data records (e.g., in step 1706). In some aspects, the retrieved metadata may identify the presence of the customer social-security numbers and customer account numbers within the extracted customer and account data records and further, may establish a position of this sensitive data within corresponding ones of the data records. For example, the metadata associated with the extracted customer data records may indicate that the customer social-security number is disposed at a corresponding position within each of the customer data records (e.g., a fifth data entry in each data record). Additionally or alternatively, the metadata associated with the extracted account data records may indicate that the customer account number is disposed at a corresponding position within each of the account data records (e.g., an initial data entry in each data record). The disclosed positions of the customer social-security numbers and the customer account number are provided for exemplary purposes, and in other aspects, the sensitive and confidential information may be disposed at any additional or alternate position within the data records without departing from the spirit or scope of the disclosed embodiments.

Based on the retrieved metadata, IT system 150 may be configured to determine whether the extracted data, reporting, and/or analytical assets include sensitive data (e.g., in step 1708). As described above, the sensitive data may include customer-, account-, transaction-, and/or business-specific information established as inappropriate for distribution to certain individuals or entities, and further, inappropriate for certain types of intended uses by the data governance, permissioning, and compliance policies of the enterprise. For example, the data governance, permissioning, and compliance policies of the enterprise may prohibit the use of certain types of customer and account information as test data for application testing purposes (e.g., actual customer account number or actual customer social-security numbers). The disclosed embodiments are not limited to these exemplary use-based restrictions, and in other embodiments, the data governance, permissioning, and compliance policies of the enterprise may include any additional or alternate restriction on data access and distribution appropriate to the enterprise and the assets maintained by enterprise data provisioning platform 1622.

If IT system 150 were to determine that the extracted data, reporting, and/or analytical assets include sensitive data (e.g., step 1708; YES), IT system 150 may be configured to determine, based on the data governance, permissioning, and compliance policies of the enterprise, whether the sensitive data prevents distribution of the extracted data, reporting, and/or analytical assets to the specified destination device (e.g., in step 1710). By way of example, IT system 150 may determine that the extracted data, reporting, and/or analytical assets include first sensitive data (e.g., customer addresses or account expiration dates), but that the data governance, permissioning, and compliance policies of the enterprise permit the first data to be viewed by the application developer and/or used for the specified intended purpose. Alternatively, IT system 150 may determine that the extracted data, reporting, and/or analytical assets include second sensitive data (e.g., actual customer social-security numbers or actual customer account numbers), and further, that the data governance, permissioning, and compliance policies of the enterprise prevent the application developer from viewing the second sensitive data or using the second sensitive data for the specified intended purpose.

If IT system 150 were to determine that determine the data governance, permissioning, and compliance policies of the enterprise prohibit the distribution of the extracted data, reporting, and/or analytical assets (which includes the sensitive data) to the specified destination device (e.g., step 1710; YES), IT system 150 may delete or obfuscate at least a portion of the sensitive data within the extracted data, reporting, and/or analytical assets (e.g., in step 1712). In one aspect, IT system 150 may parse the extracted data, reporting, and/or analytical assets to identify and delete the sensitive data. In some instances, however, the intended use of the extracted data, reporting, and/or analytical assets may require a presence of data matching at least a structure of the sensitive data. Thus, in additional aspects, IT system 150 may replace all or a part of the sensitive data within the extracted data, reporting, and/or analytical assets with alphanumeric character strings that match a structure of the sensitive data, but obfuscate an identity of one or more corresponding customers, account, and/or businesses.

For example, as described above, an application developer may select available customer and account data records in order to test a functionality of a new mobile banking application, and IT system 150 may extract customer and account data records from enterprise data provisioning platform 1622 and retrieve corresponding stored metadata. Further, by way of example, the customer data records may include actual customer social-security numbers, and the account data records may include actual customer account numbers. In some aspects, IT system 150 may establish, based on the retrieved metadata, that the actual customer social-security numbers and actual customer account numbers represent sensitive data (e.g., in step 1708), and further, that the data governance, permissioning, and compliance policies of the enterprise prohibit the use of account data records that include actual account numbers for testing purposes, as well as the distribution of customer data records that include actual social-security number to the application developer for testing purposes (e.g., in step 1710).

In response to these determinations, IT system 150 may, in step 1712, delete the social-security numbers from the customer records, and additionally or alternatively, obfuscate the social-security numbers by replacing at least a portion of the social-security numbers with one or more character strings. Similarly, in step 1712, IT system 150 may delete the actual account numbers from the account records, and additionally or alternatively, obfuscate the actual account numbers by replacing at least a portion of the actual account numbers with one or more character strings. In some embodiments, as described above, the replacement character strings may conform to structures, formats, and/or lengths of the social-security numbers and actual account numbers. In other embodiments, however, the replacement character strings may exhibit any additional or alternate structures, formats, and/or lengths that further distinguish and obfuscate the social-security numbers and actual account numbers. Further, in certain embodiments, the deletion or obfuscation of the sensitive data within the extracted data, reporting, and/or analytical assets may render these assets suitable for distribution and/or their intended use within the enterprise.

In an embodiment, IT system 150 may generate modified data (e.g., test data), reporting, and/or analytical assets that incorporate the modifications to the previously extracted assets that eliminate or obfuscate portions of the identified sensitive data (e.g., in step 1714). Further, in some aspects, IT system 150 may be configured to store the modified data, reporting, and/or analytical assets in a locally accessible data repository for future access, and additionally or alternatively, future modifications in response to changes in the data governance, permissioning, and compliance policies of the enterprise. As the modified data, reporting, and/or analytical assets include no sensitive data, these modified assets may comply with the data governance, permissioning, and compliance policies of the enterprise, and IT system 150 may execute software processes that transmit the modified data, reporting, and/or analytical assets in accordance with the specified provisioning schedule and specified destination devices (e.g., in step 1716).

In some aspects, IT system 150 may determine whether the application developer scheduled any additional distributions of selected data, reporting, and/or analytical assets (e.g., in step 1718). For example, the additional distributions may include another instance of recurring distribution of previously selected data, reporting, and/or analytical assets, or a single instance of newly selected data, reporting, and/or analytical assets. If IT system 150 were to determine that the application developer scheduled no additional asset distributions (e.g., step 1718; NO), then the exemplary processes of FIG. 17 are complete in step 1720. If, however, IT system 150 were to determine that the application developer scheduled one or more additional asset provisions (e.g., step 1718; YES), exemplary process 1700 may pass back to step 1702, and IT system 150 may identify an additional scheduled distribution of the data, reporting, and/or analytical assets maintained enterprise data provisioning platform 1622, as described above.

Referring back to step 1708, if IT system 150 were to determine that determine the extracted data, reporting, and/or analytical assets include no sensitive data (e.g., step 1708; NO), the extracted data, reporting, and/or analytical assets comply with the data governance, permissioning, and compliance policies of the enterprise. In some instances, IT system 150 may execute software processes that transmit the extracted data, reporting, and/or analytical assets without modification and in accordance with the specified distribution schedule and specified destination devices (e.g., in step 1722). Exemplary process 1700 may pass back to step 1716, and IT system 150 may determine whether the application developer scheduled any additional distributions of selected data, reporting, and/or analytical assets, as described above.

Further, in reference to step 1710, if IT system 150 were to determine that the sensitive data does not prevent distribution of the extracted data, reporting, and/or analytical assets to the specified destination system (e.g., step 1710; NO), the sensitive data within the extracted data, reporting, and/or analytical assets nonetheless complies with the data governance, permissioning, and compliance policies of the enterprise. Exemplary process 1700 may pass to step 1722, and IT system 150 may execute software processes that transmit the extracted data, reporting, and/or analytical assets, including the sensitive date, in accordance with the specified distribution schedule and specified destination devices, as described above.

In certain embodiments, the modified data generated IT system 150 (e.g., using the exemplary processes of FIG. 17) represent test data that facilitates and expedites operational and quality control testing of one or more application instances established or "spun-up" by IT system 150. IT system 150 may, for instance, execute a test data manager or other executable application to access one or more data assets selected by an application developer and maintained by enterprise data provisioning platform (e.g., enterprise data provisioning platform 1622 of FIG. 16), generate modified data assets by deleting or obfuscating sensitive portions of the selected data assets, and further, provides portions of the modified data assets as test data to the application developer in accordance with an established distribution schedule. Further, and as described above, the test data manager may access and exchange data with one or more supporting applications (e.g., though a corresponding API) that, when executed by a computing device, perform processes that support the generation of the test data from the one or more selected data assets. Other embodiments will be apparent to those skilled in the art from consideration of the specification and practice of the embodiments disclosed herein. It is intended that the specification and examples be considered as exemplary only, with a true scope and spirit of the disclosed embodiments being indicated by the following claims.

What is claimed is:

1. An apparatus, comprising:
  a storage device storing instructions; and
  at least one processor coupled to the storage device and configured to execute the instructions to:
    obtain an information-technology asset from an enterprise data provisioning platform;
    identify an intended use of the obtained information-technology asset by a destination device, the intended use comprising testing of at least one application instance executed by the destination device;
    establish a presence of sensitive information within the obtained information-technology asset;
    determine, based on the established presence of the sensitive information, whether (i) a distribution of the obtained information-technology asset to the destination device is inconsistent with a permissioning or compliance policy and (ii) whether the intended use of the obtained information-technology asset is inconsistent with the permissioning or compliance policy;
    when the distribution of the obtained information-technology asset is inconsistent with the permissioning or compliance policy, or when the intended use of the obtained information-technology asset is inconsistent with the permissioning or compliance policy, modify at least a portion of the obtained information-technology asset to at least one of delete or obfuscate a portion of the sensitive information; and
    generate an electronic command to transmit, across a network, the modified information-technology asset to the destination device in accordance with a distribution schedule.

2. The apparatus of claim 1, wherein:
  the obtained information-technology asset comprises a data asset;
  the data asset comprises at least one of a customer data record, an account data record, or a transaction data record; and
  the sensitive information comprises at least one of a customer social-security number, a customer account number, a customer address, or a customer account expiration date.

3. The apparatus of claim 1, wherein the obtained information-technology asset comprises at least one of a reporting or analytical asset.

4. The apparatus of claim 3, wherein the reporting asset comprises at least one of a customer report, an account report, a product report, or a transaction report.

5. The apparatus of claim 3, wherein the analytical asset comprises at least one of a risk rate, customer analytical data, marketing analytical data, or fraud analytical data.

6. The apparatus of claim 1, wherein the at least one processor is further configured to:
  obtain, from the enterprise data provisioning platform, metadata characterizing at least a composition of the obtained information-technology asset; and
  establish the presence of the sensitive information within the obtained information-technology asset based on the obtained metadata.

7. The apparatus of claim 6, wherein the obtained metadata identifies at least one of a type of the sensitive information or a location of the sensitive information within the obtained information-technology asset.

8. The apparatus of claim 1, wherein the at least one processor is further configured to;
  determine, based on the established presence of the sensitive information, that the intended use of the obtained information-technology asset is consistent with the at least one permissioning or compliance policy.

9. The apparatus of claim 1, wherein the sensitive information comprises at least one of sensitive customer information, sensitive account information, or sensitive business information.

10. The apparatus of claim 1, wherein the at least one processor is further configured to:
  when the distribution of the obtained information-technology asset is consistent with the permissioning or compliance policy, and when the intended use of the obtained information-technology asset is consistent with the permissioning or compliance policy, generate an additional electronic command to transmit, across the network, the obtained information-technology asset to the destination device in accordance with the distribution schedule.

11. A computer-implemented method, comprising:
  obtaining, using at least one processor, an information-technology asset from an enterprise data provisioning platform;
  identifying, using the at least one processor, an intended use of the obtained information-technology asset by a destination device, the intended use comprising testing of at least one application instance executed by the destination device;
  establishing, using the at least one processor, a presence of sensitive information within the obtained information-technology asset;
  based on the established presence of the sensitive information, determining, using the at least one processor, whether (i) a distribution of the obtained information-technology asset to the destination device is inconsistent with a permissioning or compliance policy and (ii) whether the intended use of the obtained information-technology asset is consistent with the permissioning or compliance policy;
  when the distribution of the obtained information-technology asset is inconsistent with the permissioning or compliance policy, or when the intended use of the obtained information-technology asset is inconsistent with the permissioning or compliance policy, modifying, using the at least one processor, at least a portion of the obtained information-technology asset to at least one of delete or obfuscate a portion of the sensitive information; and
  generating, using the at least one processor, an electronic command to transmit, across a network, the modified information-technology asset to the destination device in accordance with a distribution schedule.

12. The method of claim 11, wherein:
  the obtained information-technology asset comprises a data asset;
  the data asset comprises at least one of a customer data record, an account data record, or a transaction data record; and
  the sensitive information comprises at least one of a customer social-security number, a customer account number, a customer address, or a customer account expiration date.

13. The method of claim 11, wherein the obtained information-technology asset comprises at least one of a reporting or analytical asset.

14. The method of claim 13, wherein the reporting asset comprises at least one of a customer report, an account report, a product report, or a transaction report.

15. The method of claim 13, wherein the analytical asset comprises at least one of a risk rate, customer analytical data, marketing analytical data, or fraud analytical data.

16. The method of claim 11, further comprising:
obtaining, from the enterprise data provisioning platform, metadata characterizing at least a composition of the obtained information-technology asset; and
establishing the presence of the sensitive information within the obtained information-technology asset based on the obtained metadata, the sensitive information comprising at least one of sensitive customer information, sensitive account information, or sensitive business information.

17. The method of claim 16, wherein the obtained metadata identifies at least one of a type of the sensitive information within the obtained information-technology asset or a location of the sensitive information within the obtained information-technology asset.

18. The method of claim 11, further comprising
determining that the intended use of the obtained information-technology asset is inconsistent with the at least one permissioning or compliance policy.

19. A system, comprising:
an enterprise data provisioning platform device connected to a network, the enterprise data provisioning platform comprising a storage device, the storage device storing a plurality of information-technology assets; and
an apparatus connected to the network, comprising:
a storage device storing instructions; and
at least one processor coupled to the storage device and configured to execute the instructions to:
identify one or more of the information-technology assets available to a destination device, the destination device being connected to the network;
provide, to the destination device, information identifying the available information-technology assets, the information instructing the destination device to present the available information technology assets through an interface;
receiving, from the destination device, information identifying a selection of at least one of the available information-technology assets;
obtain the at least one selected information-technology asset from the enterprise data provisioning platform;
identify an intended use of the at least one selected information-technology asset by the destination device, the intended use comprising testing of at least one application instance executed by the destination device;
establish a presence of sensitive information within the at least one selected information-technology asset;
determine, based on the established presence, whether (i) a distribution of the at least one selected information-technology asset to the destination device is inconsistent with a permissioning or compliance policy and (ii) whether the intended use of the at least one selected information-technology asset is consistent with the permissioning or compliance policy;
when the distribution of the at least one selected information-technology asset is inconsistent with the permissioning or compliance policy, or when the intended use of the at least one selected information-technology asset is inconsistent with the permissioning or compliance policy, modify at least a portion of the at least one selected information-technology asset to at least one of delete or obfuscate a portion of the sensitive information; and
generate an electronic command to transmit, across the network, the at least one modified information-technology asset to the destination device in accordance with a distribution schedule.

* * * * *